(12) United States Patent
Stuart et al.

(10) Patent No.: US 11,814,741 B2
(45) Date of Patent: *Nov. 14, 2023

(54) INTEGRALLY COMBINED CURRENT CARRIER CIRCULATION CHAMBER AND FRAME FOR USE IN UNIPOLAR ELECTROCHEMICAL DEVICES

(71) Applicant: KEY DH IP INC./IP STRATEGIQUES DH, INC., Collingwood (CA)

(72) Inventors: Andrew T. B. Stuart, Ravenna (CA); Raynald G. Lachance, Levis (CA); Edward D. B. Stuart, Ravenna (CA); Samantha E. L. Stuart, Toronto (CA); Jaideep S. Spal, Brampton (CA)

(73) Assignee: KEY DH IP INC./IP STRATEGIQUES DH, INC., Collingwood (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/080,583

(22) Filed: Dec. 13, 2022

(65) Prior Publication Data

US 2023/0124442 A1 Apr. 20, 2023

Related U.S. Application Data

(60) Division of application No. 17/544,176, filed on Dec. 7, 2021, now Pat. No. 11,560,634, which is a
(Continued)

(51) Int. Cl.
*C25B 9/65* (2021.01)
*C25B 9/73* (2021.01)
(Continued)

(52) U.S. Cl.
CPC ............ *C25B 9/65* (2021.01); *C25B 1/04* (2013.01); *C25B 1/265* (2013.01); *C25B 1/34* (2013.01); *C25B 9/73* (2021.01)

(58) Field of Classification Search
CPC .. C25B 1/04; C25B 1/265; C25B 1/34; C25B 9/65; C25B 9/73
See application file for complete search history.

(56) References Cited

U.S. PATENT DOCUMENTS 4,605,482 A * 8/1986 Shiragami ............... C25B 9/73
204/283
6,080,290 A * 6/2000 Stuart ................. H01M 8/2483
204/255

(Continued)

OTHER PUBLICATIONS

Apr. 23, 2021 USPTO Office Action (U.S. Appl. No. 16/994, 125).
(Continued)

*Primary Examiner* — Alexander W Keeling
(74) *Attorney, Agent, or Firm* — Forsgren Fisher McCalmont DeMarea Tysver LLP; James M. Urzedowski; Daniel A. Tysver

(57) ABSTRACT

Disclosed is an integrally combined electrical current carrier, circulation chamber and frame (CCF) formed as a single or double part (CCF) for use in unipolar electrochemical devices, such as a filter press electrolyser apparatus. The CCF is structured to define an internal circulation chamber for circulation of electrolyte, products, and reactants as well as apertures which form flow passageways when the filter press device is assembled. Affixed on opposed surfaces of the CCFs are electrically conductive planar electroactive structures which are in electrical contact with the CCF. The circulation chamber is formed by the depth of the CCF itself between opposing electroactive structures. Multiple CCFs are assembled and compressed together to form the filter press electrolyser apparatus. The flow passageway apertures
(Continued)

within the assembled filter press electrolyser are aligned to form flow pathways, located above and below the circulation chambers. Reactants and electrolyte are input along the bottom flow pathways. When power is applied to the CCFs and electroactive structures, the reactants, once they flow into the circulation chamber with the electrolyte, undergo redox reactions to produce the products which are then collected and exit the electrolyser in the upper flow pathways.

43 Claims, 34 Drawing Sheets

Related U.S. Application Data continuation of application No. 16/994,125, filed on Aug. 14, 2020, now Pat. No. 11,225,724.

(60) Provisional application No. 63/053,264, filed on Jul. 17, 2020.

(51) Int. Cl.
  *C25B 1/04* (2021.01)
  *C25B 1/34* (2006.01)
  *C25B 1/26* (2006.01)

(56) References Cited

U.S. PATENT DOCUMENTS 11,225,724 B1 * 1/2022 Stuart ................. C25B 9/65
2007/0278095 A1 12/2007 Asaumi

OTHER PUBLICATIONS

PCT International Search Report and Written Opinion from PCT/CA2021/050979 dated Oct. 12, 2021.
Feb. 25, 2022 USPTO Office Action (U.S. Appl. No. 17/544,176).
Jun. 29, 2022 USPTO Office Action (U.S. Appl. No. 17/544,176).
Mar. 15, 2023 USPTO Office Action (U.S. Appl. No. 18/080,583).

* cited by examiner

INTEGRALLY COMBINED CURRENT CARRIER CIRCULATION CHAMBER AND FRAME FOR USE IN UNIPOLAR ELECTROCHEMICAL DEVICES

CROSS-REFERENCE TO RELATED APPLICATIONS

The present application claims priority to U.S. Provisional App. No. 63/053,264; U.S. application Ser. No. 17/544,176; and U.S. application Ser. No. 16/994,125. The present application is a divisional application of U.S. application Ser. No. 17/544,176, filed on Dec. 7, 2021. U.S. application Ser. No. 17/544,176, is a continuation of U.S. application Ser. No. 16/994,125, filed Aug. 14, 2020 and which issued as U.S. Pat. No. 11,225,724 on Jan. 18, 2022. U.S. application Ser. No. 16/994,125, claims priority to U.S. Provisional App. No. 63/053,264, filed Jul. 17, 2020. The entire content of U.S. Provisional App. No. 63/053,264; U.S. application Ser. No. 17/544,176; and U.S. application Ser. No. 16/994,125 is incorporated herein by reference.

FIELD

This disclosure relates to an electronically conductive novel structure for use in electrochemical devices such as electrolysers, consisting in an integrally combined current carrier, circulation chamber, and frame structure formed as a single part ("CCF"), suitable for use in the electrolysis of an alkali aqueous solution of water and an alkali metal chloride which can be configured in one or more filter press arrangements.

BACKGROUND

Electrochemical cell technology is designed such that an applied electric current induces reactions within a cell, converting available reactants into desired products. An electrolytic cell, or electrolysis cell, is one preferred method of accomplishing this conversion. Electrolysis cells require the conduction of electricity, typically direct current, from an external source to a polarized electrode. They further require conduction away from an electrode of the opposite polarity, either external to or within the electrochemical cell, to generate products.

One desirable configuration of an electrochemical cell is that of the filter press-type electrolyser. Filter press electrolyser electrochemical cells require: mechanical frames with sufficient rigidity, the ability to be connected to (and removed from) an external current source, a "current carrier" to provide a current flow path for electricity to be conducted to the electroactive area, a circulation chamber to provide space for gaseous product generation at the electroactive area, passageways that allow the input and output of reactants and products, and finally a capability to form an external seal that prevents fluids leaking from the interior of the cell to the external atmosphere.

Filter press electrolyser electrochemical cells generally come in three configurations, driven by the design of their sub-components: a bipolar cell design, a unipolar cell design, or a monopolar cell design.

Monopolar Cell Design

A "monopolar" cell design or configuration refers to an electrochemical device based upon a current carrying configuration as shown by the exemplary positive half-cell in FIG. 1B. This monopolar configuration comprises a current carrying structure, and further provides an electroactive structure of a singular polarity (either anodic or cathodic) on one side of the current carrying structure. As a result, a region of one polarity is provided on the side of the current carrying structure that possesses the electroactive structure. Current is provided into the configuration by a power source and flows in across the current carrier and to the electroactive structure. Typically, the current flows in a parallel direction to the electroactive structure. The half-cell in FIG. 1B creates the base current carrying unit for a monopolar electrochemical filter press device constructed of positive and negative (anodic and cathodic) half-cell pairs. All monopolar base current carrying units are configured electrically in parallel within a single filter press arrangement, such that one electrochemical cell is formed within a single filter press stack.

Bipolar Cell Design

The phrase "bipolar configuration" or "bipolar cell configuration" refers to an electrochemical device based upon a current carrying configuration as shown in FIG. 1C. This bipolar configuration comprises a bipolar wall, defining electroactive areas of opposite polarity on opposing sides of the current carrying structure. Regions of opposite polarity are provided on the opposing sides of the bipolar wall. Current is provided into the configuration by a power source and flows through the bipolar wall orthogonally, creating the base current carrying unit for a bipolar electrochemical filter press device. Multiple electrochemical cells within a bipolar filter press are electrically connected in series, with each individual current carrier typically comprising one anodic and one cathodic side connected by a conductive bipolar wall. The current path in bipolar cells between electroactive structures of different polarities is typically shorter than the equivalent current path in traditional monopolar designs, and unipolar designs as described later.

In bipolar cells, the current must only travel through one bipolar wall to reach an electroactive structure of the opposing polarity, whereas in traditional unipolar and monopolar cells additional components are required to connect current to opposite polarity electroactive structures. A shorter current path generally creates lower resistance parameters within the conductive surfaces of a singular cell. This has traditionally led to higher voltage losses due to higher electronic resistance voltage loss, and thus lower efficiency, for unipolar and monopolar cells as compared to bipolar cells for similar current densities and similar electroactive structures.

Historically, the contribution of electronic resistance to cell voltage losses in traditional unipolar and monopolar designs presented the greatest barrier to the continued commercialization of these technologies. When choosing which direction to take electrolysis technologies in recent decades, leaders in the electrolysis field focused heavily on the advancement of "zero-gap" bipolar cell designs as they reduced the contribution of electronic resistance to cell voltage losses and consequently, for similar current densities and similar electroactive structures, improved plant energy efficiency. Zero-gap designs also allowed bipolar cells to utilize higher current densities. The focus on zero-gap bipolar technology lead to an industrial preference for bipolar technology as a whole over monopolar and unipolar technology. However, the utilization of higher current densities does not in itself lead to improved efficiency or improved plant economics. Unipolar and monopolar technologies present many complementary advantages in these areas, which will be discussed further.

Unipolar Cell Design

A unipolar cell design or configuration refers to an electrochemical device based upon a current carrying configuration as shown by the exemplary positive half-cell in FIG. 1A. This unipolar configuration comprises a current carrying structure that provides multiple electroactive structures of the same polarity (either anodic or cathodic) on opposing sides of the current carrying structure. As a result, regions of the same universal polarity are provided on the opposing sides of the current carrying structure. Current is then provided by a power source and flows in across the current carrier and to the electroactive structures. Typically, the current flows in a parallel direction to the electroactive structures. The half-cell in FIG. 1A creates the base current carrying unit for a unipolar electrochemical filter press device constructed of positive and negative (anodic and cathodic) half-cell pairs. Like the previously described monopolar base current carrying unit, all unipolar base current carrying units are configured electrically in parallel within a single filter press arrangement, such that one electrochemical cell is formed within a single filter press stack. Unipolar designs are distinguished from monopolar designs by the presence and positioning of their electroactive area(s) among other things.

Historically, only "tank type" unipolar cells have had current carriers comprising a single chamber bordered by two electroactive structures of the same polarity, enabling a single channel for electrochemical reactants and products to flow between the electroactive structures. An early tank type unipolar electrolyser is described in U.S. Pat. No. 1,597,552A Electrolytic Cell, Alexander T. Stuart, 1923. Tank type unipolar designs do not require a frame as part of a single unipolar current carrying electrode. Rather, unipolar electrodes are connected electrically in parallel and mounted as a single structure within a tank. A major advancement in tank type unipolar electrode design as described in U.S. Pat. No. 4,482,448A Electrode Structure for Electrolyser Cells, Bowen et al, 1981 introduced the world to the first large scale hydrogen production, which was configured to allow large total surfaces areas and currents of 120,000 amperes per cell, from non-fossil energy. However, despite the advancements that enabled the industrial scaling of this technology, these tank type unipolar cells required separate tanks, cover plates, penetrations for electrochemical connections, and the use of additional parts to form a suitable passageway for electrochemical reactants and products to pass through the electrochemically active regions. "Tank type" configurations in general were replaced by "filter press type" configurations because of the large quantity of their parts, the complexity of their assembly, and the difficulty in changing the surface area per cell.

The additional components required by unipolar tank type cells yielded a longer current path between electroactive structures of opposing polarities than bipolar designs, and consequently higher resistance within the conductive pathways required for a single cell. A double plated monopolar filter press frame design was created which reduced part count and current path lengths as compared to unipolar tank type cells, while affording many of the commercial benefits of unipolar technology in U.S. Pat. No. 6,080,290A Monopolar electrochemical system with a double electrode plate, A. T. B. Stuart et al., 1997.

However, the monopolar double plate design of U.S. Pat. No. 6,080,290A possessed features that were challenging to manufacture. In addition, the monopolar plate design of U.S. Pat. No. 6,080,290A necessitated that non-conductive chamber-creating sealing gasket(s) be positioned between monopolar plates of the same polarity; which were positioned back to back, with the chamber-creating sealing gaskets between them. Further, should a thick electroactive structure have been employed to enable increases in this design's lateral width (thus increasing its surface area in the direction current travels), even further use of the chamber-creating "spacer gaskets" would have been necessitated. Overall, the requirement to provide such spacer gaskets with each monopolar plate addition imposed mechanical and structural limitations to the filter press design, specifically: limited ability to seal a large quantity of monopolar plates within a single filter press, limited ability to operate at elevated internal pressure, and limits on the methods to support the separator within the filter press. Further, providing additional gaskets required more parts be manufactured, slowed construction of the cell, and imposed restrictions on the compression methods used for the filter press stack.

A unipolar filter press cell stack is described in U.S. Pat. No. 4,490,231 Electrolytic cell of the filter press type, Boulton, 1982, however its design imposes similar advantages and limitations to the monopolar filter press design of U.S. Pat. No. 6,080,290A. Like the monopolar filter press design of U.S. Pat. No. 6,080,290A the limitations of U.S. Pat. No. 4,490,231 include: the need to use additional spacer gaskets to form a chamber, limited ability to seal a large quantity of plates within a single filter press (because of the soft materials being used to form a chamber), limited ability to operate at elevated internal pressure, limits on the method used to support the separator in the filter press, and finally limitations on the ability to expand electroactive structure length in the direction current travels (to increase electroactive surface area for the purpose of conducting greater electricity over longer distances).

To elaborate on the latter limitation, for the filter press of U.S. Pat. No. 4,490,231 to expand the electroactive structure in the direction current travels while maintaining the same specified resistive loss, it would require a thicker current carrying structure, as its main current carrying structure is provided from the same part as its electroactive structure. This is disadvantageous because: forming the electroactive structure of U.S. Pat. No. 4,490,231 involves cutting and bending (which would become increasingly expensive as the current carrier grew thicker), applying extra electrocatalysis to the expanded current carrier would increase costs, and finally the thickness of the required spacer-gasket becomes larger, which exacerbates the associated limitations listed above. Additionally, the short and wide rectangular shape of the unipolar filter press of U.S. Pat. No. 4,490,231 does not minimize the potential footprint of the electrochemical device, as the tall and narrow monopolar plate embodiment does in U.S. Pat. No. 6,080,290A.

In summary, the monopolar filter press U.S. Pat. No. 6,080,290A overcomes some of the disadvantages of tank type unipolar cells, by providing shorter current paths which allow for lower ohmic resistance losses. In addition, the monopolar filter press has a lower part count and much lower construction costs than the unipolar tank type cell. Furthermore, the unipolar filter press of U.S. Pat. No. 4,490,231 does not have a generally tall and narrow geometry, and it combines its current carrier and electroactive structure in one part, thus limiting the design choices available for its thickness and manufacturing method.

It should be noted that both the filter press electrolysers of U.S. Pat. Nos. 6,080,290A and 4,490,231 orient their electroactive structures such that they are in parallel with the direction of current flow. Consequently, these designs allow for multiple electrode structures to be placed within the same electrochemical cell. In view of this, the individual electrochemical cell can expand its surface area by extending the filter press longitudinally to its physical limit. This leads to very high current being able to flow through a monopolar or unipolar cell.

In contrast, bipolar filter press arrangements incorporate a number of cells longitudinally within one filter press stack. Further, in a bipolar filter press, the electrode structure of a bipolar cell remains perpendicular to the direction of current flow. With this construction, there are practical limits on the surface area of a single bipolar cell. Practical surface area limits are imposed as the electrolytic reactants and products need to distribute throughout the bipolar electrode structure, while balancing limits in practical manufacturing techniques as well as transportation of a filter press from its point of fabrication to the operating site. Limits on practical surface area leads to lower limits on the amount of current that can flow through a bipolar filter press, as compared with a monopolar or unipolar filter press. For example, in water electrolysis processes over the past 40 years, current has ranged typically up to 10,000 amperes in a bipolar filter press as compared with 120,000 amperes in a unipolar cell. Furthermore, multiple bipolar filter presses are not practically employed in parallel with each other to increase this amperage, due to the differences in resistivity between each filter press. Therefore, for the purpose of creating large surface area electrolysis cells, bipolar cells are not practical.

By the year 2020, the cost of implementing renewable forms of electricity production through technologies such as wind turbines and photovoltaics has dramatically fallen from historical levels. Rather than being one of the most expensive sources of electricity, as they were in the 1970's and 1980's, photovoltaics and wind turbines are now some of the world's lowest-cost electricity sources, and are indigenous to every country across the globe. Integrating these renewable energy technologies with large scale water electrolysis cells can produce renewably made hydrogen at historically low costs. These costs in many cases can be lower than the cost of hydrogen produced from fossil fuels, and have the potential to enable the long-term replacement of fossil energy with renewable energy.

However, in order to replace fossil-based hydrogen with renewable-based hydrogen, water electrolysers are required on the order of 100 to 1000 times larger than what has generally been used in industry over the past 20 years. For example, one large-scale ammonia production facility, which would source its hydrogen from renewable energy sources and water electrolysis units, would need approximately 2,000 MW of power. Therefore, the water electrolysers are required to have, among other features, very high individual cell currents (for example 50,000 to 500,000 amperes) in order to minimize the quantity of small-scale power conditioning systems required to provide DC current to the electrolysers.

Looking to other electrolysis fields, high current electrolysis technology with a minimum number of high current power conditioning systems represents the state of the art for large power electrochemical processes, such as electrolysis for chlorine production and aluminium production. Thus, to advance renewable hydrogen systems at scale, unipolar electrolysers with maximized surface areas that consequently allow maximized electrical currents are highly desired.

It would be particularly desirable for a unipolar filter press electrolyser design to be configured in a tall rectangular shape, wherein (as compared to both US4490231 and U.S. Pat. No. 6,080,290A) the part count is reduced, conductivity is increased, the number of chamber-forming gaskets is reduced, the ability to operate under elevated pressures is provided, the ability to expand the electroactive structures in the direction of the current flow is provided, and additional incremental electrode plates within the filter press can be readily provided while still successfully sealing the filter press.

SUMMARY

Unipolar filter press electrolysis systems are provided in arrangements particularly preferred for large scale electrochemical processes such as alkaline water electrolysis, sodium chlorate electrolysis, and chlor-alkali electrolysis based on favourable geometries of the current carrier, circulation chamber and rigid support frame members (CCF's) disclosed herein.

The present disclosure provides an integrally combined electrically conductive current carrier, circulation chamber, and rigid support frame member for use in a unipolar electrochemical apparatus, comprising:
  a) a one-piece electrically conductive frame and circulation chamber having spaced apart opposed first and second side arms with the side arms extending at both ends thereof between first and second lateral cross members;
  b) a first generally L-shaped member with two arms with an end of one arm integrally formed with the second side arm and an end of the other arm integrally formed with the second lateral cross member to give a third channel defining aperture and a first adjacent channel defining aperture in the rigid support frame member;
  c) a second generally L-shaped member with two arms with an end of one arm integrally formed with the first side arm and an end of the other arm integrally formed with the first lateral cross member to give a fourth channel defining aperture and a second adjacent channel defining aperture in the rigid support frame member;
  d) one of the side arms configured to be connected to a power source; and
  e) the rigid support frame member having an integrally provided circulation chamber for the circulation of electrolyte, products, and reactants, and wherein the circulation chamber is formed by
    i) a depth dimension provided between opposed surface planes of said first and second side arms which is a thickness of the rigid support frame member, and
    ii) the inner dimension between the first and second side arms, and
    iii) the inner dimension between the L-shaped arm sections parallel to the lateral cross members.

The rigid support member may be a first rigid support frame member, and further comprising at least a second rigid support frame member integrally connected to and formed with the first rigid support frame member along a central frame member with the second rigid support frame member being coplanar with the first rigid support frame member. The second rigid support frame member is a mirror image of the first rigid support frame member along an axis defined by the integral connection along the central frame member between the first and second rigid support frame members to give a mirror image of the first and second lateral cross members and a mirror image of the generally L-shaped members to give two generally L-shaped members at upper and lower ends of the double current carrier, circulation chamber, and rigid support frame member to define eight apertures respectively in the double current carrier. The central frame member is configured to provide power between the outer first and second side arms and the first and second lateral cross members.

The first generally L-shaped member may further comprise one or more additional arms positioned such that the third channel defining aperture is divided to provide one or more additional channel defining apertures, the arm adjacent-most to the first channel defining aperture further comprising at least one through-point allowing liquids and/or residual gases to flow from the first channel defining aperture into adjacent-most channel defining aperture.

The present disclosure also provides a unipolar filter press electrolyser apparatus, comprising:
  a) a plurality of the integrally combined single current carrier, circulation chamber, and rigid support frame members stacked side by side each other to form a stack and being aligned such that said channel defining apertures in each support frame member align with corresponding channel defining apertures and masking frames placed in alternating channel defining apertures in all other support frame members, the plurality of support frame members including two end support frame members each one located at opposed ends of the stack;
  b) the circulation chamber in a given rigid support frame member being separated from the circulation chambers in rigid support frame members on each side of the given rigid support frame members by a separator such that said circulation chambers in each of the plurality of rigid support frame members are separated from each other;
  c) the plurality of rigid support frame members being separated from each other by sealing and electrically insulating gaskets having the same general shape and dimensions of said rigid support frame members;
  d) two end clamping plates each one located on an outside of the two end rigid support frame members for clamping the unipolar filter press electrolyser apparatus together, each of the end clamping plates including two ports, one for feeding liquids and/or gases into the stack and the other for extracting liquids and/or gases from the stack;
  e) a gasket located between each end clamping plate and its associated end rigid support frame member for insulating each end clamping plate from its associated end rigid support frame member, each of the gaskets including two apertures located therein to align with the two ports in each end clamping plate; and
  f) wherein when the unipolar filter press electrolyser apparatus is assembled, the channel defining apertures in each of the rigid support frame members and said gaskets align with each other to form flow passageways through said stack with two of the flow passageways aligned with the two ports in each end clamping plate.

The present disclosure provides a unipolar filter press electrolyser apparatus, comprising:
  a) a plurality of integrally combined double current carrier, circulation chamber, and rigid support frame members stacked side by side each other to form a double stack and being aligned such that said channel defining apertures in each double rigid support frame member align with corresponding channel defining apertures, and masking frames placed in alternating channel defining apertures, in all other support frame members, the plurality of double rigid support frame members including four individual rigid end support frame members each located at opposed ends of the stack;
  b) the circulation chambers in a given double rigid support frame member being separated from the circulation chambers in double rigid support frame members on each side of the given double rigid support frame member respectively by separators such that the circulation chambers in each of the plurality of double rigid support frame members are separated from each other;
  c) the plurality of double rigid support frame members being separated from each other by sealing and electrically insulating gaskets having the same general shape and dimensions of the individual halves of the double rigid support frame members;
  d) four end clamping plates each one located on an outside of the four end rigid support frame members for clamping the unipolar filter press electrolyser apparatus together, each of the end clamping plates including two ports, one for feeding liquids and/or gases into the stack and the other for extracting liquids and/or gases from the stack;
  e) a gasket located between each end clamping plate and its associated end rigid support frame member for insulating each end clamping plate from its associated end rigid support frame member, each of the gaskets including two apertures located therein to align with the two ports in each end clamping plate; and
  f) wherein when the unipolar filter press electrolyser apparatus is assembled, the channel defining apertures in each of the double rigid support frame members and the gaskets align with each other to form flow passageways through the double stack with eight flow passageways aligned with the two ports in each of the four end clamping plates.

The present disclosure also provides a unipolar filter press electrolyser apparatus, comprising:
  a) a plurality of integrally combined current carrier, circulation chamber, and rigid support frame members stacked side by side each other to form a stack and being aligned such that the channel defining apertures in each support frame member align with corresponding channel defining apertures, and masking frames placed in alternating channel defining apertures, in all other support frame members, the plurality of support frame members including two end support frame members each one located at opposed ends of the stack;
  b) the circulation chamber in a given rigid support frame member being separated from the circulation chambers in rigid support frame members on each side of the given rigid support frame members by a separator such that the circulation chambers in each of the plurality of rigid support frame members are separated from each other;
  c) the plurality of rigid support frame members being separated from each other by sealing and electrically insulating gaskets having the same general shape and dimensions of the rigid support frame members;
  d) two end clamping plates each one located on an outside of the two end rigid support frame members for clamping the unipolar filter press electrolyser apparatus together, each of the end clamping plates including a number of ports proportional to the number of channel defining apertures in each adjacent end rigid support frame member for feeding and extracting liquids and/or gases into and from the stack of a given polarity;
  e) a gasket located between each end clamping plate and its associated end rigid support frame member for insulating each end clamping plate from its associated end rigid support frame member, each of the gaskets including a number of apertures located therein to align with the number of ports in each end clamping plate; and f) wherein when said unipolar filter press electrolyser apparatus is assembled, the channel defining apertures in each of said rigid support frame members and the gaskets align with each other to form a number flow passageways proportional to the number of channel defining apertures through the stack with the number of flow passageways aligned with the number of ports in each end clamping plate.

The present disclosure further provides a unipolar filter press electrolyser apparatus, comprising:

a) a plurality of integrally combined double current carrier, circulation chamber, and rigid support frame members stacked side by side each other to form a double stack and being aligned such that said channel defining apertures in each support frame member align with corresponding channel defining apertures, and masking frames placed in alternating channel defining apertures, in all other support frame members, the plurality of support frame members including four individual end support frame members each one located at opposed ends of the stack;

b) the circulation chambers in a given double rigid support frame member being separated from the circulation chambers in double rigid support frame members on each side of the given double rigid support frame member respectively by separators such that the circulation chambers in each of the plurality of double rigid support frame members are separated from each other;

c) the plurality of double rigid support frame members being separated from each other by sealing and electrically insulating gaskets having the same general shape and dimensions of the individual halves of the double rigid support frame members;

d) four end clamping plates each one located on an outside of the four end rigid support frame members for clamping the unipolar filter press electrolyser apparatus together, each of the end clamping plates including a number of ports proportional to the number of channel defining apertures in each adjacent end rigid support frame member for feeding and extracting liquids and/or gases into and from the stack of a given polarity;

e) a gasket located between each end clamping plate and its associated end rigid support frame member for insulating each end clamping plate from its associated end rigid support frame member, each of the gaskets including a number of apertures located therein to align with the number of ports in each end clamping plate; and f) wherein when the unipolar filter press electrolyser apparatus is assembled, the channel defining apertures in each of the double rigid support frame members and the gaskets align with each other to form flow passageways through the double stack with said number of flow passageways aligned with the number of ports for gas/liquid product feed/discharge of a given polarity in each of the four end clamping plates.

The present disclosure further provides a unipolar filter press multi-cell block apparatus, expanded laterally and electrically in series by means of overlapping halves of the double rigid support frame members therein, such that one double rigid support frame member is shared between two laterally adjacent unipolar electrochemical cells, such that current passes in series between said laterally adjacent unipolar electrochemical cells, such that the multi-cell block in total comprises 3 or more unipolar electrochemical cells connected laterally in series by means of said shared double rigid support frame members, each unipolar cell being further capable of expanding longitudinally electrically in parallel to suit the surface area per cell required for the multi-cell block's application, and such that said sealing gaskets masking frames and clamping plates are proportionally scaled to the requirements of the multi-cell block such that the system may be sealed and clamped, and gases and liquids may be fed and discharged therefrom.

A further understanding of the functional and advantageous aspects of the present disclosure can be realized by reference to the following detailed description and drawings.

BRIEF DESCRIPTION OF THE SEVERAL VIEWS OF THE DRAWINGS

Embodiments will now be described, by way of example only, with reference to the accompanying drawings, in which.

DETAILED DESCRIPTION

Figure 1A:
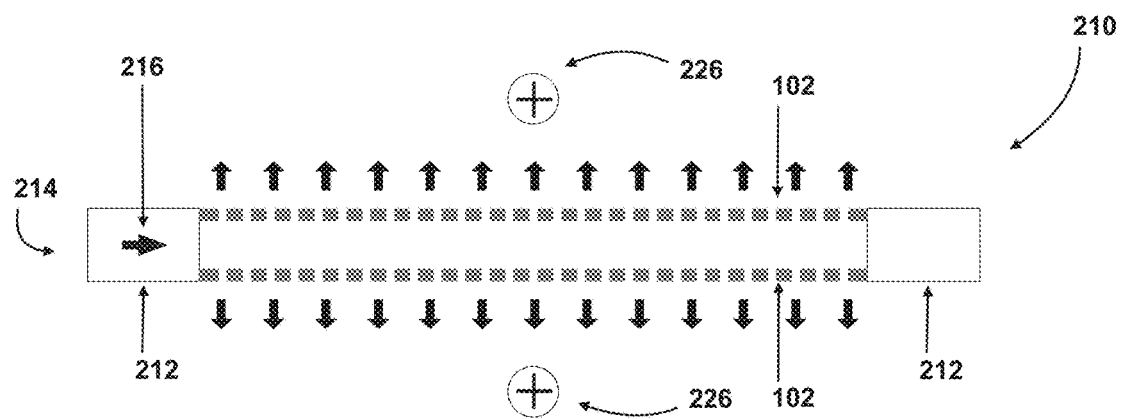
FIG. 1A shows the top down view of a base current carrying half-cell unit of a unipolar electrochemical filter press device, comprising electroactive structures of the same polarity on opposing sides of the current carrier configured electrically in parallel.

Various embodiments and aspects of the disclosure will be described with reference to details discussed below. The following description and drawings are illustrative of the disclosure and are not to be construed as limiting the disclosure. The figures are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein, the terms "generally" and "essentially" are meant to refer to the general overall physical and geometric appearance of a feature and should not be construed as preferred or advantageous over other configurations disclosed herein.

As used herein, the terms "stack" or "filter press stack" or "filter press" is meant to refer to, but not exclusively, the general configuration of the assembled unipolar electrochemical device in a filter press configuration.

As used herein, the phrase "electroactive structures" or "electroactive surfaces" refers to conductive screens, expanded metal and perforated plates, essentially flat and thin in shape which may or may not be coated with a catalyst, depending on the electroactive material and electrochemical reaction it is intended for in the particular stack.

As used herein, the phrase "sealing profile" refers to the profile along the longitudinal axis of a filter press electrolyser, defined by the outer boundaries of all components within said filter press electrolyser which serve a function of forming an external seal that prevents fluids leaking from the interior of the filter press to the external atmosphere, said components including but not limited to gasketing and masking components.

As used herein, the phrase "generally L-shaped" includes shapes that are not strictly "L-shaped." For example, a "generally L-shaped" member may be formed as a passageway defining structure, such that adjacent passageways are formed complementary to each other in a filter press stack.

PARTS LIST

FIG. 1A: Unipolar Current Carrying Configuration
FIG. 1B: Monopolar Current Carrying Configuration
FIG. 1C: Bipolar Current Carrying Configuration
210—top-down view and cross section of the electroactive region of a basic unipolar current carrying configuration with electroactive structures attached;
212—top-down view and cross section of the current carrier;
214—power input into the cell;
102—electrically conductive mesh, perforated or slotted sheet, expanded sheet, screens, woven mesh or similar appropriate planar configuration thereof forming the anodic electroactive structure and designated as an anodic mesh with the positive sign in FIG. 2;
216—Current entering from the side of the configuration, and travelling in parallel with the surface of electroactive structure 102;
218—top-down view and cross section of the electroactive region of a basic monopolar current carrying configuration with an electroactive structure attached;
220—top-down view and cross section of the electroactive region of a basic bipolar current carrying configuration;
222—top-down view and cross section of a conductive bipolar wall;
224—Current entering orthogonally to the conductive bipolar wall and traveling orthogonally through it;
226—positive electroactive region;
228—negative electroactive region;
FIG. 2: Isometric Full Assembly of Single CCF Parts
FIG. 3A: Single CCF
FIG. 3B: Single CCF with Electroactive Structures
FIG. 3C: Various Electroactive Structures
FIG. 3D: Gasket Support Pieces
FIG. 3E: Anode and Cathode Variations
FIG. 3F: Alternative Integrally Provided Gasket Support Pieces FIG. 3G: Alternative Integrally Provided Gasket Support Pieces in CCFs 10—the assembled stack 12—first of two end clamping plates (also referred to as an end plate);

14—first full faced gasket with two pathways defining apertures 110 and 111 connecting between the first monopolar CCF 21 and first clamping plate 12 and second full faced gasket with two pathways defining apertures 94 and 109 connecting with the second monopolar CCF 21 and second clamping plate 34;

20—electrically conductive current carrier circulation chamber and frame (double faced CCF) of positive polarity;

21—electrically conductive current carrier circulation chamber and frame (single faced CCF) of negative polarity;

22, 24—masking frames;

26—electrically conductive mesh, perforated or slotted sheet, expanded sheet, screens, woven mesh or similar appropriate planar configuration thereof forming the cathodic electroactive structure with the − sign in FIG. 2;

28—separator;

30—sealing and electrically insulating gasket between CCF's of different polarities;

34—second of two end clamping plates (also referred to as an end plate);

40—non-limiting example of a planar electroactive structure material comprising a continuous sheet of circular perforations;

41—non-limiting example of a planar electroactive structure, comprising a continuous perforated sheet of continuous slots;

42—non-limiting example of a planar electroactive structure, comprising a continuous slotted sheet;

43—non-limiting example of a planar electroactive structure, comprising a continuous sheet of hexagonal perforations;

44—non-limiting example of a planar electroactive structure, comprising a continuous expanded metal sheet;

45—non-limiting example of a planar electroactive structure, comprising a continuous woven mesh;

48—first tubular port for feeding or extracting products to/from end plate 34;

49—first tubular port for feeding or extracting products to/from end plate 12;

50—electrically conductive metal frame circulation chamber and current carrier, generic for CCF's 20 and 21;

50A—exemplary cathodic embodiment of conductive metal frame circulation chamber and current carrier 50;

50B—exemplary anodic embodiment of conductive metal frame and current carrier electrically conductive metal frame and current carrier, generic for CCF's 20 and 21;

51—long side section of frames 50, 68, 74, 85, 350, 368, 374, 385, 450, 550;

52—first channel defining aperture in frame 20;

53—short side section of frame 50, 68, 74, 85;

54—third channel defining aperture in frame 20;

55—opposing long side section of frames 50, 68, 74, 85;

56—non-limiting channel defining gasket support pieces; with channels provided therein to control product and reactant passage into and out of apertures through the provision of channels of a defined size and shape;

56A—non-limiting friction-fit insertion points for gasket support pieces 56 to be received 56B—channel defining gasket support pieces provided integrally as part of the CCF embodiment of 50 to control product and reactant passage into and out of a CCF through the provision of channels;

56C—channel defining gasket support pieces provided integrally as part of the CCF embodiment of 50 to control product and reactant passage into and out of a CCF through the provision of an aperture;

56D—channel defining gasket support pieces provided integrally as part of the CCF embodiment of 50 to control product and reactant passage into and out of a CCF by means of one or more supportive T-shaped gasket support pieces;

56E, 56F—channel defining gasket support pieces provided integrally as part of the CCF embodiment of 50 to control product and reactant passage into and out of a CCF by means of one or more negative T shapes embedded in the integrally provided gasket support;

57—second tubular port for feeding or extracting products to/from end plate 34;

59—tubular port for feeding or extracting products to/from plate 34;

63—first delimiting conducting strut between circulation chamber 103 and channel defining apertures 52 and 54;

64—electrically conductive tab for connection to a source of power;

64A—serrations provided in the electrically conductive tab 64

66—first notch;

67—second notch;

78—fourth channel defining aperture in frame 50;

79—cut-outs provided in a CCF;

80—second channel defining aperture in frame 50 shown by 80 in frame 20 but by 100 in frame 21 of FIG. 2;

90—third channel defining apertures in gasket 30;

94—first channel defining aperture in second gasket 14

98—first channel defining aperture in frame 21;

99—third channel defining aperture in frame 21;

100—fourth channel defining aperture in frame 21;

101—second channel defining aperture in frame 21;

102—electrically conductive mesh, perforated or slotted sheet, expanded sheet, screens, woven mesh or similar appropriate planar configuration thereof forming the anodic electroactive structure and designated as an anodic mesh with the + sign in FIG. 2;

103—circulation chamber, provided by the CCF depth 103A;

103A—depth dimension of circulation chamber 103

Figure 4A:
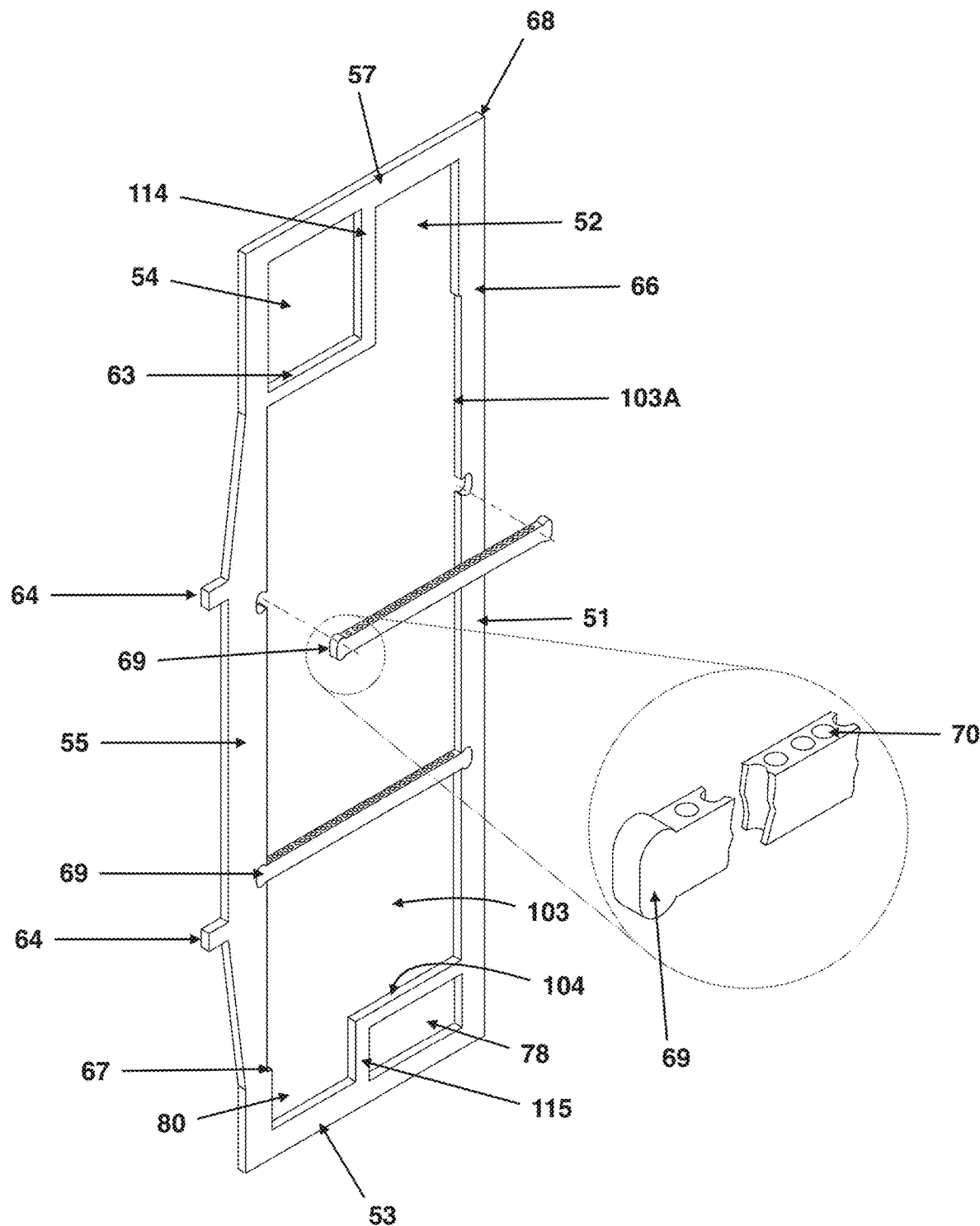
FIG. 4A shows an isometric view of a unitary current carrier, product circulation chamber, and structural frame provided in one part according to the present disclosure for use in unipolar filter press type electrochemical devices with additional perforated rungs to improve current carrying capabilities and part performance under pressurization.

104—second delimiting conducting strut between circulation chamber 103 and channel defining aperture 78;

106—first channel defining aperture in gasket 30;

107—second channel defining aperture in gasket 30;

108—fourth channel defining aperture in gasket 30;

109—second channel defining aperture in second gasket 14;

110—first channel defining aperture in first gasket 14;

111—second channel defining aperture in first gasket 14;

114—strut delimiting the apertures 52 and 54 at first end of frame 50, 68, 74, 85;

115—strut delimiting the apertures 78 and 80 at second end of frame 50, 68, 74, 85;

116—first channel forming embodiment formed through port 48 in end plate 34, and apertures 94, 98, 106, and 52;

117—second channel forming embodiment formed through port 57 in second clamping plate 34, and apertures 109, 101, 107, and 80;

118—third channel forming embodiment formed through port 49 in end plate 12, and apertures 110, 99, 90, 54, 90, and 99;

119—fourth channel forming embodiment formed through port 59 in end plate 12, 111, 100, 108, 78, 108 and 100;

120—non-limiting example of a gasket support piece with slotted channels provided therein to control product and reactant passage into and out of apertures through the provision of channels of a defined size and shape;

121—non-limiting example of a gasket support piece with wave-like channels provided therein to control product and reactant passage into and out of apertures through the provision of channels of a defined size and shape;

122—non-limiting example of a gasket support piece wherein channels are punched, stamped, drill pressed, or inserted by other mechanical means within the piece to control product and reactant passage into and out of apertures through the provision of channels of a defined size and shape;

FIG. 4A: Single CCF with Conductive "Dog Bones"

Figure 4B:
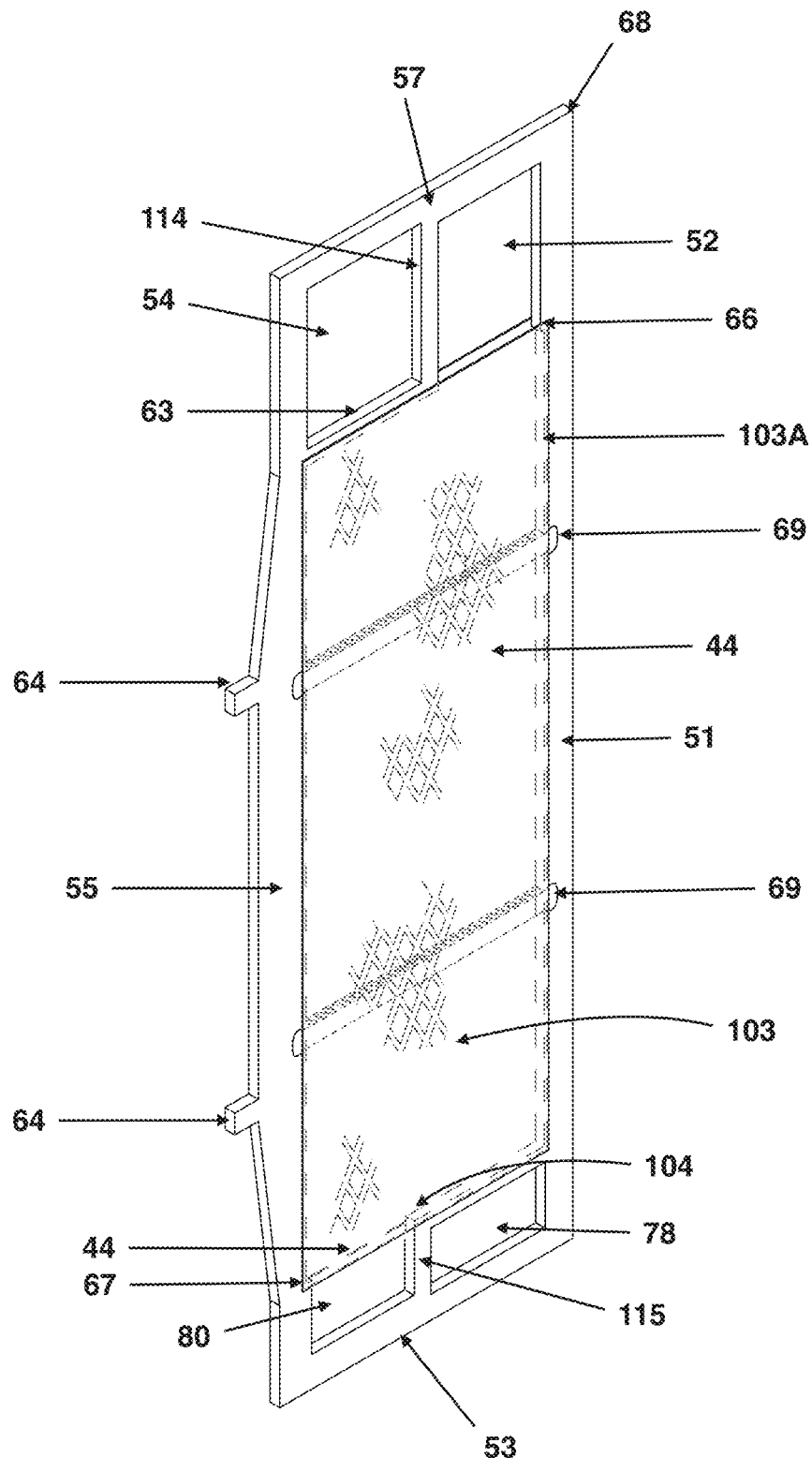
FIG. 4B shows an isometric view of a unitary current carrier, product circulation chamber, and structural frame of FIG. 4A additionally comprising exemplary electroactive structures on opposing sides of the part.

FIG. 4B: Single CCF with Conductive "Dog Bones" and Electroactive Structures

44—non-limiting example of a planar electroactive structure, comprising a continuous expanded metal sheet;

51—long side section of frames 50, 68, 74, 85, 350, 368, 374, 385, 450, 550;

53—short side section of frame 50, 68, 74, 85;

55—opposing long side section of frames 50, 68, 74, 85;

68—Frame of single CCF with dog bones (electrically conductive metal frame circulation chamber and current carrier, could be substituted equivalently for CCF's 20 and 21)

66—first notch;

67—second notch;

69—Big dog bones (removable electrically conductive struts across circulation chamber 103)

70—holes in the dog bone rungs (portion of strut 69 which is a channel defining strut section; the channel defining strut section being punched, stamped, drill pressed, or inserted by other mechanical means within strut 69)

Figure 5A:
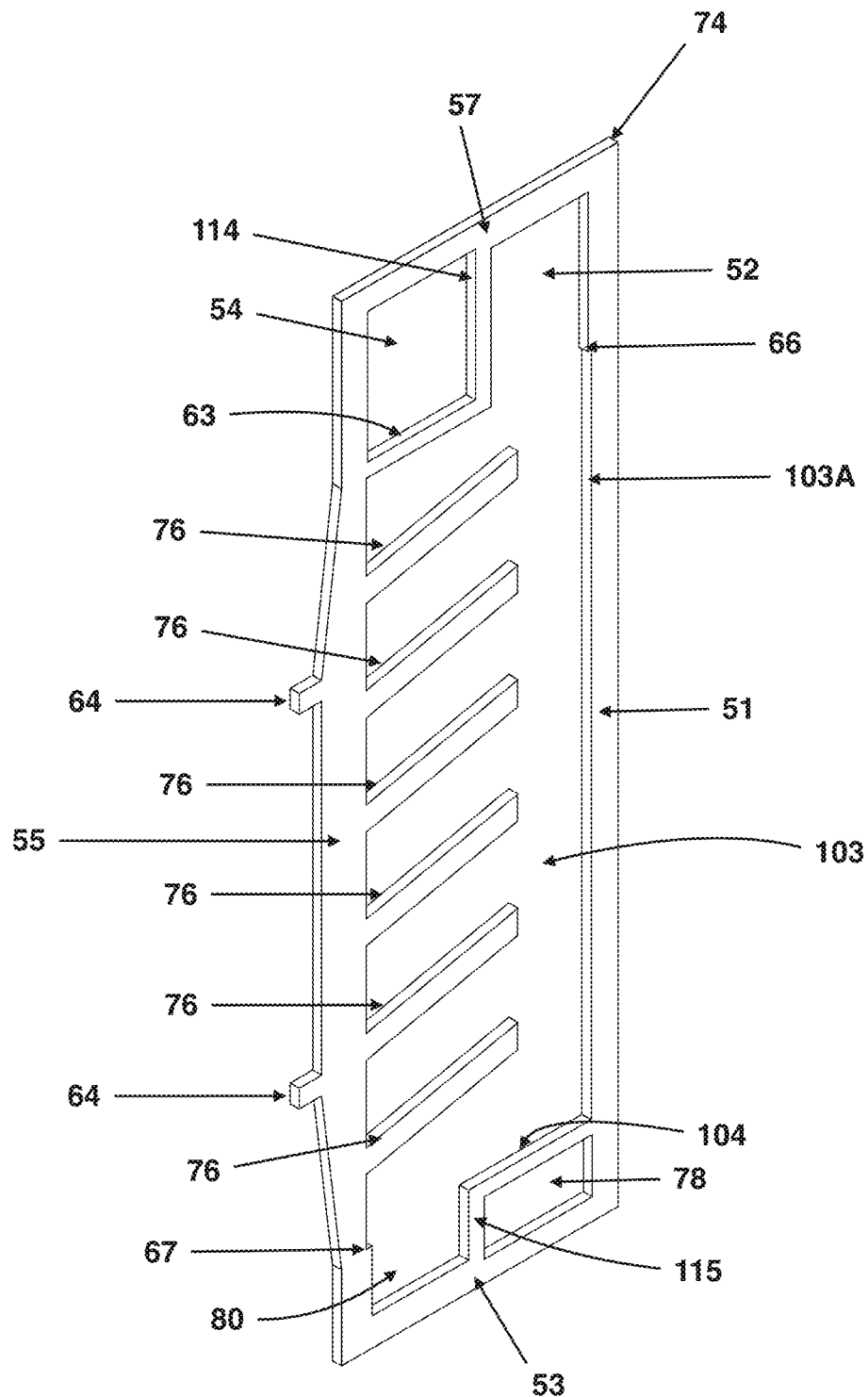
FIG. 5A shows an isometric view of a unitary current carrier, product circulation chamber, and structural frame provided in one part according to the present disclosure for use in unipolar filter press type electrochemical devices, with diagonally oriented spears provided from the same unitary part to concentrate current carrying capabilities and product generation near the electrical input source, consequently allocating the remaining space for generated products to exit the circulation chamber.

103—circulation chamber, provided by the CCF depth;

103A—depth dimension of circulation chamber 103;

114—strut delimiting the apertures 52 and 54 at first end of frame 50, 68, 74, 85;

115—strut delimiting the apertures 78 and 80 at second end of frame 50, 68, 74, 85;

FIG. 5A: Single CCF with Conductive Spears

Figure 5B:
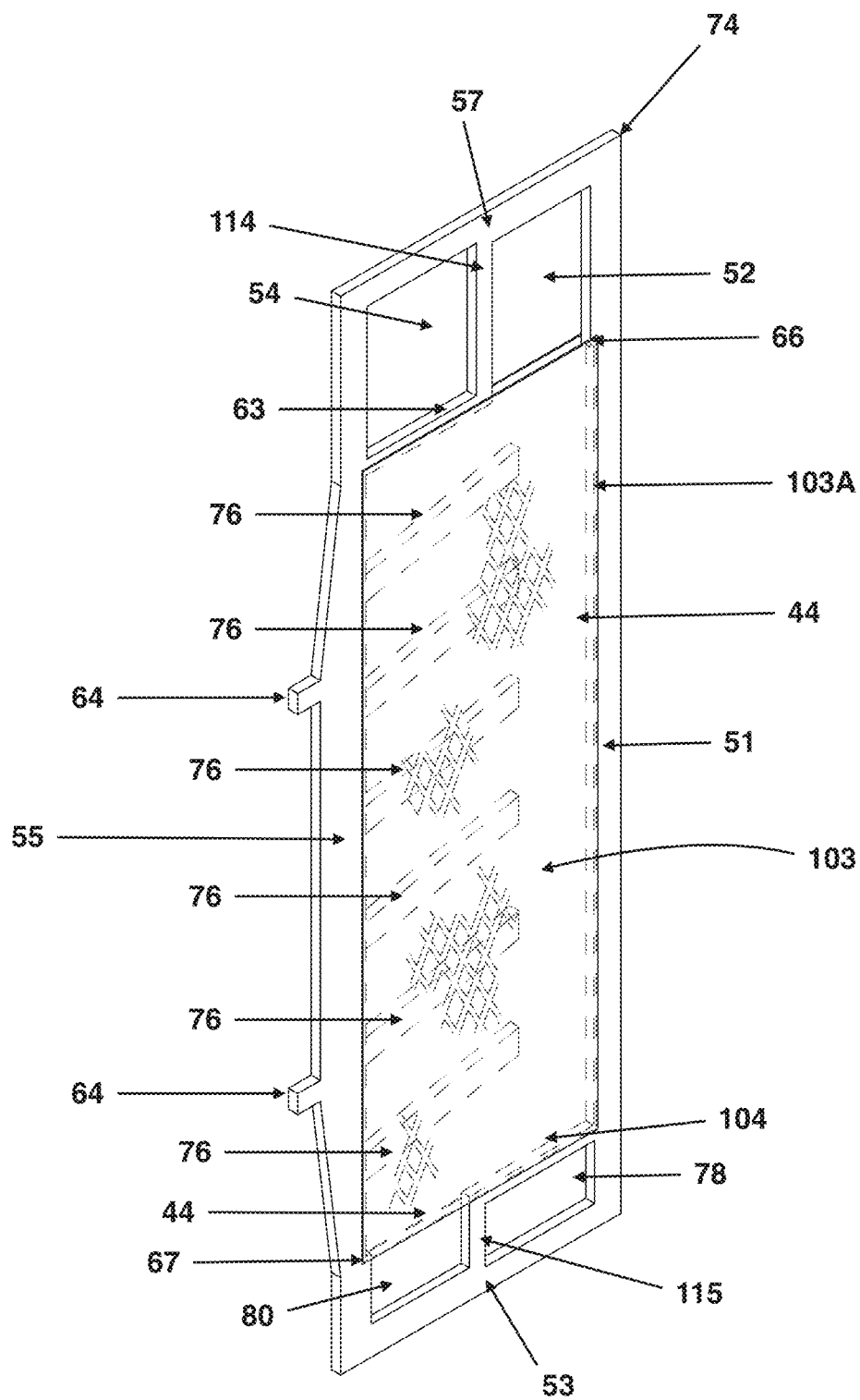
FIG. 5B shows an isometric view of the unitary current carrier, product circulation chamber, and structural frame of FIG. 5A additionally comprising exemplary electroactive structures on opposing sides of the part.

FIG. 5B: Single CCF with Conductive Spears and Electroactive Structures

Figure 6A:
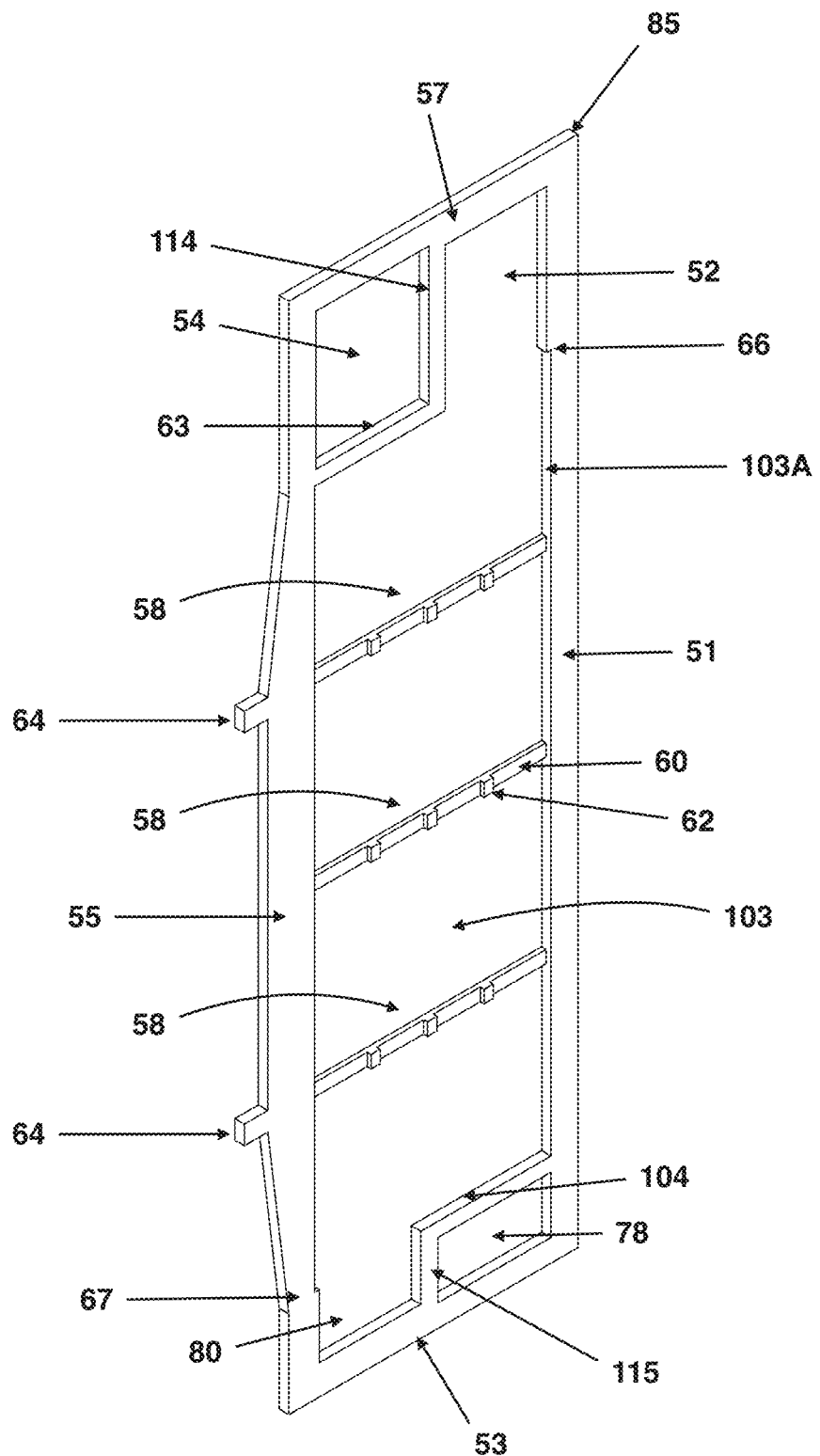
FIG. 6A shows an isometric view of a unitary current carrier, product circulation chamber, and structural frame provided in one part according to the present disclosure for use in unipolar filter press type electrochemical devices with additional rungs provided from the same unitary part to improve current carrying capabilities and part performance under pressurization, further provided with intra-rung channels to create product exit pathways and provide designated sites for intra-rung electroactive structure attachment.
Figure 7:
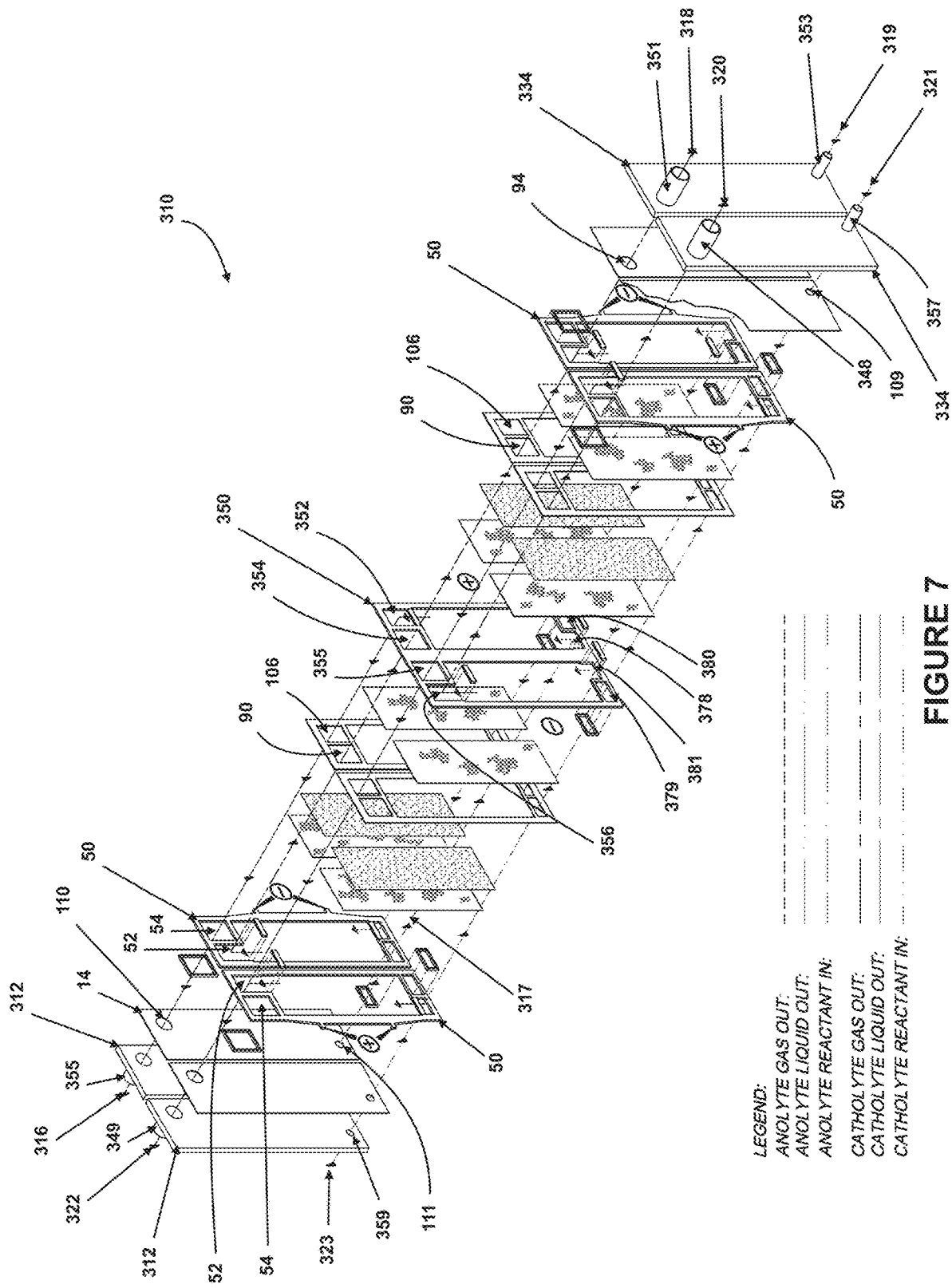
FIG. 7 shows a disassembled isometric view of a unipolar filter press electrochemical device based upon a combination of the parts of FIG. 8A and FIG. 3A.

44—non-limiting example of a planar electroactive structure, comprising a continuous expanded metal sheet;

51—long side section of frames 50, 68, 74, 85, 350, 368, 374, 385, 450, 550;

55—opposing long side section of frames 50, 68, 74, 85;

53—short side section of frame 50, 68, 74, 85;

66—first notch,

67—second notch,

74—Frame of single CCF with spears (Electrically conductive metal frame circulation chamber and current carrier, could be substituted equivalently for CCF's 20 and 21 in FIG. 2 and FIG. 7);

74A—CCF 74 employing spears 76A;

76—"Spears" of single CCF 74 (diagonally oriented spear-protrusions provided as part of 74, located adjacent to where power is to be provided in the frame);

76A—an alternate embodiment of spears 76;

103—circulation chamber, provided by the CCF depth;

103A—depth dimension of circulation chamber 103;

114—strut delimiting the apertures 52 and 54 at first end of frame 50, 68, 74, 85;

115—strut delimiting the apertures 78 and 80 at second end of frame 50, 68, 74, 85;

FIG. 6A: Single CCF with Conductive Struts

Figure 6B:
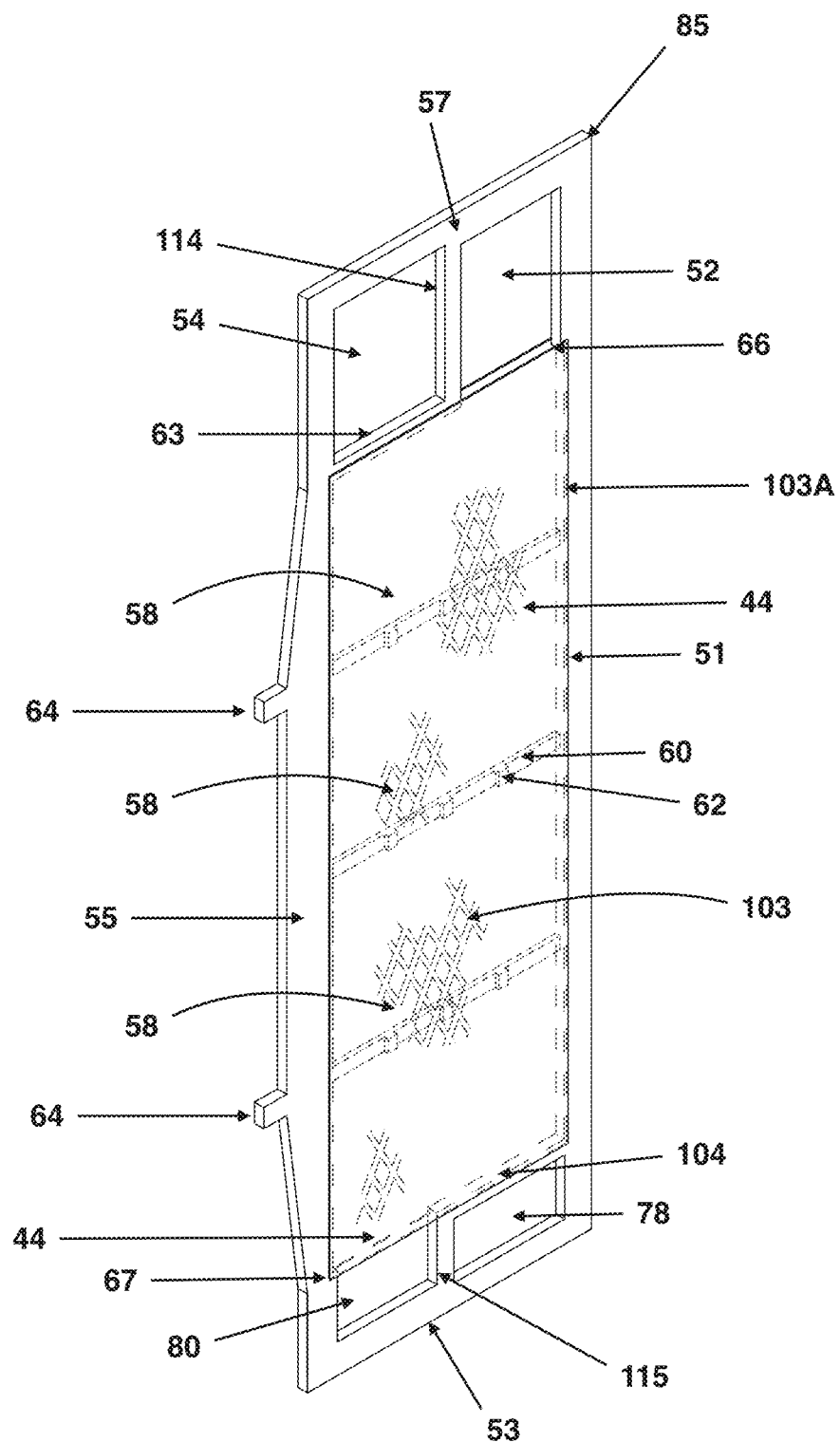
FIG. 6B shows an isometric view of a unitary current carrier, product circulation chamber, and structural frame of FIG. 6A additionally comprising exemplary electroactive structures on opposing sides of the part.

FIG. 6B: Single CCF with Conductive Struts and Electroactive Structures

44—non-limiting example of a planar electroactive structure, comprising a continuous expanded metal sheet;

51—long side section of frames 50, 68, 74, 85, 350, 368, 374, 385, 450, 550;

53—short side section of frame 50, 68, 74, 85;

58—electrically conductive struts across circulation chamber 103;

60—portion of strut 58 which is a channel defining strut section;

62—raised portions of struts 58 used as attachment points for the electroactive structure;

66—first notch;

67—second notch;

85—electrically conductive metal frame circulation chamber and current carrier, could be substituted equivalently for CCF's 20 and 21;

103—circulation chamber, provided by the CCF depth;

103A—depth dimension of circulation chamber 103

114—strut delimiting the apertures 52 and 54 at first end of frame 50, 68, 74, 85;

115—strut delimiting the apertures 78 and 80 at second end of frame 50, 68, 74, 85;

FIG. 7: Isometric Full Assembly of Double and Single CCF Parts

310—the assembled stack of combined double and single CCFs;

312—first of two end clamping plates (also referred to as an end plate);

316—first channel forming embodiment formed through port 355 in first end clamping plate 312, and apertures 110, 54, 106, 352;

317—second channel forming embodiment formed through port 356 in first end plate 312 (obscured by first right-hand gasket 14), 111, 78, 107, 380;

318—third channel forming embodiment formed through port 351 in first end plate 334, and apertures 94, 52, 90, 354 of double CCF 350, 90 and 52;

319—fourth channel forming embodiment formed through port 353 in first end clamping plate 334, and apertures 109, 80, 108, 378, 108, 80;

320—fifth channel forming embodiment formed through port 348 connecting to second end plate 334, and apertures 94 (not shown due to cutaway), 54, 90, 356;

321—sixth channel forming embodiment formed through port 357 in second end plate 334, and apertures 109, 78, 108, and 381

322—seventh channel forming embodiment formed through port 349 in second end plate 312, and aperture 110, 52, 106, 355 in double CCF 350, 106, 52;

323—eighth channel forming embodiment formed through port 359 in second end plate 312, and apertures 111, 80, 107, 379, 107, and 80;

334—second of two end clamping plates (also referred to as an end plate);

350—Basic double CCF Frame ("double" electrically conductive metal frame circulation chamber and current carrier utilized in the assembly stack in FIG. 7)

Figure 8A:
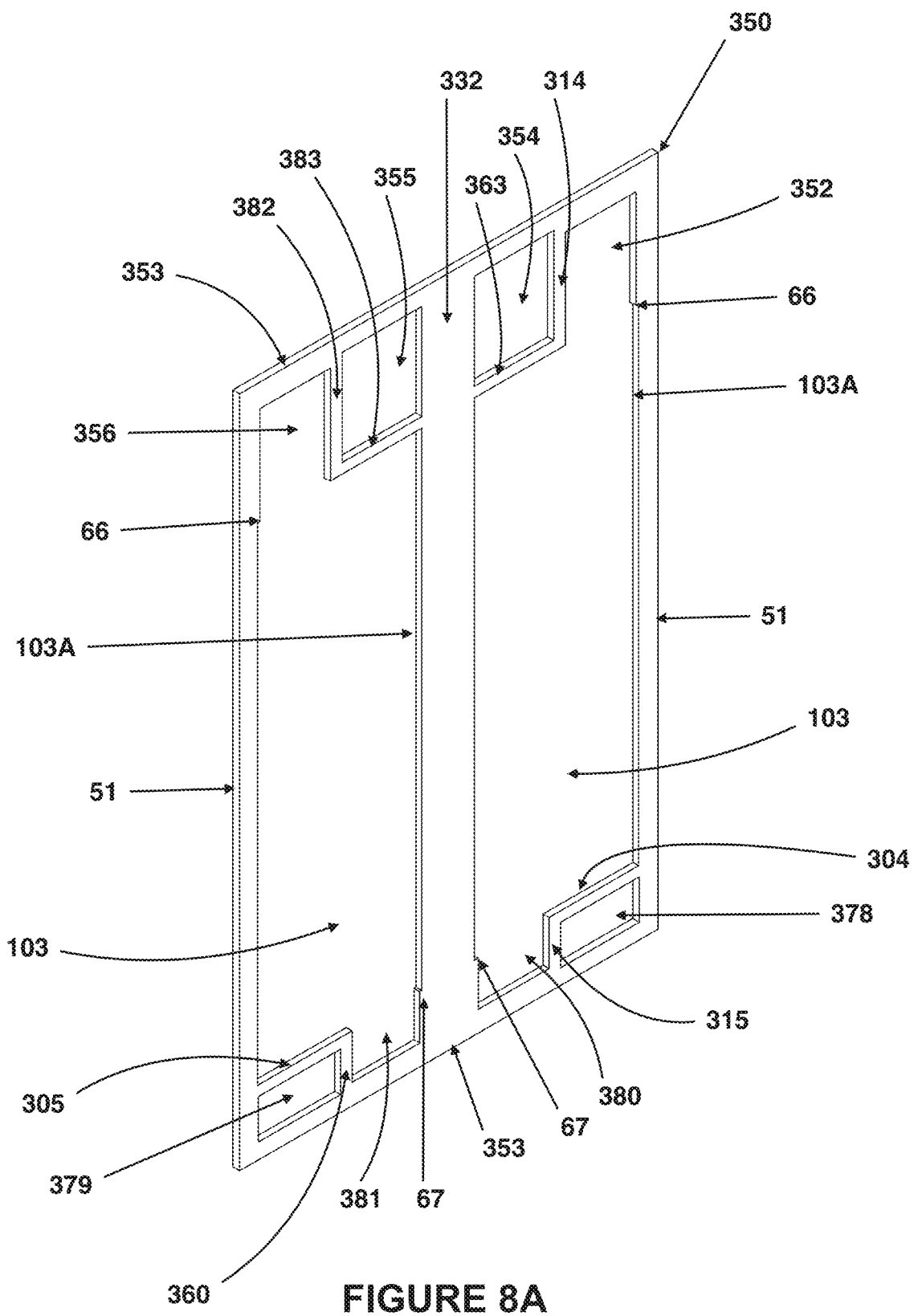
FIG. 8A shows an isometric view of a unitary part for use in unipolar filter press type electrochemical devices according to the present disclosure wherein a current carrier and structural frame are shared by two distinct product circulation chambers provided in the same unitary part.

348—first tubular port for feeding or extracting products to/from end plate 334;

357—second tubular port for feeding or extracting products to/from end plate 334;

351—third tubular port for feeding or extracting products to/from end plate 334;

353—fourth tubular port for feeding or extracting products to/from end plate 334;

349—(top) first tubular port for feeding or extracting products to/from end plate 312;

359—(bottom) second tubular port for feeding or extracting products to/from end plate 312;

355—(top) third tubular port for feeding or extracting products to/from end plate 312;

356—(bottom) fourth tubular port for feeding or extracting products to/from end plate 312; (not shown but equivalent to 353 in 434);

398—first channel defining aperture in frame 21;

399—third channel defining aperture in frame 21;

FIG. 8A: Double CCF

Figure 8B:
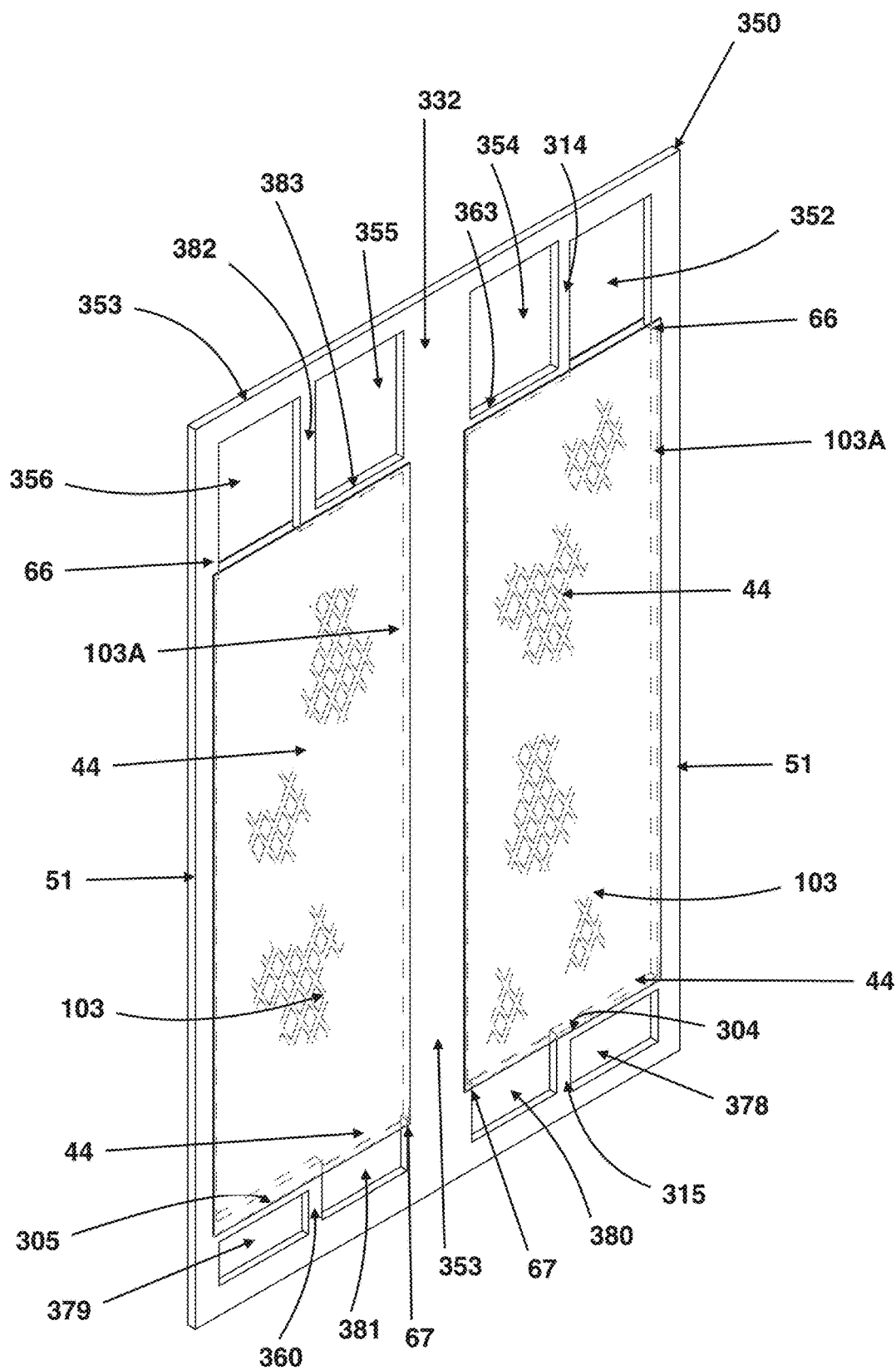
FIG. 8B shows an isometric view of the unitary part for use in unipolar filter press type electrochemical devices of FIG. 8A additionally comprising exemplary electroactive structures on opposing sides of the part.

FIG. 8B: Double CCF with Electroactive Structures

44—non-limiting example of a planar electroactive structure, comprising a continuous expanded metal sheet;

51—long side section of frames 50, 68, 74, 85, 350, 368, 374, 385, 450, 550;

66—first notch;

67—second notch;

103—circulation chamber, provided by the CCF depth;

103A—depth dimension of circulation chamber 103

Figure 9A:
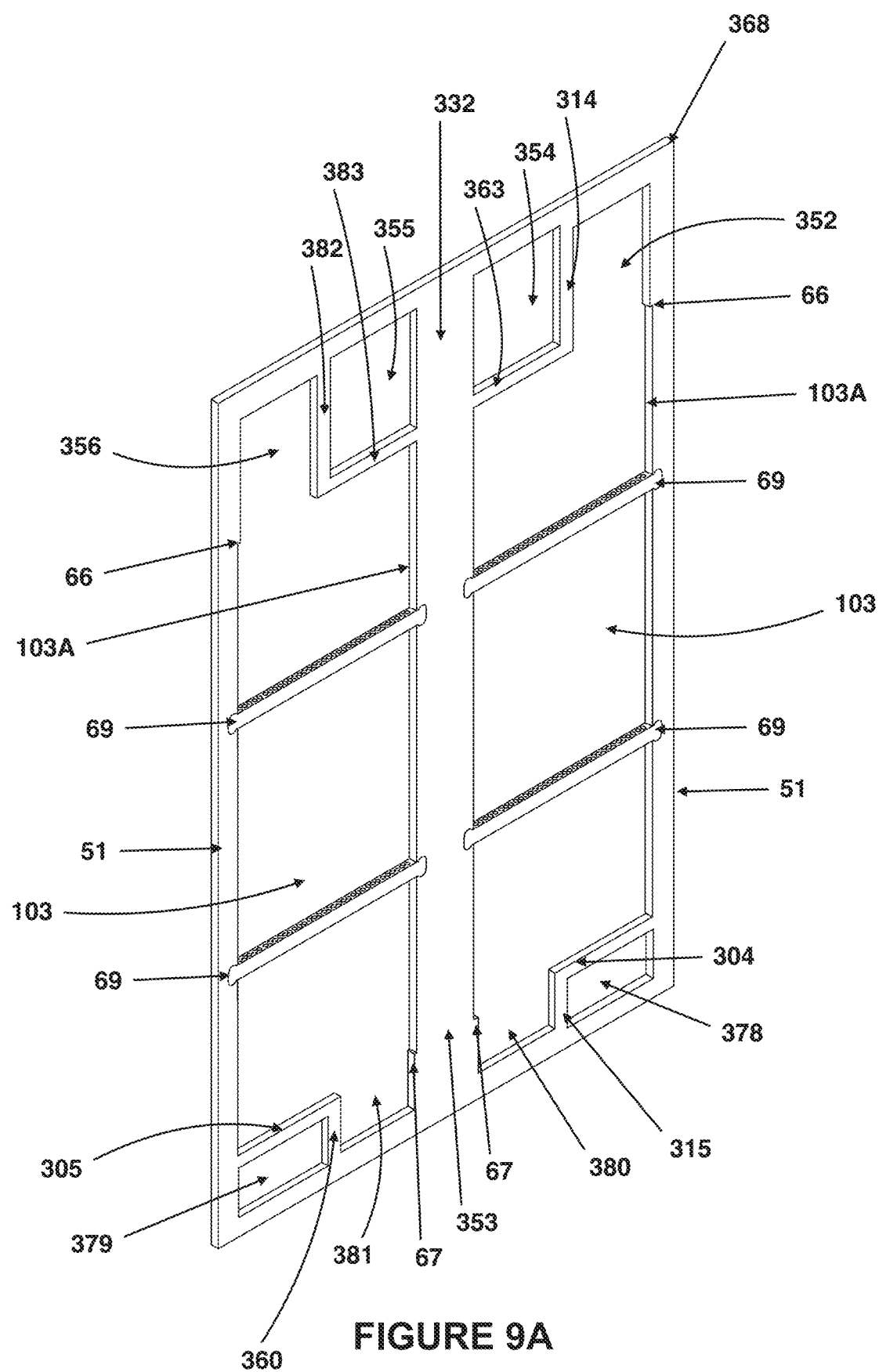
FIG. 9A shows an isometric view of a unitary part for use in unipolar filter press type electrochemical devices according to the present disclosure wherein a current carrier and structural frame are shared by two distinct product circulation chambers provided in the same unitary part with additional perforated rungs to improve current carrying capabilities and part performance under pressurization.

304—second delimiting conducting strut between circulation chamber 103 and channel defining aperture 378;

305—second delimiting conducting strut between circulation chamber 103 and channel defining aperture 379;

314—strut delimiting the apertures 352 and 354 at first end of frame 350, 368, 374, 385;

315—strut delimiting the apertures 378 and 380 at second end of frame 350, 368, 374, 385;

332—central axis of frame 350, 368, 374, 385, 450, 550, wherein current enters both of the product circulation chambers 103;

350—Basic double CCF Frame ("double" electrically conductive metal frame circulation chamber and current carrier utilized in the assembly stack in FIG. 7);

352—first channel defining aperture of frame 350, 368, 374, 385;

353—short side section of frame 350, 368, 374, 385, 450, 550;

354—third channel defining aperture of frame 350, 368, 374, 385;

355—seventh channel defining aperture of frame 350, 368, 374, 385;

356—fifth channel defining aperture of frame 350, 368, 374, 385;

360—strut delimiting the apertures 379 and 381 at second end of frame 350, 368, 374, 385;

363—first delimiting conducting strut between circulation chamber 103 and channel defining aperture 354;

378—fourth channel defining aperture in frame 350, 368, 374, 385;

379—eighth channel defining aperture in frame 350, 368, 374, 385;

380—second channel defining aperture in frame 350, 368, 374, 385;

381—sixth channel defining aperture of frame 350, 368, 374, 385;

382—strut delimiting the apertures 356 and 355 at first end of frame 350, 368, 374, 385;

383—first delimiting conducting strut between circulation chamber 103 and channel defining aperture 355;

FIG. 9A: Double CCF with "Dog Bones"

Figure 9B:
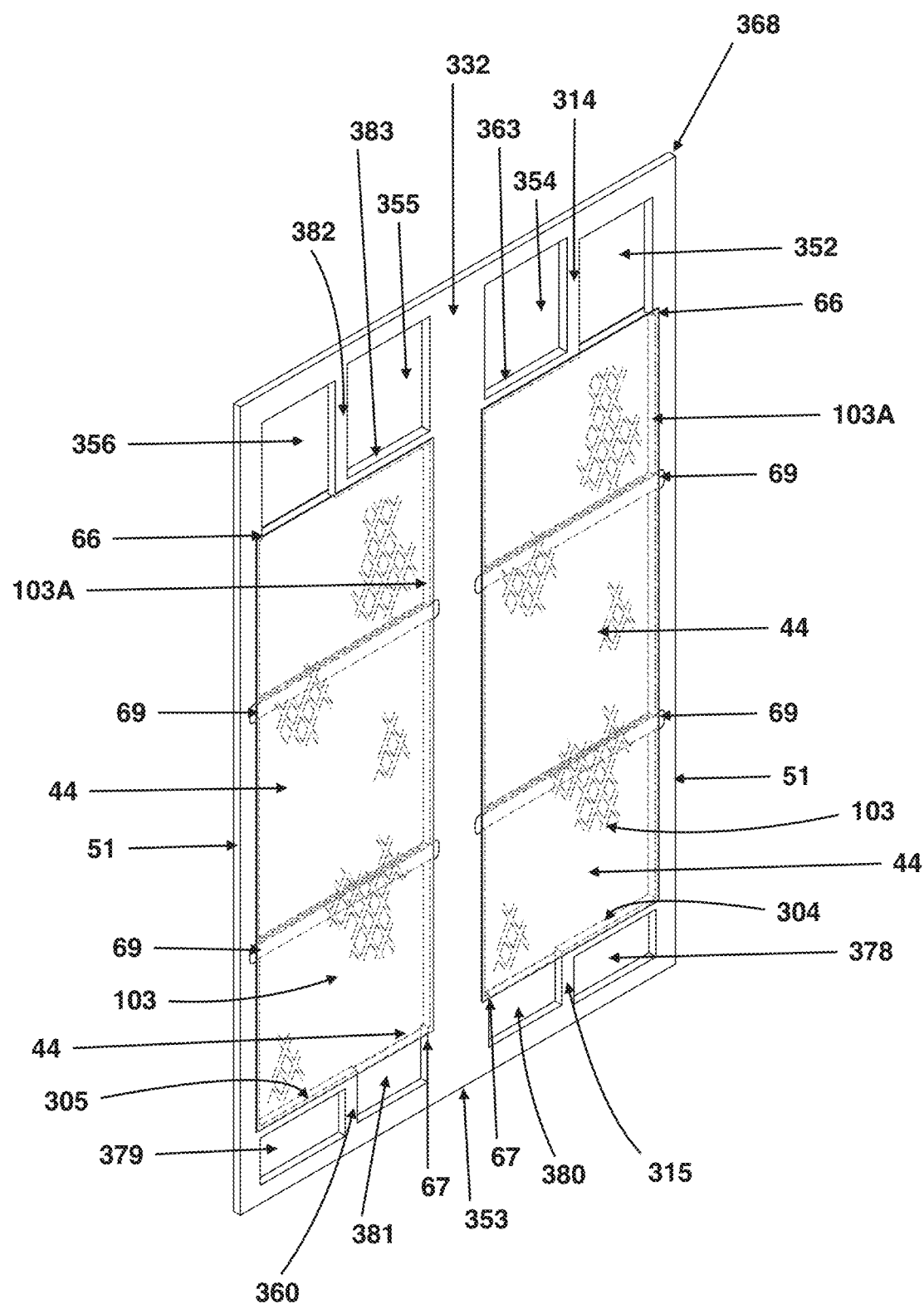
FIG. 9B shows an isometric view of the unitary part for use in unipolar filter press type electrochemical devices of FIG. 9A additionally comprising exemplary electroactive structures on opposing sides of the part.

FIG. 9B: Double CCF with "Dog Bones" and Electroactive Structures

44—non-limiting example of a planar electroactive structure, comprising a continuous expanded metal sheet;

51—long side section of frames 50, 68, 74, 85, 350, 368, 374, 385, 450, 550;

66—first notch;

67—second notch;

69—Big dog bones (removable electrically conductive struts across circulation chamber 103);

103—circulation chamber, provided by the CCF depth;

103A—depth dimension of circulation chamber 103

Figure 10A:
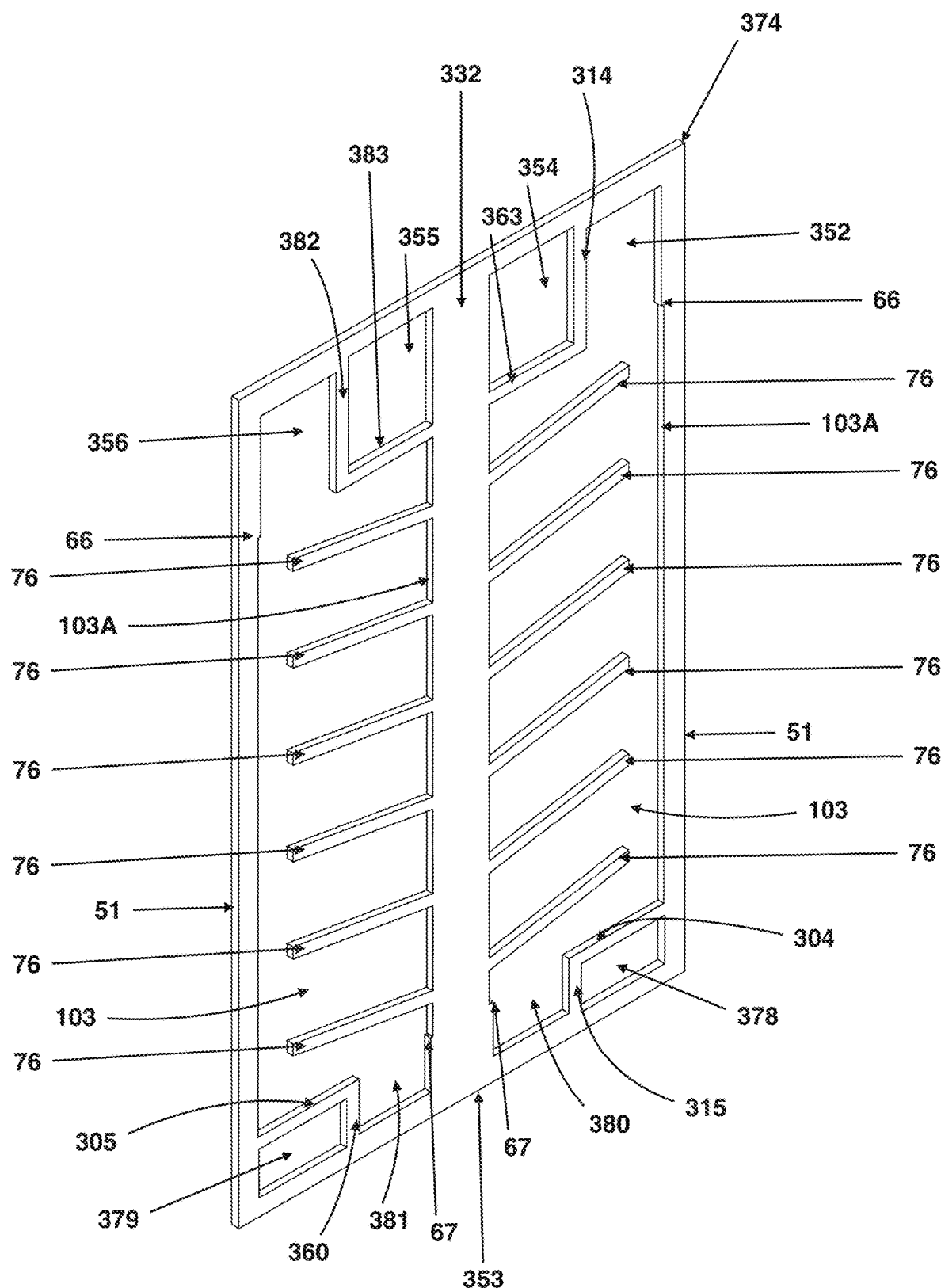
FIG. 10A shows an isometric view of a unitary part for use in unipolar filter press type electrochemical devices according to the present disclosure wherein a current carrier and structural frame are shared by two distinct product circulation chambers provided in the same unitary part with diagonally oriented spears provided from the same unitary part to concentrate current carrying capabilities and product generation near the electrical input source and consequently allocate the remaining space for generated products to exit the circulation chambers.

304—second delimiting conducting strut between circulation chamber 103 and channel defining aperture 378;

305—second delimiting conducting strut between circulation chamber 103 and channel defining aperture 379;

314—strut delimiting the apertures 352 and 354 at first end of frame 350, 368, 374, 385;

315—strut delimiting the apertures 378 and 380 at second end of frame 350, 368, 374, 385;

332—central axis of frame 350, 368, 374, 385, 450, 550, wherein current enters both of the product circulation chambers 103;

352—first channel defining aperture of frame 350, 368, 374, 385;

353—short side section of frame 350, 368, 374, 385, 450, 550;

354—third channel defining aperture of frame 350, 368, 374, 385;

355—seventh channel defining aperture of frame 350, 368, 374, 385;

356—fifth channel defining aperture of frame 350, 368, 374, 385;

360—strut delimiting the apertures 379 and 381 at second end of frame 350, 368, 374, 385;

363—first delimiting conducting strut between circulation chamber 103 and channel defining aperture 354;

368- to double CCF with dog bones (electrically conductive metal frame circulation chamber and current carrier with removable conductive struts with manufactured channels that can be equivalently utilized in the assembly stack in FIG. 7);

378—fourth channel defining aperture in frame 350, 368, 374, 385;

379—eighth channel defining aperture in frame 350, 368, 374, 385;

380—second channel defining aperture in frame 350, 368, 374, 385;

381—sixth channel defining aperture of frame 350, 368, 374, 385;

382—strut delimiting the apertures 356 and 355 at first end of frame 350, 368, 374, 385;

383—first delimiting conducting strut between circulation chamber 103 and channel defining aperture 355;

FIG. 10A: Double CCF with Conductive Spears

Figure 10B:
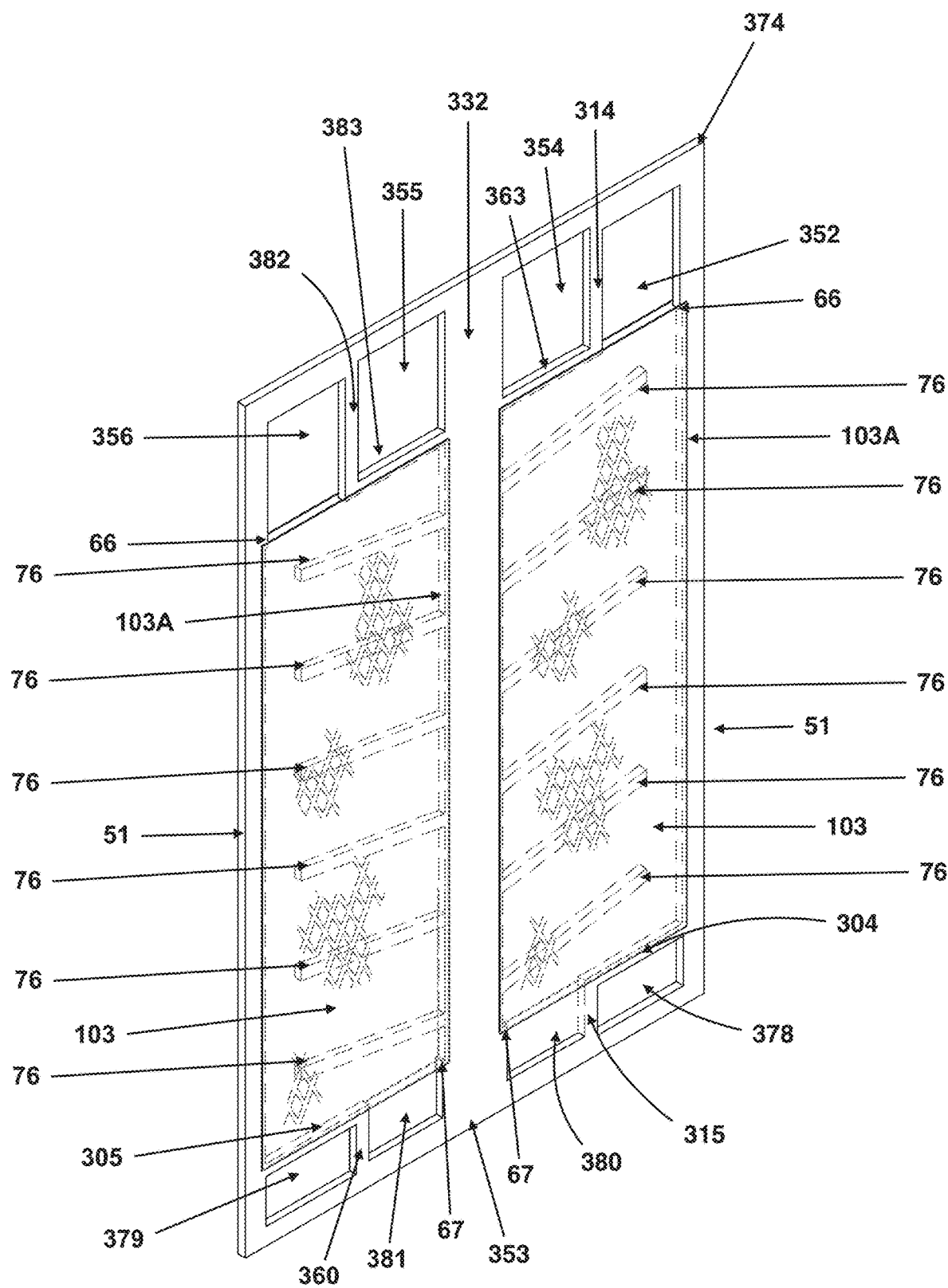
FIG. 10B shows an isometric view of the unitary part for use in unipolar filter press type electrochemical devices of FIG. 10A additionally comprising exemplary electroactive structures on opposing sides of the part.

FIG. 10B: Double CCF with Conductive Spears and Electroactive Structures

Figure 10C:
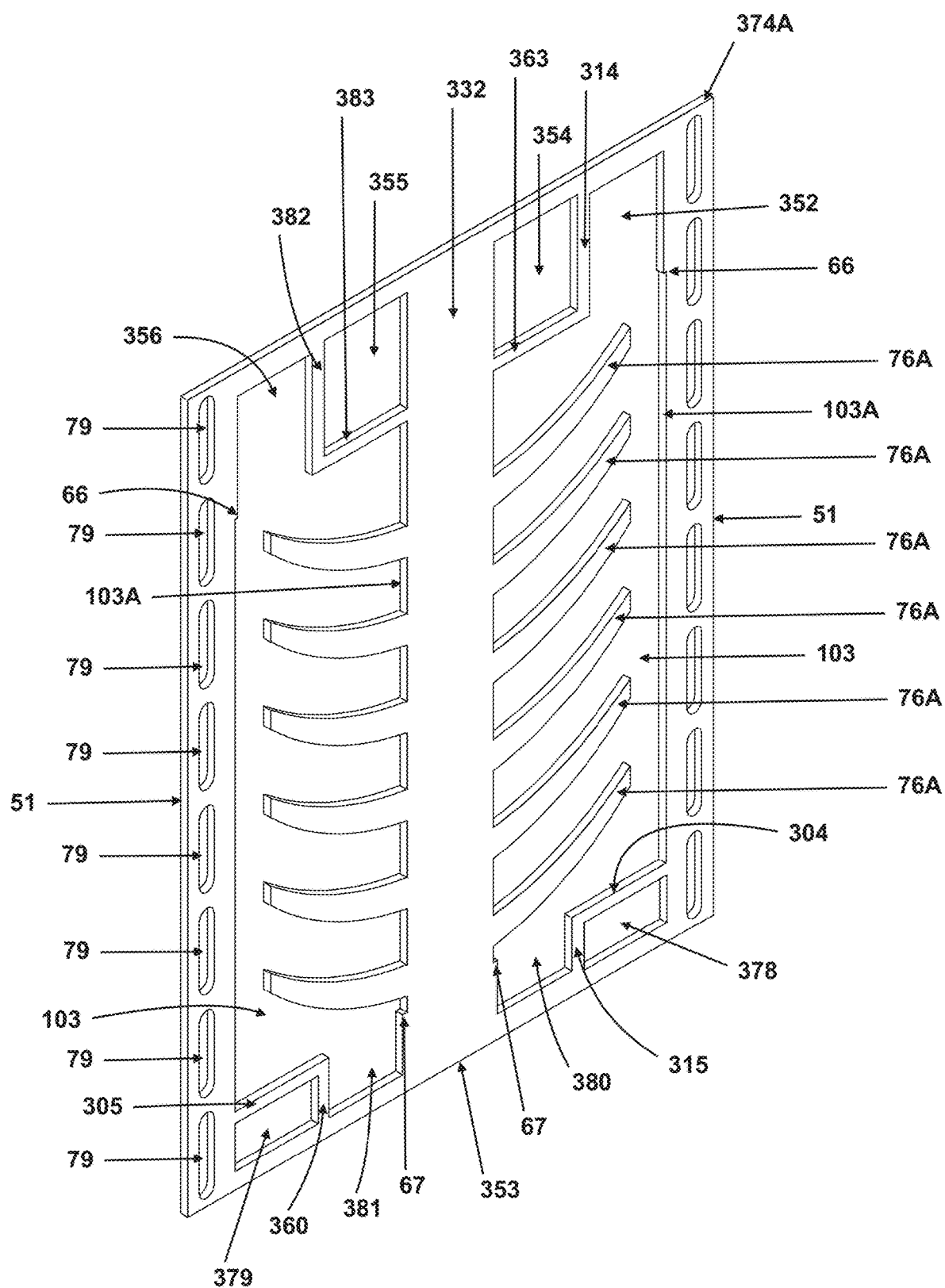
FIG. 10C shows an isometric view of a unitary current carrier, product circulation chamber, and structural frame provided in one part according to the present disclosure for use in unipolar filter press type electrochemical devices, further comprising an alternative embodiment of diagonally oriented spears provided from the same unitary part, extended frame members to enable improved heat transfer, and additional material cut-outs provided within the part to reduce weight among other benefits.

FIG. 10C: Double CCF with Alternative Spears

Figure 11A:
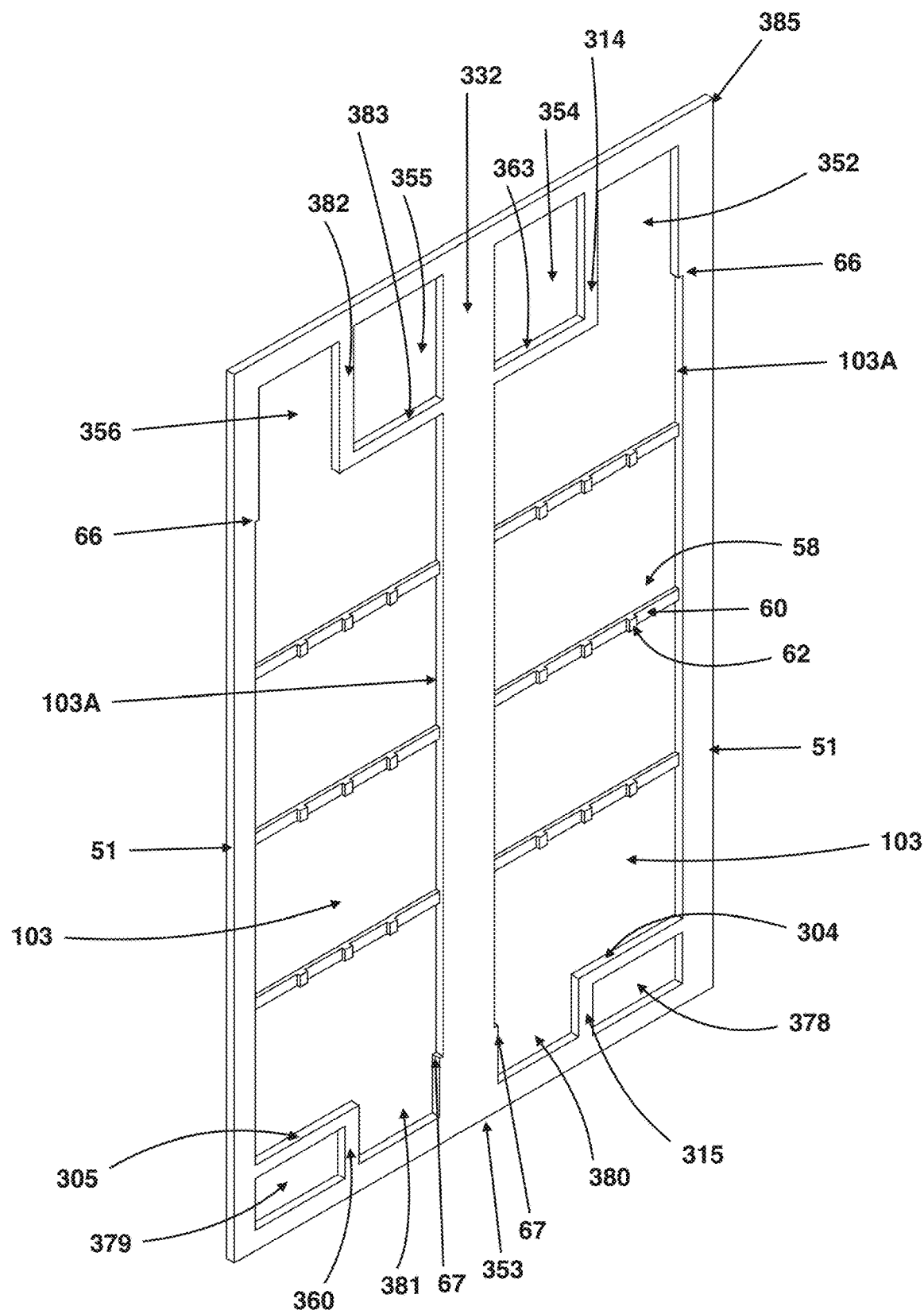
FIG. 11A shows an isometric view of a unitary part for use in unipolar filter press type electrochemical devices according to the present disclosure wherein a current carrier and structural frame are shared by two distinct product circulation chambers provided in the same unitary part with additional rungs provided from the same unitary part to improve current carrying capabilities and frame performance under pressurization, further provided with intra-rung channels to create product exit pathways and provide designated sites for intra-rung electroactive structure attachment.
Figure 11B:
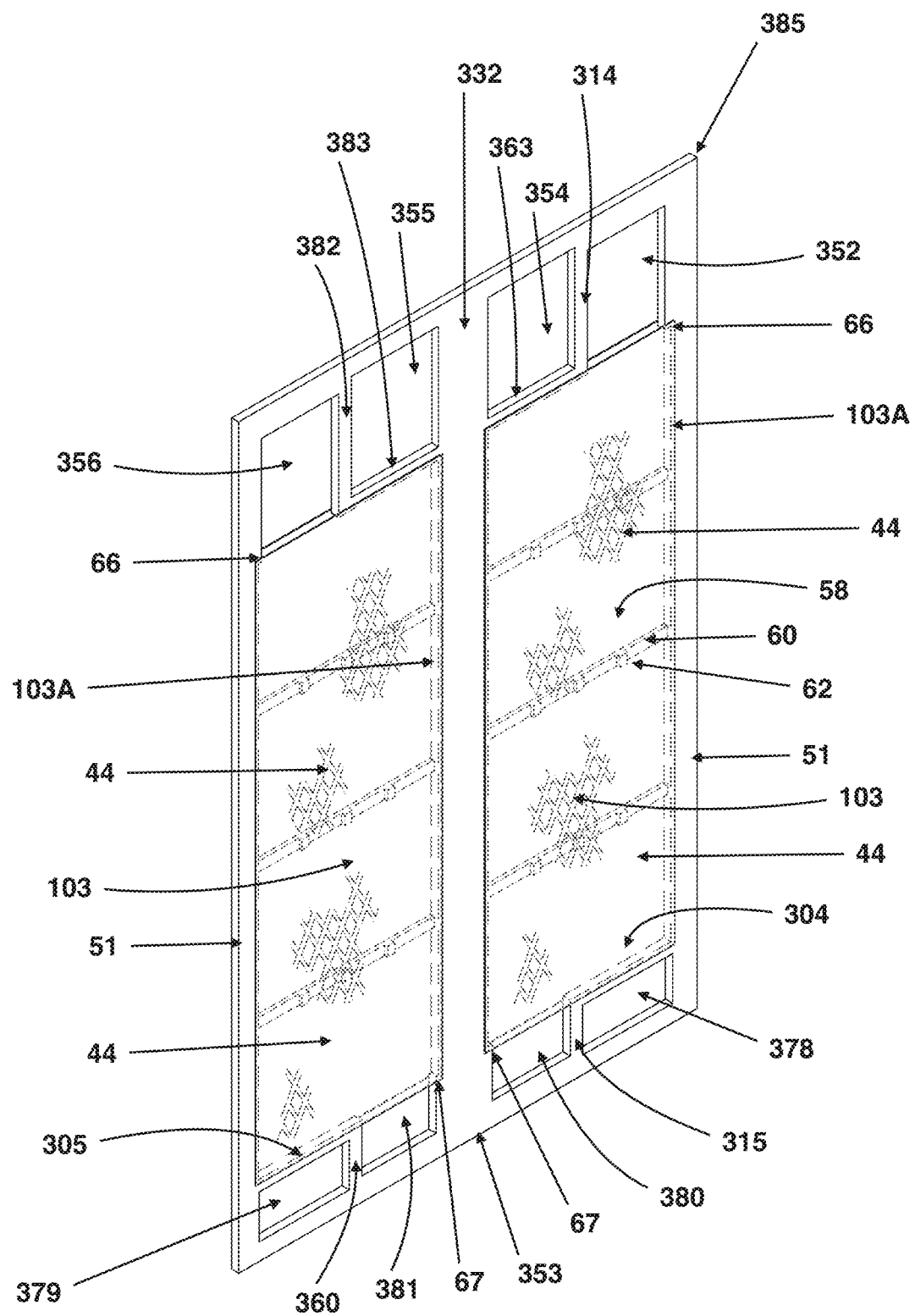
FIG. 11B shows an isometric view of the unitary part for use in unipolar filter press type electrochemical devices of FIG. 11A additionally comprising exemplary electroactive structures on opposing sides of the part.
Figure 12:
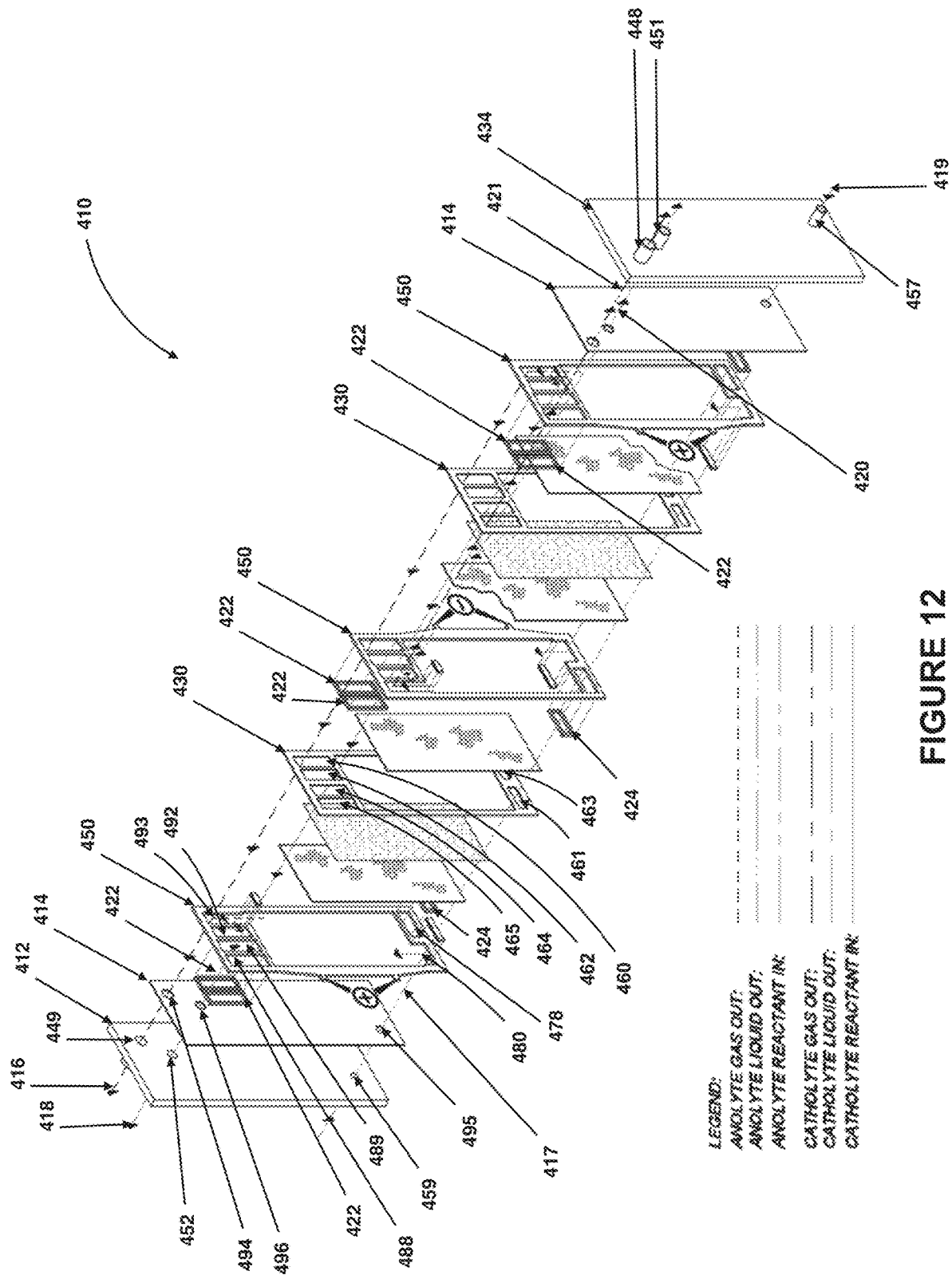
FIG. 12 shows a disassembled isometric view of a unipolar filter press electrochemical device based upon the unitary part of FIG. 13A.
Figure 13A:
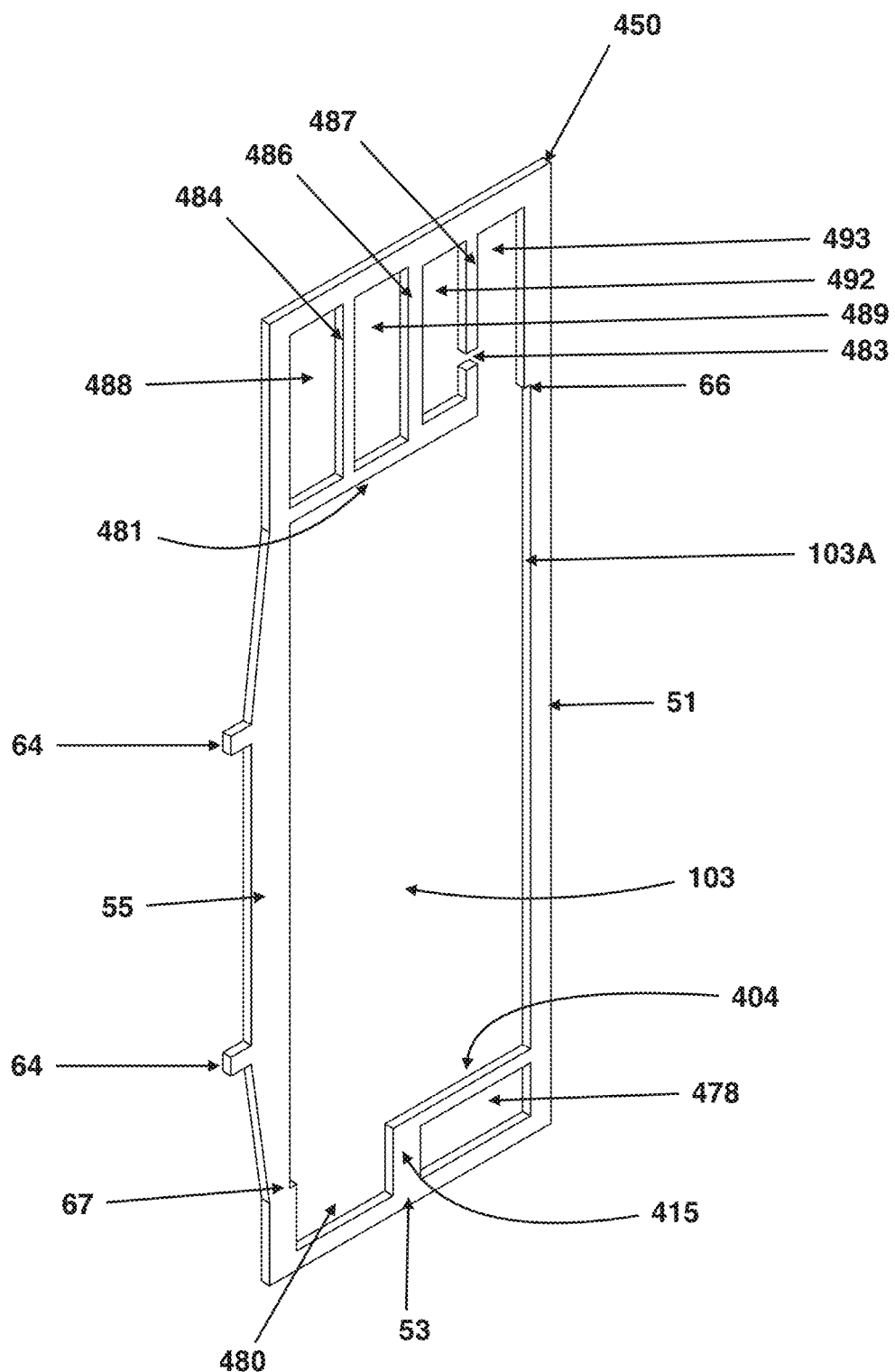
FIG. 13A shows an isometric view of a unitary current carrier, product circulation chamber, and structural frame provided in one part for use in unipolar filter press type electrochemical devices according to the present disclosure, further provided with a non-limiting number of additional passageways for the flow of reactants and products into and out of the part, as best suited to the engineering requirements of the unipolar electrochemical application.
Figure 14:
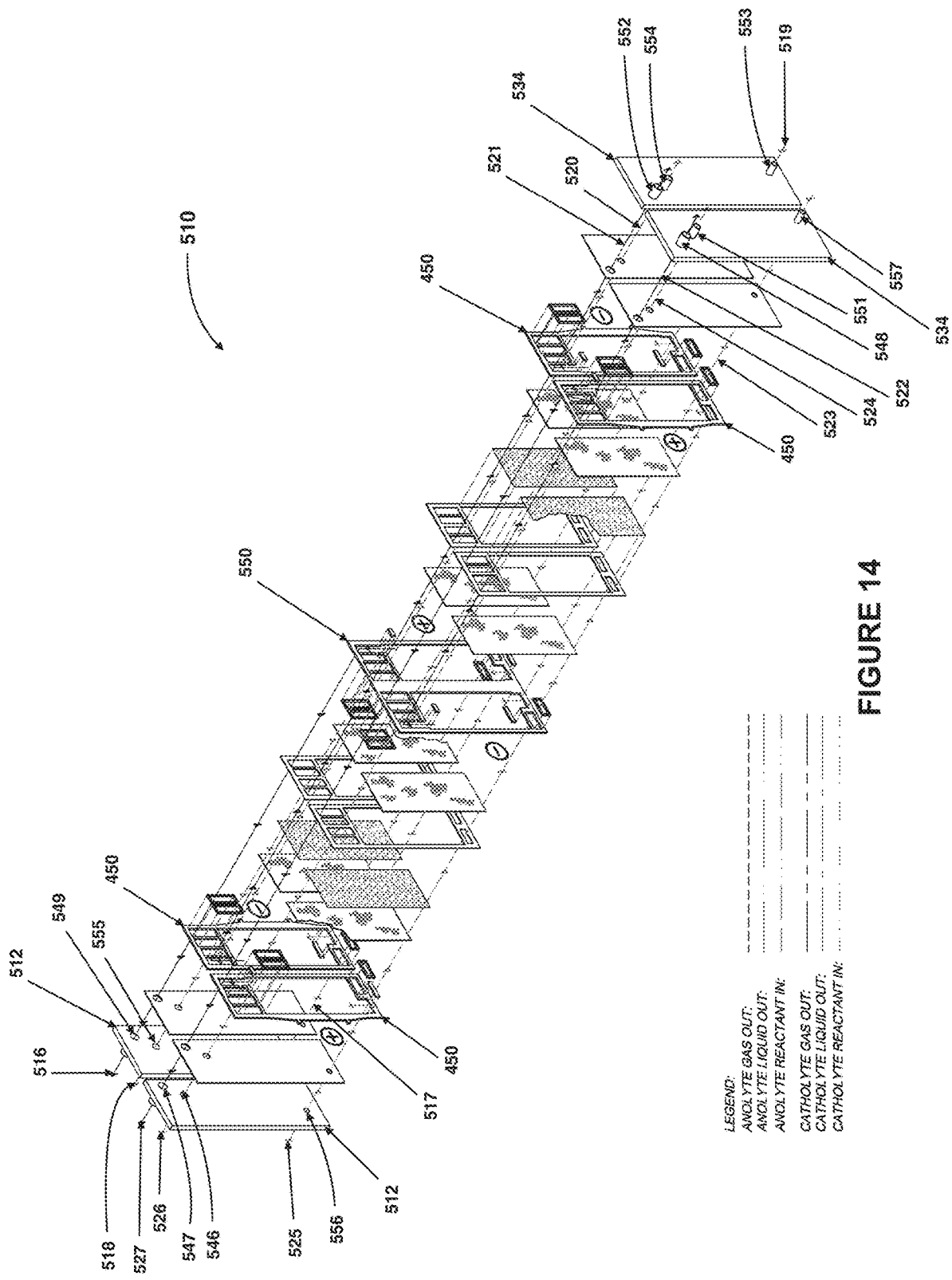
FIG. 14 shows a disassembled isometric view of a unipolar filter press electrochemical device based upon the combination of the unipolar parts of FIG. 15A and FIG. 13A.
Figure 15A:
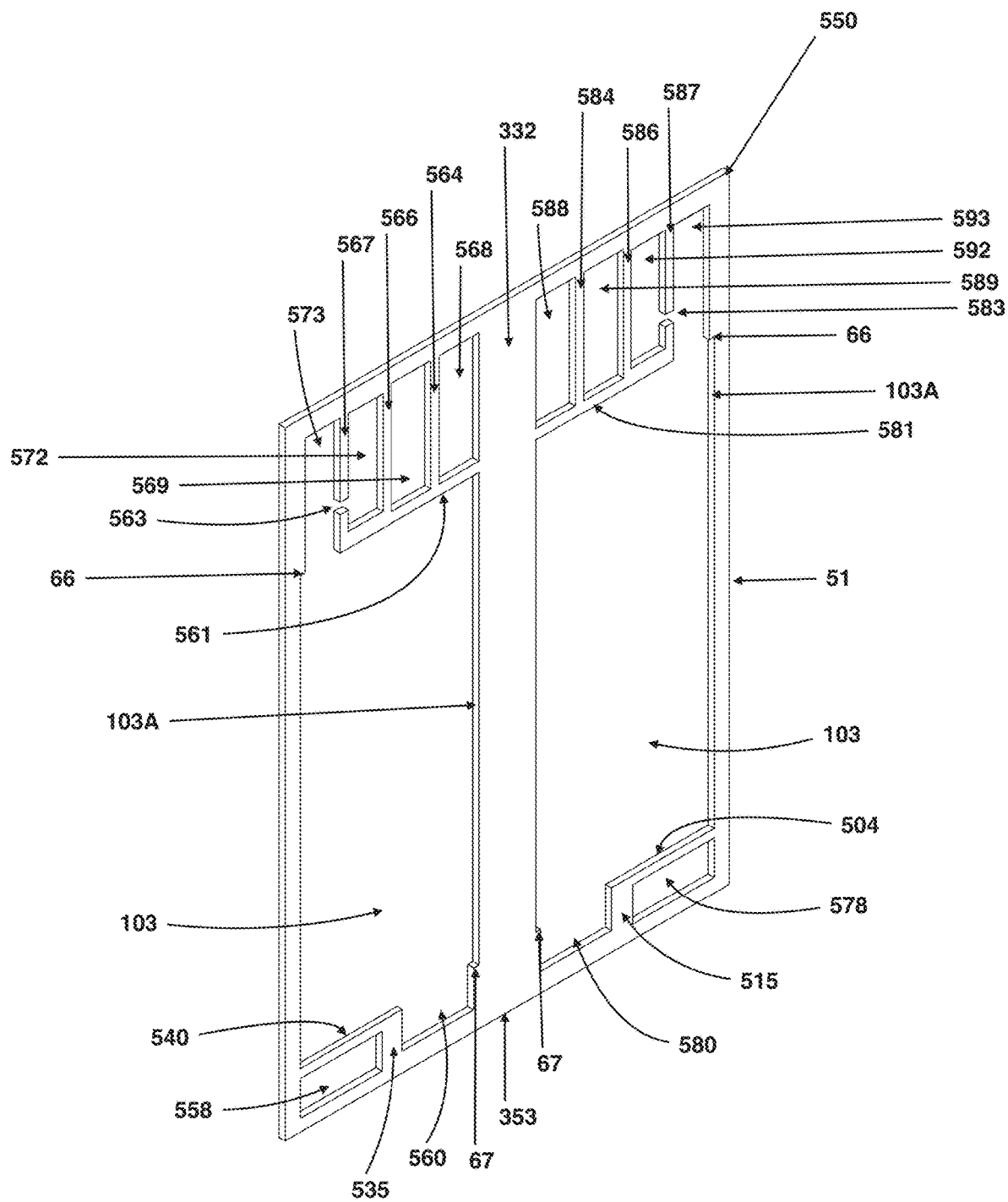
FIG. 15A shows an isometric view of a unitary part for use in unipolar filter press type electrochemical devices according to the present disclosure, wherein a current carrier and structural frame are shared by two distinct product circulation chambers provided in the same unitary part, with a non-limiting number of additional passageways for the flow of reactants and products into and out of the part, to best suit the engineering requirements of the unipolar electrochemical application.
Figure 15B:
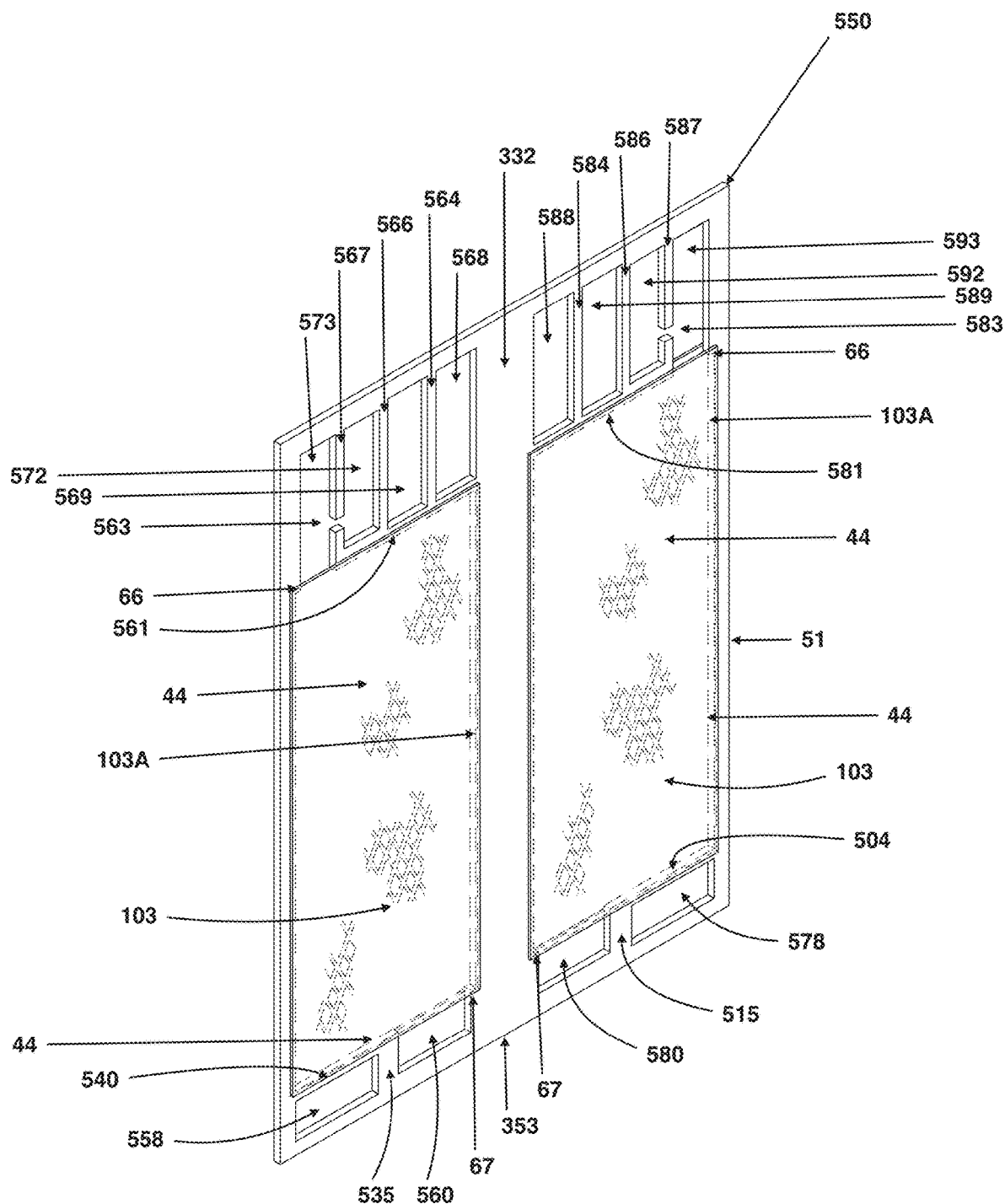
FIG. 15B shows an isometric view of the unitary part for use in unipolar filter press type electrochemical devices of FIG. 15A additionally comprising exemplary electroactive structures on opposing sides of the part.
Figure 16A:
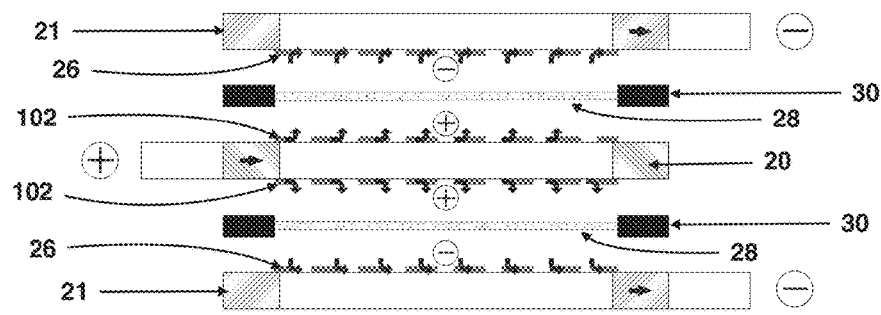
FIG. 16A shows a simplified top-down view of the innermost components of the unipolar filter press electrochemical device of FIG. 2 (the innermost components of FIG. 7 would also behave equivalently from this view) and the consequent path of current upon said innermost components and their electroactive structures, illustrating in particular the current travelling parallel to the product-generating electroactive structures.

44—non-limiting example of a planar electroactive structure, comprising a continuous expanded metal sheet;

51—long side section of frames 50, 68, 74, 85, 350, 368, 374, 385, 450, 550;

66—first notch;
67—second notch;
76—"Spears" of single CCF 374 (diagonally oriented rod-like protrusions provided as part of 374, located adjacent to where power is to be provided in the frame);
76A—an alternate embodiment of spears 76;
79—cut-outs provided in a CCF;
103—circulation chamber, provided by the CCF depth;
103A—depth dimension of circulation chamber 103
304—second delimiting conducting strut between circulation chamber 103 and channel defining aperture 378;
305—second delimiting conducting strut between circulation chamber 103 and channel defining aperture 379;
314—strut delimiting the apertures 352 and 354 at first end of frame 350, 368, 374, 385;
315—strut delimiting the apertures 378 and 380 at second end of frame 350, 368, 374, 385;
332—central axis of frame 350, 368, 374, 385, 450, 550, wherein current enters both of the product circulation chambers 103;
352—first channel defining aperture of frame 350, 368, 374, 385;
353—short side section of frame 350, 368, 374, 385, 450, 550;
354—third channel defining aperture of frame 350, 368, 374, 385;
355—seventh channel defining aperture of frame 350, 368, 374, 385;
356—fifth channel defining aperture of frame 350, 368, 374, 385;
360—strut delimiting the apertures 379 and 381 at second end of frame 350, 368, 374, 385;
363—first delimiting conducting strut between circulation chamber 103 and channel defining aperture 354;
374—double CCF with spears (electrically conductive metal frame circulation chamber and current carrier with conductive spears that can be equivalently utilized in the assembly stack in FIG. 7);
374A—CCF 374 employing spears 76A;
378—fourth channel defining aperture in frame 350, 368, 374, 385;
379—eighth channel defining aperture in frame 350, 368, 374, 385;
380—second channel defining aperture in frame 350, 368, 374, 385;
381—sixth channel defining aperture of frame 350, 368, 374, 385;
382—strut delimiting the apertures 356 and 355 at first end of frame 350, 368, 374, 385;
383—first delimiting conducting strut between circulation chamber 103 and channel defining aperture 355;
FIG. 11A: Double CCF with Conductive Struts
FIG. 11B: Double CCF with Conductive Struts and Electroactive Structures
44—non-limiting example of a planar electroactive structure, comprising a continuous expanded metal sheet;
51—long side section of frames 50, 68, 74, 85, 350, 368, 374, 385, 450, 550;
58—electrically conductive struts across circulation chamber 103;
60—portion of strut 58 which is a channel defining strut section;
62—raised portions of struts 58 used as attachment points for the electroactive structure;
66—first notch;
67—second notch;
76—"Spears" of single CCF 374 (diagonally oriented spear-protrusions provided as part of 374, located adjacent to where power is to be provided in the frame);
103—circulation chamber, provided by the CCF depth;
103A—depth dimension of circulation chamber 103
304—second delimiting conducting strut between circulation chamber 103 and channel defining aperture 378;
305—second delimiting conducting strut between circulation chamber 103 and channel defining aperture 379;
314—strut delimiting the apertures 352 and 354 at first end of frame 350, 368, 374, 385;
315—strut delimiting the apertures 378 and 380 at second end of frame 350, 368,
332—central axis of frame 350, 368, 374, 385, 450, 550, wherein current enters both of the product circulation chambers 103;
352—first channel defining aperture of frame 350, 368, 374, 385;
353—short side section of frame 350, 368, 374, 385, 450, 550;
354—third channel defining aperture of frame 350, 368, 374, 385;
355—seventh channel defining aperture of frame 350, 368, 374, 385;
356—fifth channel defining aperture of frame 350, 368, 374, 385;
360—strut delimiting the apertures 379 and 381 at second end of frame 350, 368, 374, 385;
363—first delimiting conducting strut between circulation chamber 103 and channel defining aperture 354;
378—fourth channel defining aperture in frame 350, 368, 374, 385;
379—eighth channel defining aperture in frame 350, 368, 374, 385;
380—second channel defining aperture in frame 350, 368, 374, 385;
381—sixth channel defining aperture of frame 350, 368, 374, 385;
382—strut delimiting the apertures 356 and 355 at first end of frame 350, 368, 374, 385;
383—first delimiting conducting strut between circulation chamber 103 and channel defining aperture 355;
385- to double CCF with rungs (electrically conductive metal frame circulation chamber and current carrier with conductive struts with channels that can be equivalently utilized in the assembly stack in FIG. 7);
FIG. 12: Isometric Full Assembly of Single CCFs with Additional Transfer Passages
410—the assembled stack of single CCFs with additional product transfer passageways
412—first of two end clamping plates (also referred to as an end plate);
414—first full faced gasket with three pathways;
416—first channel forming embodiment comprising port 449 in end clamping plate 412, and apertures 494 in gasket 414, 493 in CCF 450, 460 in gasket 430, 488 in CCF 450, 460, and 493;
417—second channel forming embodiment comprising port 459 in end plate 412, and apertures 495, 480, 461, 478, 461, 480;
418—third channel forming embodiment comprising port 452 in end plate 412, and apertures 496, 492, 462, 489, 462, and 492;
419—fourth channel forming embodiment comprising port 457 in end plate 434, and apertures 495, 478, 463, 480, 463, 480;

420—fifth channel forming embodiment comprising port 451 in end plate 434, 496, 489, 464, and 492;
421—sixth channel forming embodiment comprising port 448 in end clamping plate 434, and apertures 494, 488, 465, 493;
430—sealing and electrically insulating gasket between CCF's of different polarities;
422, 424—masking frames;
434—second of two end clamping plates (also referred to as an end plate);
450—assigned to single CCF with multiple passageways (electrically conductive metal frame circulation chamber and current carrier with additional passageways for product and reactant input and output, utilized in multiple passageways stack FIG. 12);
448—first tubular port for feeding or extracting products to/from end plate 434;
457—second tubular port for feeding or extracting products to/from end plate 434;
449—first tubular port for feeding or extracting products to/from end plate 412;
459—second tubular port for feeding or extracting products to/from end plate 412;
51—third tubular port for feeding or extracting products to/from end plate 434;
452—third tubular port for feeding or extracting products to/from end plate 412;
460—first aperture in gasket 430;
461—second aperture in gasket 430;
462—third aperture in gasket 430;
463—fourth aperture in gasket 430;
464—fifth aperture in gasket 430;
465—sixth aperture in gasket 430;
494—first channel defining aperture in gasket 414;
495—(bottom) second channel defining aperture in gasket 414;
496—(middle) third channel defining aperture in gasket 414;
FIG. 13A: Single CCF with Multiple Transfer Passageways
FIG. 13B: Single CCF with Multiple Transfer Passageways and Electroactive Structures
44—non-limiting example of a planar electroactive structure, comprising a continuous expanded metal sheet;
51—long side section of frames 50, 68, 74, 85, 350, 368, 374, 385, 450, 550;
53—short side section of frame 50, 68, 74, 85, 450;
64—electrically conductive tab for connection to a source of power;
66—first notch;
67—second notch;
103—circulation chamber, provided by the CCF depth;
103A—depth dimension of circulation chamber 103
404—second delimiting conducting strut between circulation chamber 103 and channel defining aperture 478;
415—strut delimiting the apertures 478 and 480 at second end of frame 450;
450—assigned to single CCF with multiple passageways (electrically conductive metal frame circulation chamber and current carrier with additional passageways for product and reactant input and output, utilized in multiple passageways stack FIG. 12);
478—fourth channel defining aperture in frame 450;
480—second channel defining aperture in frame 450;
481—first delimiting conducting strut between circulation chamber 103 and channel defining apertures 493, 492, 489, and 488;
483—opening provided between 487 and 481 to allow liquid from 493 to flow into 492;
484—fifth delimiting conducting strut between channel defining apertures 488 and 489 and first delimiting conducting strut 481;
486—fourth delimiting conducting strut between channel defining apertures 489 and 492 and first delimiting conducting strut 481;
487—third delimiting conducting strut between channel defining apertures 492 and 493 and first delimiting conducting strut 481;
488—sixth channel defining aperture;
489—fifth channel defining aperture;
492—third channel defining aperture;
493—first channel defining aperture;
FIG. 14: Isometric Full Assembly of Double-Single CCFs with Additional Transfer Passages
510—the assembled stack of single and double CCFs with additional product transfer passageways;
512—first of two end clamping plates (also referred to as an end plate);
534—second of two end clamping plates (also referred to as an end plate);
550—double CCF with multiple passageways (electrically conductive metal frame circulation chamber and current carrier with additional passageways for product and reactant input and output, utilized in multiple passageways stack FIG. 14);
Connecting to End Plate 512
516—first channel forming embodiment comprising port 549 in first end clamping plate 512, and apertures 494, 488, 460, 593 in double CCF 550;
517—second channel forming embodiment comprising port 559 in first end plate 512 (obscured by first right-hand gasket 414), 495, 478, 461 (obscured by electroactive structure), and 580 in the anodically polarized side of CCF 550;
518—third channel forming embodiment comprising port 555 in first end plate 512, and apertures 496, 489, 462, 592;
525—tenth channel forming embodiment comprising port 556 in second end plate 512, and apertures 495, 480, 461, 558, 461, 480;
526—eleventh channel forming embodiment comprising port 546 in second end plate 512, 496, 492, 462, 569, 462, and 492;
527—twelfth channel forming embodiment comprising port 547 in second end clamping plate 512, and apertures 494, 493, 460, 568, 460, 493;
549—tubular port for feeding or extracting products to/from end plate 512 via first channel 516;
559—tubular port for feeding or extracting products to/from end plate 512 via second channel 517; (NOT SHOWN)
555—tubular port for feeding or extracting products to/from end plate 512 via third channel 518;
556—tubular port for feeding or extracting products to/from end plate 512 via tenth channel 525;
546—tubular port for feeding or extracting products to/from end plate 512 via eleventh channel 526;
547—tubular port for feeding or extracting products to/from end plate 512 via twelfth channel 527;
Connecting to End plate 534
519—fourth channel forming embodiment comprising port 553 in first end plate 534, obscured aperture 495 in gasket 414, 480, 463, 578, 463, and 480;

520—fifth channel forming embodiment comprising port 554 in first end plate 534, 496, 492, 464, 589, 464, 492;
521—sixth channel forming embodiment comprising port 552 in first end plate 534, and apertures 494, 493, 465, 588, 465, and 493;
522—seventh channel forming embodiment comprising port 548 in second end plate 534, and apertures 494, 488, 465, and 573;
523—eighth channel forming embodiment comprising port 557 in second end plate 534, and apertures 495, 478, 463, and 560;
524—ninth channel forming embodiment comprising port 551 in second end plate 534, and apertures 496, 489, 464, and 572;
548—tubular port for feeding or extracting products to/from end plate 534 via seventh channel 522;
557—tubular port for feeding or extracting products to/from end plate 534 via eighth channel 523;
551—tubular port for feeding or extracting products to/from end plate 534 via ninth channel 524;
552—tubular port for feeding or extracting products to/from end plate 534 via sixth channel 521;
553—tubular port for feeding or extracting products to/from end plate 534 via fourth channel 519;
554—tubular port for feeding or extracting products to/from end plate 534 via fifth channel 520;
FIG. 15A: Double CCF with Additional Transfer Passages
FIG. 15B: Double CCF with Additional Transfer Passages and Electroactive Structures
44—non-limiting example of a planar electroactive structure, comprising a continuous expanded metal sheet;
51—long side section of frames 50, 68, 74, 85, 350, 368, 374, 385, 450, 550;
353—short side section of frame 50, 68, 74, 85, 450;
66—first notch;
67—second notch;
103—circulation chamber, provided by the CCF depth;
103A—depth dimension of circulation chamber 103;
332—central axis of frame 350, 368, 374, 385, 450, 550, wherein current enters both of the product circulation chambers 103;
353—short side section of frame 350, 368, 374, 385, 450, 550;
504—second delimiting conducting strut between circulation chamber 103 and channel defining aperture 578;
515—strut delimiting the apertures 578 and 580 at second end of frame 550;
550- to double CCF with multiple passageways (electrically conductive metal frame circulation chamber and current carrier with additional passageways for product and reactant input and output, utilized in multiple passageways stack FIG. 14);
535—strut delimiting the apertures 558 and 560 at second end of frame 550;
540—second delimiting conducting strut between circulation chamber 103 and channel defining aperture 558;
558—tenth channel defining aperture in frame 550;
560—eighth channel defining aperture in frame 550;
561—first delimiting conducting strut between circulation chamber 103 and channel defining apertures 573, 572, 569, and 568;
563—opening provided between 567 and 561 to allow liquid from 573 to flow into 572;
564—eighth delimiting conducting strut between channel defining apertures 568 and 569 and first delimiting conducting strut 561;
566—seventh delimiting conducting strut between channel defining apertures 569 and 572 and first delimiting conducting strut 561;
567—sixth delimiting conducting strut between channel defining apertures 572 and 573 and first delimiting conducting strut 561;
568—twelfth channel defining aperture;
569—eleventh channel defining aperture;
572—ninth channel defining aperture;
573—seventh channel defining aperture;
578—fourth channel defining aperture in frame 550;
580—second channel defining aperture in frame 550;
581—first delimiting conducting strut between circulation chamber 103 and channel defining apertures 593, 592, 589, and 588;
583—opening provided between 587 and 581 to allow liquid from 593 to flow into
584—fifth delimiting conducting strut between channel defining apertures 588 and 589 and first delimiting conducting strut 581;
586—fourth delimiting conducting strut between channel defining apertures 589 and 592 and first delimiting conducting strut 581;
587—third delimiting conducting strut between channel defining apertures 592 and 593 and first delimiting conducting strut 581;
588—sixth channel defining aperture;
589—fifth channel defining aperture;
592—third channel defining aperture;
593—first channel defining aperture;
FIG. 16A: Top Down View—Unipolar Single Stack Current Flow
FIG. 16B: Top Down View—Unipolar Double Stack Current Flow
FIG. 16C: Top Down View—Scaled Unipolar CCFs Cell Block Embodiment
50—Basic single CCF
26—electrically conductive mesh, perforated or slotted sheet, expanded sheet, screens, woven mesh or similar appropriate planar configuration thereof forming the cathodic electroactive structure with the—sign in FIG. 2;
28—separator;
30—sealing and electrically insulating gasket between CCF's of different polarities;
102—electrically conductive mesh, perforated or slotted sheet, expanded sheet, screens, woven mesh or similar appropriate planar configuration thereof forming the anodic electroactive structure and designated as an anodic mesh with the + sign in FIG. 2;
350—Basic double CCF.

FIG. 1A illustrates a top-down view and cross section of the electroactive regions of a basic unipolar current carrying configuration shown generally by the half-cell at 210 with electroactive structures attached. The unipolar current carrying configuration comprises an electrical current carrying structure 212 that provides multiple electroactive structures 102 of the same polarity on opposing sides of the current carrying structure 212, such that regions of the same universal polarity 226 are provided on the opposing sides of the current carrying structure 212, and such that current is provided by a power source 214 and flows across in the direction of arrow 216 in the current carrier 212 and to electroactive structures 102. Typically, the current flows in a parallel direction to the electroactive structures 102 from left to right. The half-cell in FIG. 1A creates the base current carrying unit for a unipolar electrochemical filter press device constructed of positive and negative half-cell pairs.

Figure 1B:
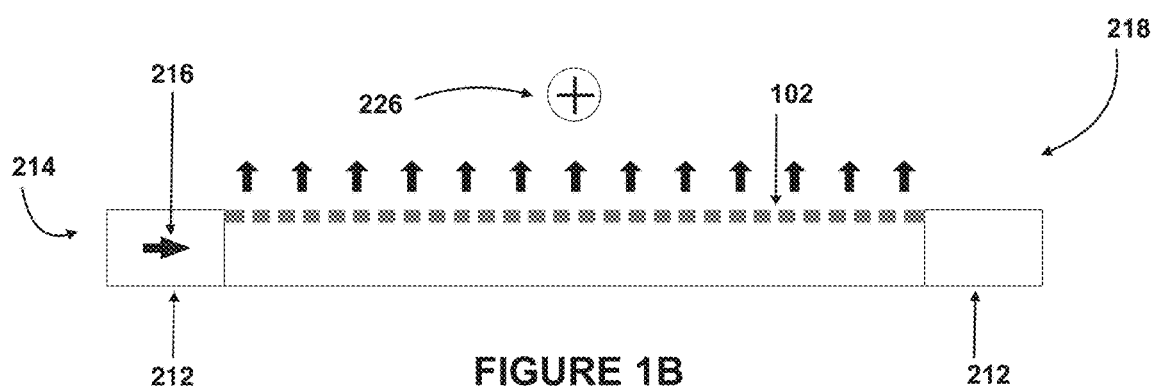
FIG. 1B shows the top down view of a base current carrying half-cell unit of a monopolar electrochemical filter press device, comprising one electroactive structure of a single polarity on one side of the current carrier configured electrically in parallel.
Figure 2:
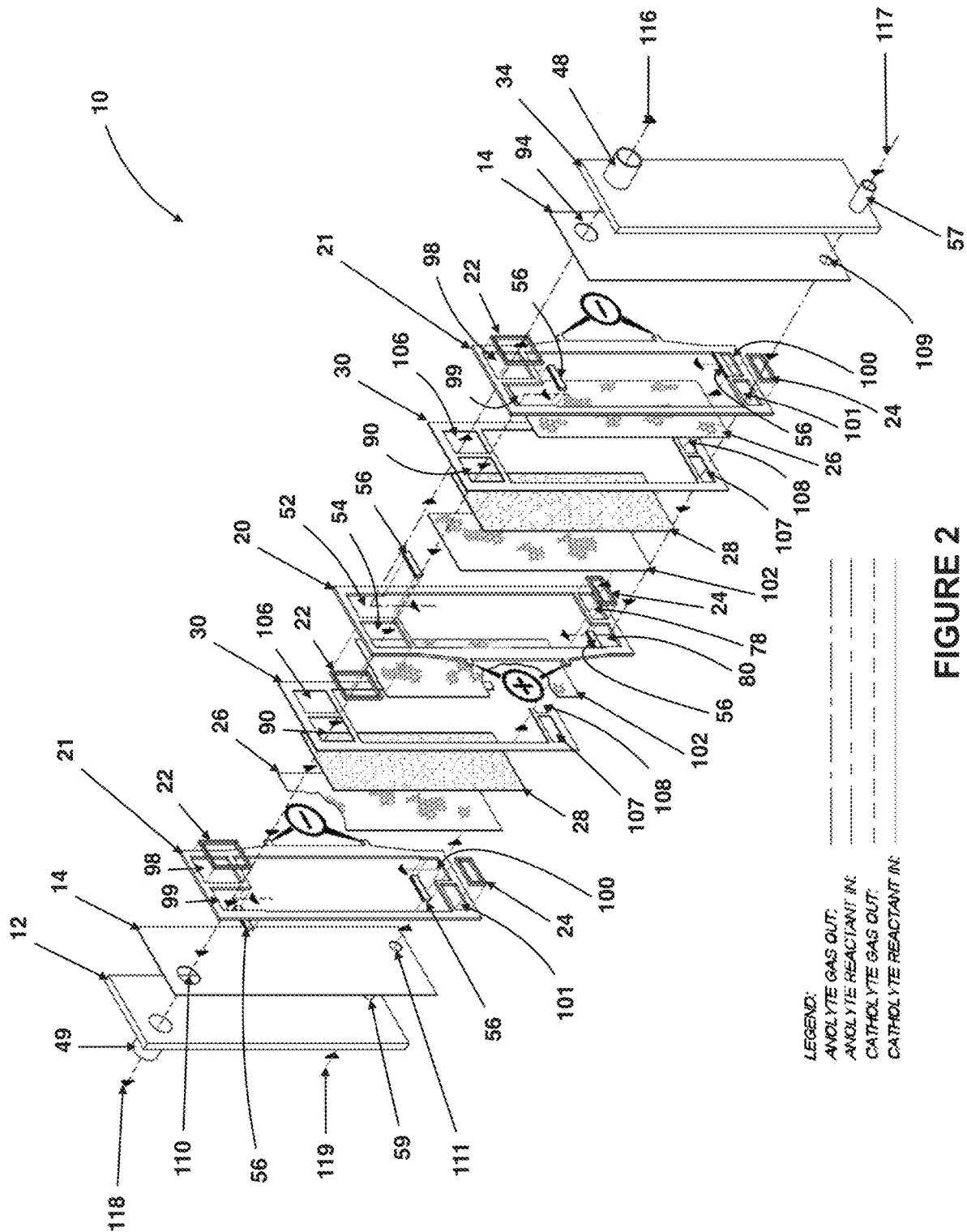
FIG. 2 shows a disassembled isometric view of a unipolar filter press electrochemical device based upon the part of FIG. 3A.

FIG. 1B illustrates a top-down view and cross section of the electroactive region of a basic monopolar current carrying configuration shown generally by the half-cell at 218 with an electroactive structure attached. The monopolar current carrying configuration comprises an electrical current carrying structure 212 that provides an electroactive structure 102 of a singular polarity on one side of the current carrying structure 212, such that a region of one polarity 226 is provided on the side of the current carrying structure 212 that possesses the electroactive structure 102, and such that current is provided by a power source 214 and flows across in the direction of arrow 216 in the current carrier 212 and to the electroactive structure 102. Typically, the current flows in a parallel direction to the electroactive structure 102 from left to right. The half-cell in FIG. 2A creates the base current carrying unit for a monopolar electrochemical filter press device constructed of positive and negative half-cell pairs.

Figure 1C:
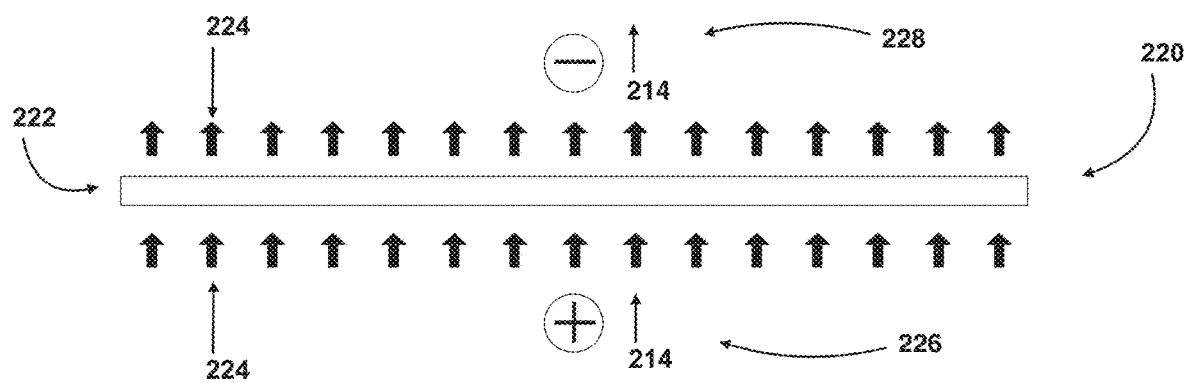
FIG. 1C shows the top down view of a base current carrying unit of a bipolar electrochemical filter press device, comprising a bipolar wall defining electroactive areas of opposite polarity configured electrically in series.

FIG. 1C illustrates a top-down view and cross section of the electroactive regions of a basic bipolar current carrying configuration, shown generally at 220. The bipolar current carrying configuration comprises a bipolar wall 222 defining electroactive areas of opposite polarity on opposing sides of the current carrying structure, such that regions of opposite polarity (226, 228) are provided on the opposing sides of the bipolar wall 222, and such that current is provided by a power source 214 and flows through the bipolar wall orthogonally 224, creating the base current carrying unit for a bipolar electrochemical filter press device. Cells within a bipolar filter press are electrically connected in series, with each individual current carrier typically comprising one anodic side and one cathodic side connected by the conductive bipolar wall. The bipolar wall 222 is a non-porous electrically conductive wall with electrodes separating the anodic and cathodic halves. Naturally this cannot be porous, as that would allow O and H to mix which is dangerous in the case of water electrolysis, and cross-contaminate the anolyte and catholyte which is undesirable in caustic chlorine electrolysis.

All of the unipolar electrochemical device embodiments presented in this disclosure (for example 10 in FIG. 2, 310 in FIG. 7, 410 in FIG. 12, 510 in FIG. 14) may be utilized for a variety of electrochemical processes. Preferred examples of processes include: alkaline water electrolysis, and chlorine production through chlor alkali and sodium chlorate electrolysis. In all such electrolysis processes, electrolyte exposed to a cathode in the cathodically polarized region of the cell is referred to as "catholyte," whereas the electrolyte exposed to an anode in the anodically polarized region of the cell is referred to as "anolyte."

In alkaline water electrolysis, (whose reactions are well known to those skilled in the art), the starting electrolyte is comprised of a highly basic sodium hydroxide or potassium hydroxide solution. The anode product created is oxygen gas, and the cathode product created is hydrogen gas. Catholyte and any additional reactants required are fed into the cathodic end of the filter press stack, and anolyte and any additional reactants required are fed into the anodic end of the stack such that target concentrations are achieved.

In chlorine electrolysis, the starting electrolyte is comprised of sodium chloride in water, referred to as "brine." The anode product is gaseous chlorine, and the cathode products are hydrogen gas and sodium hydroxide. In sodium chlorate production processes, chlorine electrolysis is completed without a separator (i.e. embodiments identical to those presented herein however without a separator 28 as described later), such that the chlorine and sodium hydroxide are not separated. When chlorine and sodium hydroxide are not separated (referred to as "sodium chlorate electrolysis") the chlorine anode product reacts with the sodium hydroxide cathode products giving sodium hypochlorite (NaOCl) which gets removed and reacted to produce sodium chlorate $NaClO_3$.

When a separator is applied in a chlorine cell (referred to as the "chlor alkali process") and said separator is often provided as a cation-exchange membrane, this cation exchange membrane separates the anolyte and catholyte. Brine is fed into the anode plate, and sodium ions and water molecules migrate through the membrane into the catholyte. Chloride ions are prevented from moving into the catholyte by the membrane. The anode product is still gaseous chlorine, and the cathode products are still hydrogen gas and sodium hydroxide. A separator diaphragm may be applied in place of a membrane in older chlorine cells, where the anolyte is physically separated from the catholyte through a mass-transport process rather than an ion-transport process, and there is a bulk flow of anolyte through the diaphragm to the catholyte.

In membrane chlorine electrolysis processes, brine that has been reduced in concentration ("depleted brine") is removed from the anode plate, resaturated with salt to ensure the required salt concentration is maintained, and fed back into the cell. At the cathode, water is electrolyzed to form hydrogen and hydroxyl ions to form caustic soda when combined with sodium ions. Gas liquid separation of products and the recirculation and resaturation of anolyte can be achieved outside of the electrolytic cell, or inside the electrolytic cell depending on the constraints of the cell design and application. The chlor alkali process and the sodium chlorate production process are well known to those skilled in the art of electrolysis, as their chemical products (chlorine, hydrogen, caustic soda) are sold into a wide array of chemical industries to create well known products such as bleach (made from chlorine), hydrochloric acid, and hydrogen peroxide (made from hydrogen).

The growing momentum of the Hydrogen Economy in recent years further reinforces the need for scalable economic industrial electrolysis processes such as alkaline water electrolysis to be applied in the production of hydrogen for both traditional and emerging applications. The unipolar electrochemical devices presented herein are particularly preferred when applied to large scale alkaline water electrolysis.

Figure 3A:
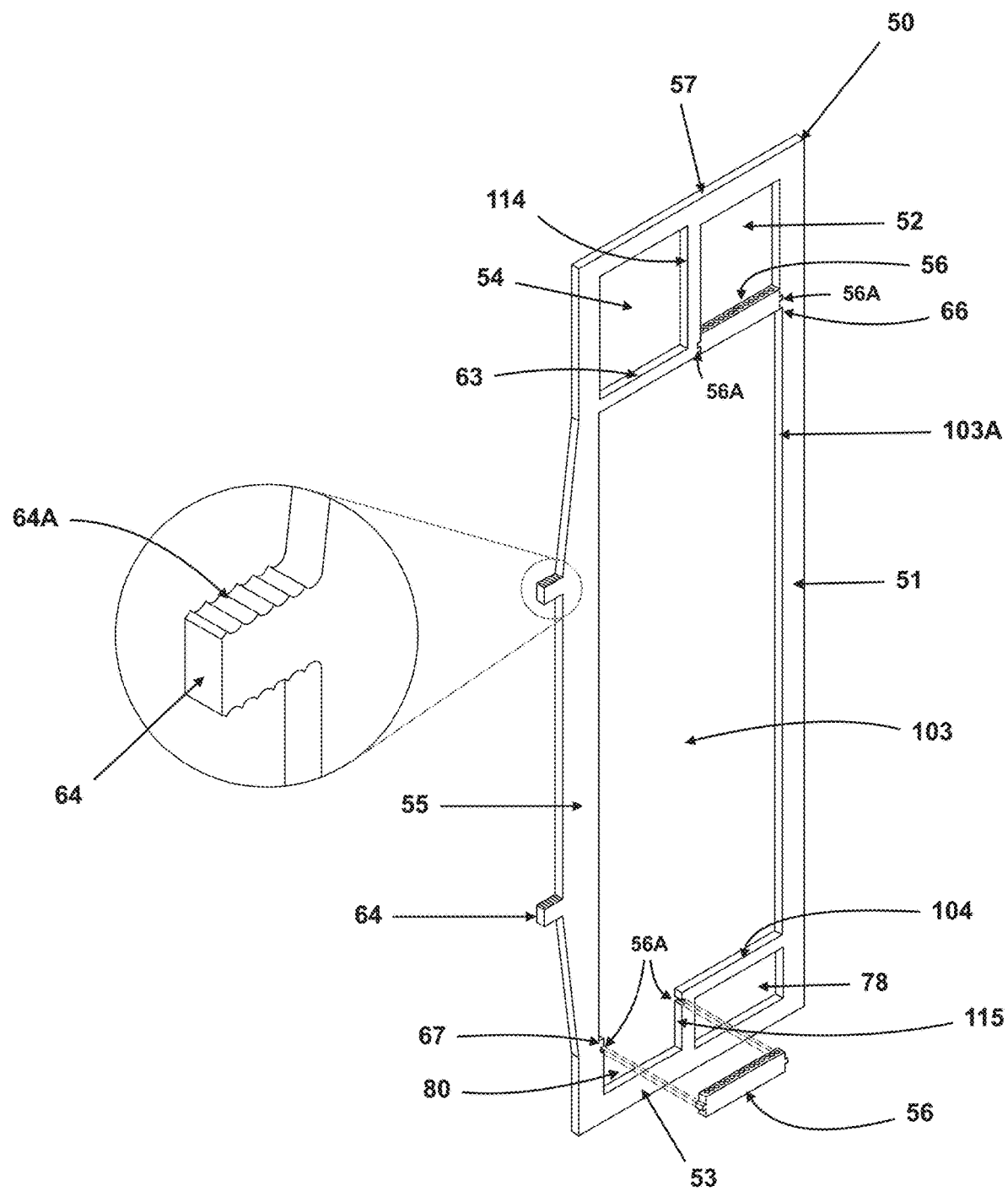
FIG. 3A shows an isometric view of a unitary current carrier, product circulation chamber, and structural frame provided in one part according to the present disclosure for use in unipolar filter press type electrochemical devices.

FIG. 2 illustrates a disassembled view of a unipolar filter press electrolyser assembly 10 (or "unipolar filter press stack") based on the current carrier, circulation chamber, and frame ("CCF") of FIG. 3A. The unipolar assembly shown in FIG. 2 is equivalent to one unipolar electrochemical filter press stack, as a single circuit.

An important clarification to make in describing unipolar filter press stacks based on CCF technology is the definition of a single electrochemical cell. The unipolar filter press stack 10 (and 410 described later) each represent one (1) electrochemical cell, configured electrically in parallel. To increase the surface area for product generation within one unipolar electrochemical cell, additional anodic and cathodic CCFs are simply added to the filter press stack longitudinally. All cathodic CCFs provided are connected externally in parallel, and similarly all anodic CCFs provided are connected externally in parallel. Even after the provision of additional CCFs longitudinally within a unipolar filter press stack, the stack remains as one electrochemical cell, now with increased surface area per cell.

This contrasts the analogous situation in bipolar filter presses which are configured electrically in series. In bipolar filter presses, with each longitudinal addition of a bipolar electrode assembly (such as that shown in FIG. 1C), the number of electrochemical cells within the filter press is increased. Consequently, the total voltage of the bipolar filter press in series is increased, without having increased the surface area for product generation per electrochemical cell.

Increasing the surface area per electrochemical cell is highly desired in the field of large-scale alkaline water electrolysis, so to increase the product output and overall efficiency of an electrolyser design. With increases in surface area per electrochemical cell, greater amperage per cell is enabled, consequently allowing greater hydrogen product generation according to the well-known Faraday's Law of Electrolysis. This makes unipolar filter press technology based on CCF's particularly desirable for the application of large-scale alkaline water electrolysis where large increases in surface area per electrochemical cell are required to efficiently scale product generation.

Unipolar filter press assemblies wherein two unipolar filter press stacks (creating proportionally two electrochemical cells) are provided within the same filter press assembly (310 and 510) are described later. Such filter press assemblies as 310 and 510 can also be scaled longitudinally by providing additional CCF's within each filter press stack to increase surface area per cell, as described later and shown in FIG. 16C. Such multi-cell assemblies can also be scaled laterally to proportionally increase the number of electrochemical cells per assembly, also described later and shown in FIG. 16C.

The features of the unipolar filter press stack 10 shown in FIG. 2 are described herein in more detail.

Within the stack 10, two unipolar positive and two monopolar negative electrochemical reaction regions are electrically configured in parallel, creating a total of four electrochemically active regions. For ease of comprehension but not limiting other possibilities, CCF 20 described further below is construed as being of positive polarity and CCF's 21 are construed as being of negative polarity. Unipolar CCF 20 provides two electrochemical reaction regions of the same polarity (as defined in FIG. 1A), while each monopolar CCF 21 provides one electrochemical reaction region of a single polarity (as defined in FIG. 1B). Therefore, the assembly shown in FIG. 2 has a total of four electroactive regions, being comprised of one unipolar CCF and two monopolar CCFs.

The negative electrochemical reaction regions are localized between the electroactive surface of structure 26 (negative) of monopolar CCFs 21 and the separators 28, all as shown adjacent to end gaskets 14. Electrically in parallel to both negative electrochemical reaction regions, two positive electrochemical reaction regions are localized at unipolar CCF 20, as defined by the two electroactive structures 102 (positive) of unipolar CCF 20.

A conductive chamber for product circulation ("circulation chamber") 103 within each electrochemical reaction region is provided by the thickness ("depth") of CCFs 20 and 21 themselves, the depth being indicated in FIG. 3A at 103A. No additional parts are required to create depth for product circulation in the assembly, thereby reducing the total part count of this unipolar filter press stack. This depth for product circulation 103A may vary as required by the underlying application and constraints of the design space, and is provided for all CCF embodiments presently described, the advantages of which are discussed later.

For ease of comprehension, the assembly in FIG. 2 is simplified to include only three total CCFs; the central CCF 20 being in a unipolar configuration and CCFs 21 adjacent to end gaskets 14 and end plates 12 and 34 respectively being in a monopolar configuration. Three is the minimum number of CCFs required to assemble an electrolyser. Those familiar with the electrochemical domain will understand that additional electrochemical reaction regions within the same unipolar filter press stack can be obtained by an adequate assembly of the components listed in the present disclosure, as described later.

As well, those familiar with the electrochemical domain will understand that monopolar CCF 21 as illustrated in FIG. 2 can have electroactive structures 26 attached on both faces, such as to be in a unipolar configuration and essentially identical to CCF 20, except for the polarity of CCF 20 being opposite to CCF 21. Such a unipolar CCF 21 could thus be inserted into a larger assembly than that illustrated in FIG. 2.

Those skilled in the design of electrolysers will further comprehend that the terminal (or "end-most") monopolar CCFs 21 shown in FIG. 2 are adjacent to sealing gaskets 14, and therefore do not require the additional product-generating electroactive structures 26 that would convert the monopolar CCF 21 into a unipolar CCF 21. For this reason, those skilled in the design of electrolysers will understand that monopolar CCFs are most practical in the end-most position, adjacent to the stack's end assembly, and that practically only unipolar CCFs would be provided longitudinally to scale the assembly, increasing the surface area per electrochemical cell, as discussed.

For ease of comprehension, the parts that must be employed to incorporate more CCFs longitudinally in the filter press assembly of 10 are described below.

In one embodiment, a unipolar CCF 21 could be substituted to the second monopolar CCF 21 illustrated in FIG. 2, such as to permit forming one additional electrochemical reaction region with the additional electroactive structure 26 provided by the substituted unipolar CCF 21. Following this insertion with the insertion of the corresponding non-limiting components (a corresponding separator 28 and gasket 30 to complement the shown masks (22, 24)), then the insertion of a positive unipolar CCF 20 (provided with two electroactive structures 102), followed by the corresponding non-limiting components (a corresponding separator 28 and gasket (30) and masks (22, 24)), then finally the insertion of a terminal monopolar CCF 21 with corresponding masks (22, 24), a unipolar filter press single electrochemical cell with eight electrochemically active regions would be assembled.

To scale this assembly further, insertions in the 10's or 100's of alternating unipolar CCFs 21 (negative) and 20 (positive) and their corresponding non-limiting masks (22, 24), gaskets 30, and separators 28 may be inserted into the stack centre before the terminal monopolar CCF 21. The quantity of electrochemically active regions (surface area) within a singular unipolar filter press stack will scale with the addition of each CCF, overall providing a proportionally scaled single unipolar cell within a filter press assembly, electrically configured in parallel.

The electrolyser device embodiment 10 in FIG. 2 further depicts two rigid end clamping plates 12 and 34 adjacent to full faced sealing end gaskets 14. Those skilled in the electrochemical domain will understand that to assemble and seal the filter press 10 in FIG. 2 such that leaks are prevented in operation, a compression system such as a hydraulic press or other clamping means is required. One exemplary compression system comprises the application of a filter press clamping device, known to those skilled in the electrochemical domain, which would mechanically seal all of the components between clamping end plates 12 and 34. To input reactants and collect product from this system, discharge and feed channels (49, 59 in plate 12 and 48, and 57 in plate 34) would be attached to some external piping elements on the plates 12 and 34. Those familiar with the electrochemical domain will understand that the clamping end plates 12 and 34 shown for use with a filter press clamping device are non-limiting in this disclosure. Those skilled in the electrochemical domain will further understand that in certain filter press stack configurations, tie rods may be used to align assembly components within the filter press stack. Under such circumstances, tie rod holes can be provided within one or both long sides 51 or 55 of any of the CCFs shown in FIGS. 3 to 6 and 13. For the same purpose, tie rod holes may be optionally provided on either long sides 51, or central axis 332 of CCFs shown in FIGS. 8 to 11 and 15 as necessitated by the engineering requirements of the design.

In this disclosure, FIG. 2 and FIG. 3A depict CCF's 20 and 21 featuring apertures 52 and 80 (and 54 and 78) disposed diagonally at either end of product circulation chamber 103. Those familiar with the electrochemical domain will understand that this is not a limiting feature as the relative position of the feed/discharge channels can be different. Consequently, the apertures of other non-limiting pieces such as gaskets 14 may be adjusted according to the position of the apertures within the CCF. The two generally rectangular adjacent apertures at both ends of CCF's 20 and 21 and frame gaskets 30 align with each other and the corresponding apertures in gasket 14 when the electrolyser is assembled.

To help in the comprehension of the functional arrangement of the assembled electrolyser 10, the parts of which are shown detached in FIG. 2, a brief explanation of the relative positioning of the parts and their function is given.

While all these parts are shown separated from each other, in the assembled unipolar filter press electrolyser 10 the two (2) electroactive structures 102 located on either side of CCF 20 are electrically connected to either side of CCF 20. The electroactive structures 26 adjacent to the two outer CCF's 21 are similarly connected to their respective CCF.

As discussed, electrolyser 10 includes two preferably rigid end clamping plates 12 and 34. First and second full faced gaskets 14 each have two (2) apertures extending therethrough at diagonal corners of the gasket. First gasket 14 is "sandwiched" between end clamping plate 12 and first monopolar CCF 21. Second gasket 14 is sandwiched between end clamping plate 34 and second monopolar CCF 21. The apertures in first gasket 14 (apertures 110 and 111) align with the ports in end clamping plate 12 (49 and 59). Similarly, the apertures in second gasket 14 (apertures 94 and 109) align with the ports in end clamping plate 34 (48 and 57). Gaskets 14 are additionally in alignment with channel defining pathways for product and reactants in the respective CCFs 21, to be described later.

The pathways for products and reactants, or transfer channels 116, 117, 118, 119 are better visualized when described as explained below.

Reading from right to left on FIG. 2, first channel 116 is formed and passes through port 48 in end plate 34, and apertures 94, 98, 106, and 52, where all fluids collected or fed to are generally anodic. Masking of the cathodic CCF 21 the channel 116 passes through is provided by mask 22.

Similarly, reading from right to left on FIG. 2, second channel 117 is formed passing through port 57 in second clamping plate 34, and apertures 109, 101, 107, and 80 where all fluids collected or fed to are generally anodic. Masking of the cathodic CCF 21 the channel 117 passes through is provided by mask 24.

Reading from left to right on FIG. 2, third channel 118 is formed passing through port 49 in end plate 12, and apertures 110, 99, 90, 54, 90, and 99, where all fluids collected or fed to are generally cathodic. Masking of the anodic CCF 20 the channel 118 passes through is provided by mask 22.

Reading from left to right on FIG. 2, fourth channel 119 is formed passing through port 59 in end plate 12, 111, 100, 108, 78, 108 and 100. Masking of the anodic CCF 20 the channel 119 passes through is provided by mask 24. For simplicity, masks 22 and 24 are not used in the definition of the transfer passageways of future embodiments described later on, however they are provided as part of the transfer passageways as shown in the Figures.

The height of the apertures that define product transfer passageways 116, 117, 118, and 119 (along with the product transfer passageways of any of the other electrolyser embodiments described herein) may be further adjusted as required by the underlying electrochemical process, and application of the filter press stack.

Moving left to right in FIG. 2 a first CCF 21 is positioned against first gasket 14 followed by electroactive structure 26 and separator 28. A first set of masks 22 and 24 is inserted within channel apertures 98 and 101 of CCF 21, and a first set of channel-defining gasket support pieces 56 are inserted by friction fit at exemplary friction-fit insertion points 56A (shown in FIG. 3A) configured to receive a friction fit gasket support piece to complete the definition of apertures 100 and 99 in first CCF 21. Insertion points 56A for gasket support pieces are non-limiting and may be provided in alternative embodiments as necessitated by the gasket support piece. Gasket support pieces 56 control product and reactant passage into and out of apertures 100 and 99 in first CCF 21 through channels of a defined size, and support the structural integrity of the corresponding apertures 90 and 108 in a first gasket 30 when the system is clamped, such that transfer channels 118 and 119 are reinforced and products and reactants are controlled within their corresponding transfer channel.

First gasket 30 is positioned against the right hand face of CCF 21 followed by first electroactive structure 102 on the left hand face of CCF 20. A second electroactive structure 102 on the right hand face of CCF 20, a second separator 28, and second set of channel defining gasket support pieces 56 to complete apertures 52 and 80 in first CCF 20, follow. The second set of channel defining gasket support pieces 56 support the structural integrity of the corresponding apertures 106 and 107 in second gasket 30 when the system is clamped, such that transfer channels 116 and 117 are reinforced and products and reactants are controlled within their corresponding transfer channel. Gasket support pieces 56 further control product and reactant passage into and out of apertures 52 and 80 in second CCF 20 through the provision of channels of a defined size. A second set of masking frames 22 and 24 is inserted within corresponding channel defining apertures 54 and 78 of CCF 20. A second gasket 30 is positioned against the right hand face of CCF 20.

A second electroactive structure 26 is positioned between second gasket 30 and the left hand face of second CCF 21. A third set of masking frames 22 and 24 is inserted within corresponding channel defining apertures 98 and 101 of CCF 21, and a third set of channel defining gasket support pieces 56 are inserted to complete apertures 100 and 99 in second CCF 21. The third set of channel defining gasket support pieces support the structural integrity of the corresponding apertures 90 and 108 in second gasket 30 when the system is clamped, such that transfer channels 118 and 119 are reinforced, and products and reactants are controlled within their corresponding transfer channel. Gasket support pieces 56 further control product and reactant passage into and out of apertures 100 and 99 in second CCF 21 through the provision of channels of a defined size. A second full faced gasket 14 is sandwiched between second CCF 21 and the second end clamping plate 34.

The function of masks 22 and 24 is dual fold: for load distribution when the electrolyser is clamped, and to prevent the electrically charged fluids of one polarity from being in contact with the metallic CCF of the opposite polarity, in order to prevent undesired electrolytic reactions within the four transfer channels 116, 117, 118 and 119. Adjacent first and third channels are electrically insulated by mask 22, for example placed in third aperture 54 of CCF 20. Similarly, for providing electrical insulation between adjacent second and fourth channels, mask 24 is placed in fourth aperture 78 of CCF 20.

The purpose of gaskets 30 is to provide a means for sealing the periphery of the circulation chamber 103 and that of the four adjacent apertures between the internal pressure of system 10 and external atmospheric pressure. Gaskets 30 are also required to distribute load within the filter press stack. In an alternate embodiment, said masking frames (22, 24) are placed within the apertures of the sealing and electrically insulating gaskets 30, such that they align with their corresponding product transfer passageways, rather than being placed in the apertures of the CCF itself.

When the system is clamped, full faced gaskets 14 distribute pressure across the stack to seal gaskets 30 and masks 22, 24. The purpose of gaskets 14 is also to provide a terminal seal between the internal fluids and the external atmosphere and to provide electrical isolation between first CCF 21 and first clamping plate 12 at one end of the filter press assembly and between second CCF 21 and second clamping plate 34 at the other end of the assembled system 10. The purpose of gaskets 14 is also to provide a means for sealing the periphery of chamber 103 and channel defining apertures 98, 99, 100 and 101 of CCF's 21 against the inner face of rigid plates 12 and 34.

Those skilled in the art will realize that the gaskets and masks as shown are non-limiting, and that additional masking may be provided to assist with material stability, engineering requirements, and protection from corrosion. Gaskets (14, 30) and masks (22, 24) should be provided from a material that is electrically insulating, such as an elastomer, fluoropolymer, or thermoplastic, or combination thereof. In particular they may be provided from a high-performance thermoplastic elastomer (such as Santoprene™), from EPDM (ethylene propylene diene monomer) rubber, from a polytetrafluoroethylene compound (such as Teflon™), polypropylene, polyethylene, or from a synthetic rubber and fluoropolymer elastomer compound (such as Viton® rubber).

To elaborate further on gaskets 30, such gaskets do not provide any current carrying capabilities, or depth to the cell for product circulation. For example, the ratio of CCF (20 or 21) depth 103A to the depth of gasket 30 can be preferred as low as 1:1, however designs may preferably increase CCF depth 103A to ratios in the range of 10:1 (where CCF depth is 10 times the gasket depth), or to any ratio greater than this as best suited to the engineering requirements of the electrochemical process.

Further, achieving depth for product circulation as part of the CCF (a low-cost metal conductor) is preferred economically to providing depth through an insulating gasket material, particularly if the metal of the CCF has a lower cost than the insulating gasket material. It would further not be functional for insulating gaskets 30 to be increased in depth for the purpose of creating space for product circulation; as the created circulation space would be located between an electroactive structure (26 or 102) and separator 28, which would negatively disrupt the hydrodynamics of product circulation. Therefore, a large ratio between CCF depth 103A and the depth of gaskets 30 is preferred as described above, but non-limiting in view of other ratios which may be used.

The function of separators 28 is to divide the positive and negative electrochemical reaction regions, thereby separating the anolyte and catholyte in all of the unipolar filter press stacks presently described. Separators 28 also provide a barrier which prevents or minimizes gases produced on the anodic electroactive structures and the cathodic electroactive structures to mix, while at the same time allowing for ions in solution to pass through it. Separators 28 may be provided from a diaphragm-type or membrane-type separator material as appropriate for the underlying electrochemical process. As non-limiting examples, separator 28 may be provided from felt, porous polysulphone, polyphenyl sulphide, or another type of cation exchange or anion exchange membrane.

The purpose of the clamping plates 12 and 34 (as well as the equivalent plates 312, 334, 412, 434, and 512, 534 shown in other figures) is to provide strong and rigid mechanical structures for applying the required sealing pressure on the gaskets and masks (14, 30, 22, 24) to seal the periphery of the apertures, by means of an external filter press clamping device.

The purpose of electroactive structures 102 (positive, anodic in the case of electrolysis) is to provide an interface for electrons and reactants to electrochemically react on the conductive surface and for the product to leave from the conductive surface. The purpose of electroactive structures 26 (negative, cathodic in the case of electrolysis) is to provide an interface for electrons and reactants to electrochemically react on the conductive surface and for the product to leave from the conductive surface.

The separators 28 and electroactive structures 26 and 102 have approximately the same size and shape. The CCF's 20 and 21, the frame gaskets 30, and gaskets 14 have approximately the same rectangular dimensions. When assembled, the outer peripheral edges of all these components are generally aligned. Electroactive structures 26 and 102 and separators 28 are shorter than 20, 21, 30 and 14 so they do not encroach on any of the CCF apertures (52, 54, 80, and 24) which connect to transfer passageways.

Those skilled in the art of electrolysis will understand the circularity of the apertures in gaskets 14 and end plates 12 and 34 is non-limiting, and apertures of a variety of other generally rectangular, ovular, or polyhedral shapes may be alternately employed. Further, the apertures in the CCFs presently described are depicted as rectangular in the Figures, however those skilled in the art of electrolysis will understand they could be provided in other shapes such as: square, ellipsoidal, oval, or another polygon. The apertures may further have their corners substantially rounded to avoid the creating stagnant flow regions which may cause corrosion or lower the throughput of gas product at sharp crevices.

The purpose of outwardly extending tabs 64 (FIG. 3A) is to provide one embodiment of the location in a filter press where electrical connections are made, either to an adjacent unipolar filter press stack, to a power supply (power conditioning equipment), or to any other source of direct current electrical supply or generation to allow the flow of current to or from electroactive structures 26 and 102. Frame section 55 of CCF 50 (FIG. 3A) is laterally thicker than its opposed frame section 51, and includes one or more outwardly extending tabs 64 in one embodiment. In another embodiment, in place of tabs 64, a hole or other feature may be provided such that an external bus bar clamp, or other form of electrical connection, can be applied to form an electrical connection with frame section 55.

The tabs for electrical connection 64 are preferably equidistantly spaced, and are of a width approximately proportional to the CCF depth. Tabs 64 bring current linearly across the whole CCF, and provide sufficient electrical contact between the CCF and the busbar connecting to the external power supply (one type of electrical connection). The dimensions of the tabs for electrical connection 64 are non-limiting in this disclosure.

In the case of the filter press stack 10, the electrical connection is made by connecting one polarity of a power supply (generally DC current) and tabs 64 on one side of the filter press stack. The tabs 64 on the other side of the filter press stack are attached to the opposite polarity of the power supply. The power supply polarities provided to the tabs 64 define the polarities of the entire system (i.e. the positive and negative symbols shown in FIG. 2). In a preferred embodiment, tabs 64 for electrical connection are provided with serrations 64A on one or more surfaces to improve the electrical connection between the CCF and the power supply.

To create an electrolysis system that connects two filter press stacks 10, the second filter press stack 10 would be located adjacent to the first in a manner such that their tabs for electrical connection 64 were approximately aligned facing each other, and that an electrical connection between the two sets of tabs is made. The electrical connection between the two sets of tabs 64 may be provided through a variety of methods, including but not limited to conductive bus bars and conductive wires. In this manner, the unipolar filter presses are connected in series with each other, together creating an electrolysis system of two filter press stacks. Additional filter press stacks 10 may continue to be added in this way to laterally expand the system.

The paragraphs following this relate to provisions for reactant and product circulation in a unipolar filter press electrolyser based on CCF's. Particularly the unipolar filter press assembly 10 shown in FIG. 2 is referred to. However, the provisions for reactant and product circulation described herein may be equivalently applied to the embodiments of FIG. 7 (310), FIG. 12 (410), and FIG. 14 (510) and their corresponding reactant and product ports as described later on. The methods may further be applied to any other CCF-based electrolyser embodiment. The discussion below is carried out using the example of alkaline water electrolysis for ease of comprehension, however the provisions for circulation discussed below may further be equivalently applied to a unipolar filter press for chlorine electrolysis, or any other process for which a unipolar filter press of CCF's are employed.

In one configuration, alkaline water electrolysis, the preferred orientation of the filter press has tall vertically oriented CCF's which allow electrolytically produced hydrogen and oxygen gases to rise vertically within the circulation chamber 103. Oxygen generated on the anodically polarized CCF's electroactive surfaces structures (as indicated by 102 in FIG. 2) will rise and cause gas-lift circulation of the anolyte and the oxygen gas mixture within the CCF's structure (and between the two electroactive surfaces of the same anodic potential). The anolyte and oxygen gas product will travel out of the CCF electroactive area to the associated product removal channel through pathways defined by gasket support pieces 56 and then via first transfer passageway 116 to a location where gas liquid separation and electrolyte recirculation into transfer passageway 117 can occur in end plate 34.

The cathodically polarized electroactive structures 26 will generate hydrogen gas. The hydrogen gas will provide a lifting means to move the catholyte and hydrogen mixture up through the CCF's 21 through pathways defined by gasket support pieces 56, and then via third transfer passageway 118 to a location where gas liquid separation and electrolyte recirculation into transfer passageway 119 can occur in end plate 12.

In an embodiment where it is preferable for internal gas/liquid circulation to be provided in between end plates 12 and 34, two additional CCFs with no electroactive structures may be employed at any point in the stack; one to connect corresponding catholyte output/input passageways, and one to connect corresponding anolyte output/input passageways. These additional frames are referred to as "downward circulation frames," as they circulate reacted electrolyte downwards within the stack from the output to the input product transfer passageway.

For example, a cathodic downward circulation frame may be applied in FIG. 2 (in addition to the required non-limiting gasket and mask parts to allow for proper sealing and insulation) to connect catholyte from the cathodic output passageway 118, such that it falls down through the force of gravity into the cathodic input passageway 119, all without exiting the filter press. The cathodic gas would be separated from the catholyte liquid in passageway 118, before the gas product passes through end plate 12 and exits the filter press. In addition to the cathodic downward circulation frame, an equivalent anodic downward circulation frame would further be required to equivalently connect anodic output passageway 116 to the anodic input passageway 117.

In place of using CCFs without electroactive structures as downward circulation frames, any other part that allows equivalent provisions for downward circulation may be employed as downward circulation frames. Discharge and feed channels may further be provided at other locations within the filter press stack, with suitable equivalent product/reactant feed/removal ports inserted therein.

Those skilled in the art will understand methods of adding feed water, cooling water, returning electrolyte from the external capture devices, provisions for gas liquid separation, and the creation of mixing zones of the anolyte and catholyte to ensure the overall electrolyte has minimal differential electrolyte concentration gradients. These non-limiting methods may be applied to provide internal or external circulation.

Those skilled in the art will further understand methods of maintaining elevated absolute pressure within the mechanical capacity of the filter press to withstand, as well as methods of controlling levels of catholyte and the anolyte in the circulation system and differential pressures in the circulation system.

To provide further information on particularly useful features of the CCF in the optimization of filter press efficiency to its target application, some additional details are provided. In summary, the CCF width (as represented by members 53, or 57, or 353 described later on), the height (as represented by members 51, or 55), and the depth (provided at circulation chamber, 103A) of all CCF embodiments presently described are parameters which can be selectively engineered, such that a given CCF embodiment is tailored to suit the engineering targets of its application. In particular, the width, height, and depth parameters can be tailored to meet a given cost target, an electroactive surface area target (for product generation space), a pressurization target, and/or an overall efficiency target. The ability to tailor these parameters to the application's targets without technology-imposed constraints or substantial incremental costs is a core advantage of the CCF design, as applied to create a unipolar filter press electrochemical cell.

For example, pressure characteristics are best optimized by the embodiments of FIG. 4A and FIG. 6A, through customizing the quantity of struts in the design, defined respectively as 69 or 58 and discussed later on. One of the purposes of the struts 69 and 58 is to provide mechanical reinforcing strength to the CCF. The greater the number of struts for a fixed CCF height, the greater the CCF's ability to operate at elevated pressure, while still retaining its preferred rectangular geometry. Furthermore, the height of the CCF can be continuously increased while still retaining this preferred rectangular geometry through the provision of additional struts, as required to continue supporting the CCF's mechanical integrity at the target pressure. The presence of struts 69 or 58 in a CCF further enables minimization of the lateral width of side members 51 and 55 (otherwise required at larger widths for mechanical support), while still achieving a "rugged" design capable of pressurization above atmospheric pressure.

In addition to the conducting struts enhancing mechanical strength, because they are made of the electrically conducting material of the frame itself, these struts also improve current conduction to the electroactive surfaces through direct connection. In the preferred embodiment of FIG. 5A, conducting spears 76 are provided instead of conducting struts, and will be described later on. Spears 76 provide an alternative method to improve the electrical conductivity of the CCF through direct connection. The spears however do not contribute to reinforcing the mechanical integrity of the CCF for pressurization, as the struts of the preferred embodiments of FIG. 4A and FIG. 6A do. As a whole, improvements to CCF conductivity through the provision of any of the additional conducting features (i.e. any described spears or struts) contributes to improving the overall efficiency of a unipolar filter press device.

It is particularly of interest that the conducting features' height, width, and depth can be precisely adapted to further optimize current conduction for a given CCF application. For example, by increasing the depth of a conducting feature 69, 76 or 58 (achieved by increasing CCF depth) while maintaining a fixed height and width of the feature, the cross-sectional area of the feature is increased. Increased cross sectional area of the conducting feature consequently improves current conduction to the electroactive structure. It is possible to increase the cross-sectional area of a conducting feature by increasing its height or width as well, however, this comes with the efficiency and cost trade-off of subtracting space from the available electroactive surface area for product generation (i.e. total area of the electroactive structure−surface area in direct contact via conducting feature=practical available surface area for product generation). By increasing the CCF depth to improve conduction, rather than increasing the height and width of the conducting features, improvements to conduction are achieved without subtracting any excess practical surface area for product generation.

The presence of additional conductive features within a CCF further enables the use of thinner electroactive structures, as compared to a CCF embodiment without any additional conductive features. The use of thinner (and consequently less costly) electroactive structures is enabled as the added conductive features support a portion of the lateral current, conducting across the CCF over the electroactive structures. Because the additional conductive features support lateral current conduction, they further allow for a CCF laterally wider than shown to be designed, such that the length of lateral cross members 53, 57 is increased. It can be desirable to achieve a laterally wider CCF design to increase the practical product generating surface area of the CCF, as the electroactive structure applied to the widened CCF is proportionally wide. Therefore, a CCF with additional conductive features may advantageously be modified in lateral width to achieve large surface area targets at low incremental cost. Customization of electroactive surface area can further be provided by adjusting the vertical height of the CCF. The CCF design being substantially rectangular, vertical height expansion allows for an efficient use of plant area. Preferably, the rectangular geometry of the CCF comprises a height to width ratio in the range of 2:1 to 6:1, however this feature is non-limiting and may be adjusted to best suit the engineering requirements for the application of the device.

Finally, variations in electrolyte volume, gas and liquid velocity, as well as the void fraction of electrolytic gases within circulation chamber 103 of any CCF embodiments presented in this disclosure can be controlled in part by adjusting the CCF's depth.

Referring to FIG. 3A through 3D, preferred CCF 20 and CCF 21 embodiments of FIG. 2 will be described in more detail. CCF 20 and CCF 21 are essentially identical except for the fact that they are of different polarity, depending on their position in the assembled electrolyser 10. They are not mechanically different. Subject to the CCF polarity and corrosion processes, they may or may not be physically different from each other. For example, an anodically polarized CCF may require a surface treatment such as nickel plating or dimensionally stable materials of construction as compared to a cathodically polarized CCF.

Each of CCF's 20 and 21 includes an electronically conductive frame 50 having two side members 51 and 55 and two lateral cross members 53. Frame 50 is made from a conductive material suitable for the intended application of CCF 20 and CCF 21 and may be made of carbon steel, nickel plated steel, titanium, nickel, carbon, and alloys. They may also be provided with coatings known to those in the art that are resistant to the corrosive effects of the environment in which the CCF 20 and CCF 21 are to be placed. Non-limiting example environments in which CCF 20 and CCF 21 may be placed include, but are not limited to, sodium chloride, sodium hydroxide, potassium hydroxide, chlorine, hydrogen, oxygen, sodium hypochlorite, sodium chlorate and sulphuric acid. All of the CCF embodiments discussed in this disclosure may be provided from the same group of materials listed above.

Frame 50 and other variations of it are designed particularly to minimize the impact of corrosion. Crevices and stagnant areas where corrosion may occur are avoided where possible in the design. In this and in all CCF embodiments presently disclosed, the presence of notches 66 and 67 along the inner surface of the long frame members 51 and 55 is an optional beneficial provision to maximize the vertical length of the circulation chamber (103) while defining the lateral width of their adjacent aperture (52 or 80) consequently defining the lateral width of the product transfer passageway that passes through said aperture (52 or 80). For example, the lateral width provided for product transfer passageways 116 and 118 in FIG. 2 would be impacted by the lateral width of notch 66 into aperture 52, and the lateral width provided for product transfer passageways 117 and 119 in FIG. 2 would be impacted by the lateral width of notch 67 into aperture 80. In one embodiment, the notches 66 and 67 are sized to provide a similar cross-sectional area in the adjacent apertures (52, 54 and 78, 80) after masks 22 and 24 are applied, while maximizing available circulation chamber volume 103.

All CCFs presently disclosed are provided as one integral part, which may be manufactured through a variety of methods. These manufacturing methods are non-limiting and may include any one or combination of: laser cutting, plasma cutting, water jet cutting, machining, sand or investment casting, or any other applicable manufacturing technology.

In an embodiment, any of the single CCFs presently described may be provided with an additional channel in strut (or "arm") 115 (or equivalently struts 360 and 315 for a double CCF, which bound catholyte and anolyte input passageways) such that anolyte and catholyte mixing may occur between the associated transfer passageways feeding into circulation chambers 103, to favourably adjust the concentration gradient within the electrolyte. In embodiments where an aperture for anolyte and catholyte mixing upon input into the filter press is inserted ("mixing aperture") in strut 115 (or equivalent struts bounding catholyte/anolyte input passageways), an additional gasket support piece 56 with channels may be provided to fit within the bounds of the mixing aperture. As described later, such a gasket support may be provided to be friction fit in the mixing aperture, or in an alternate embodiment a gasket support may be provided integrally of the CCF, with additional through-channels provided to allow mixing.

Figure 3B:
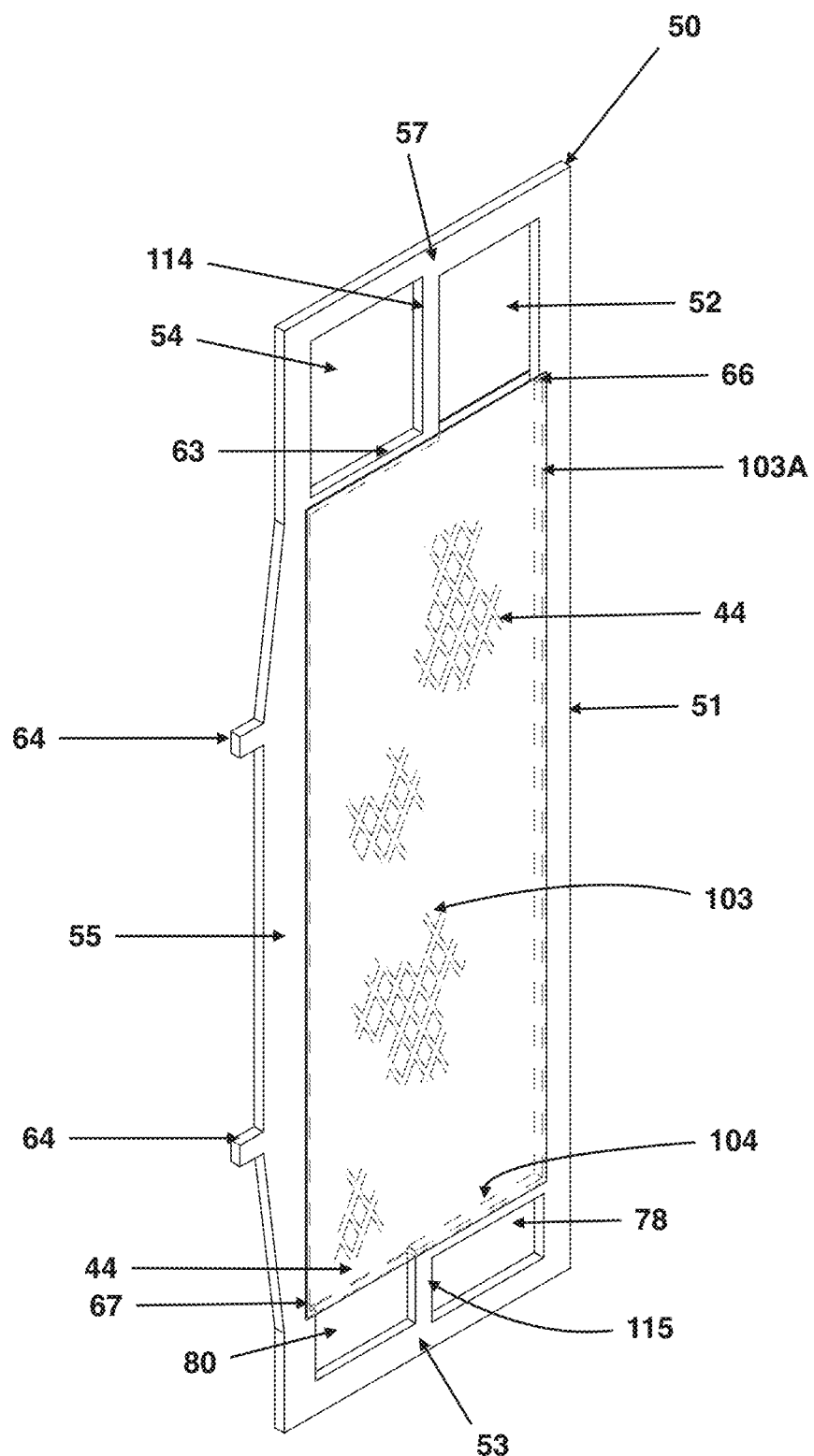
FIG. 3B shows an isometric view of a unitary current carrier, product circulation chamber, and structural frame according to the present disclosure for use in unipolar filter press type electrochemical devices additionally comprising exemplary electroactive structures on opposing sides of the part.
Figure 3C:
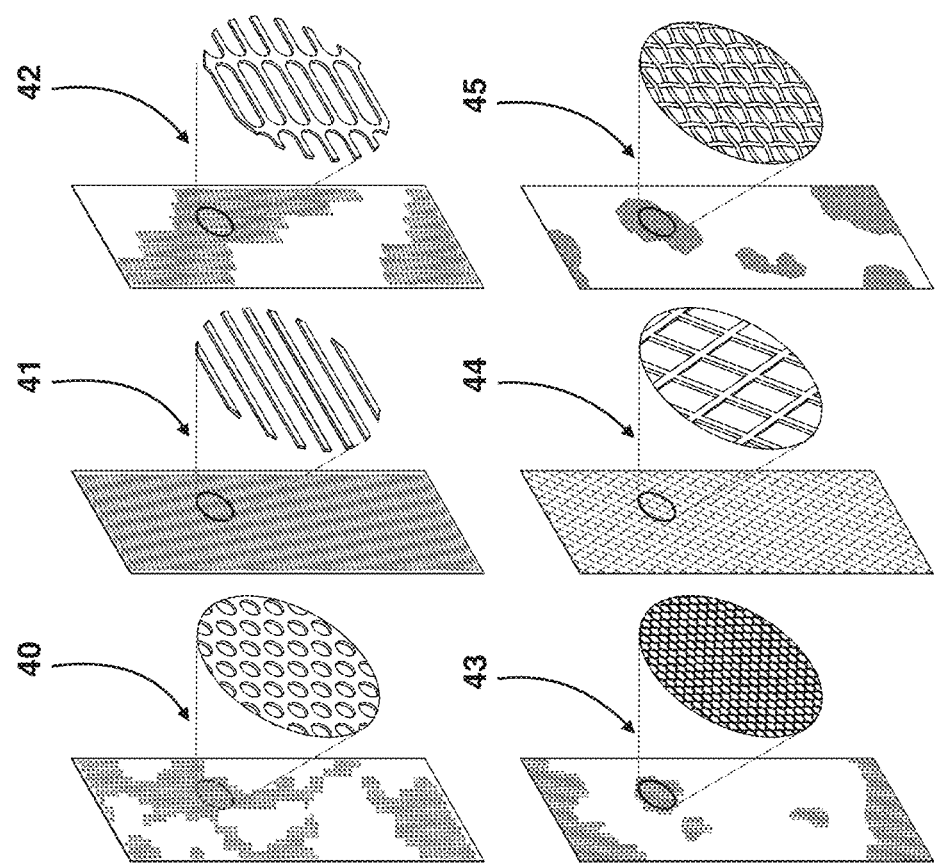
FIG. 3C shows an isometric view of simplified sketches of a range of electroactive structures for a unitary current carrier, product circulation chamber, and structural frame.

FIG. 3B shows the preferred CCF embodiment 50 with electroactive structures (equivalent to 102 or 106) attached. FIG. 3C shows a variety of exemplary electrode structures 40, 41, 42, 43, 44 and 45, any of which may be substituted equivalently for electrode structures 102 or 26 provided in FIG. 2. The structures shown in FIG. 3C could be comprised of any solid conductor, either single metal, or alloy or a coated metal or alloy, and include: a planar sheet of circular perforations 40, sheet 41 being of a perforated sheet of continuous slots, sheet 42 being of a perforated sheet of repeated slots, sheet 43 being of a sheet of hexagonal perforations, sheet 44 being an expanded metal sheet, and sheet 45 being a woven mesh. Those skilled in the art of electrolysis will understand that the electrode surface structure employed is non-limiting. For example, perforated sheets of other shapes or a metallic wool may also be employed as an electroactive structure. While some of the structures shown in FIG. 3C are shown with some blank space to simplify their visualization, all structures are continuous.

All electroactive structures presently described are obviously perforated or otherwise "openworked" to permit the transport of the products or reactants between the separator 28 and the circulation chamber 103 as shown in FIG. 2.

The diamond shaped apertures shown of electroactive structures 26 and 102 of FIGS. 2 and 44 in FIG. 3B, and further electroactive structure aperture designs shown by 40, 41, 42, 43, 44 and 45 in FIG. 3C are for illustrative purposes only; such apertures can be of any configuration suitable for the adequate operation of the electrochemical system at use.

While any of the electrode structures 40 to 45 may be employed in any of the embodiments of the present disclosure, thick, mechanically robust embodiments of electroactive structures 40 to 45 are preferred with CCF embodiments such as frame 50 in FIGS. 3A and 3B that do not possess additional features for electrical conduction and mechanical support such as shown in FIGS. 4A to 6A, to provide additional rigidity and conduction capabilities. CCF embodiments which do possess additional conductive and structural features may be provided with a thinner electroactive structure of comparatively lower electrical conductivity.

Electroactive structures may be attached through a variety of manufacturing methods. These manufacturing methods are non-limiting and may include any one or combination of: press-fitting, spot welding, thermal welding, ultrasonic welding, electron beam welding, laser beam welding, tungsten inert gas welding, or any other applicable technology.

Generally, in order to attach the electroactive structure to the CCF, welds would be performed on some or all the planar surfaces surrounding the chamber 103, particularly on the sides of the frame. In embodiments described later on (FIG. 4B, FIG. 5B, FIG. 6B) with lateral struts or conductive structures welding may be additionally provided on the lateral struts or conductive structures. Generally, in all cases, electroactive structures are substantially flush with the outer surfaces of the CCF they are attached to.

If metallic wool were to be used as an electroactive structure, the manufacturing method of press-fitting would be the preferred method of its attachment to the CCF. In a press fit, one may only need attachment at a few (or no) uniquely dedicated locations, thus reducing the precision required in assembly and the total assembly costs. In the "press-fit" embodiment using a CCF with lateral struts or conductive structures (such as FIG. 4B, FIG. 5B, and FIG. 6B described later on), no welding would be required. In one embodiment of a press-fit, conductive struts 69, and 58, from FIGURE's 4 and 6 described later are squeezed against opposing struts in the next CCF, providing additional support for the screen mechanically to improve electrical contact.

Figure 3D:
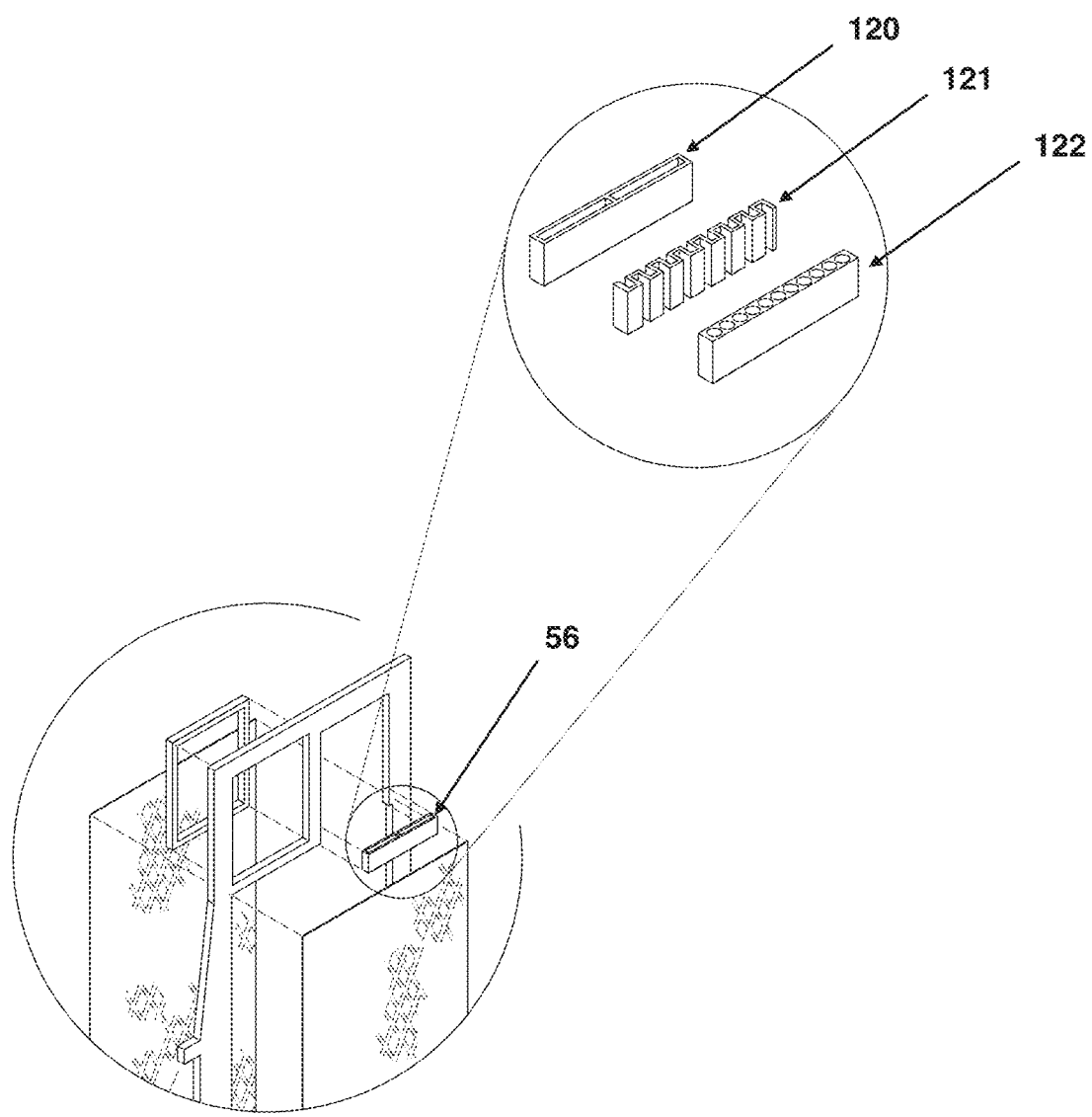
FIG. 3D shows a disassembled isometric view of various insertable gasket-support components further comprising flow controlling channels.

Frame 50 when used in CCF 20 is constructed such that it defines a circulation chamber 103 that is hydraulically connected to the channel defining apertures 52 and 80 via channel defining gasket support pieces 56 seen in FIG. 2 and FIG. 3A. Frame 50 when used in CCF 21 is constructed such that it defines a circulation chamber 103 that is hydraulically connected to the channel defining apertures 99 and 100 via channel defining gasket support pieces 56 non-specifically described but identical to pieces 56 as mated to CCF 20 in FIG. 2 or CCF 50 in FIG. 3A at the provided insertion points 56A. Gasket support pieces 56 are non-limiting, and may further be substituted interchangeably for any of gasket support pieces 120, 121, or 122 as shown in FIG. 3D or any alternative gasket support piece serving the equivalent purposes of: controlling product and reactant passage through apertures 99 and 100 in CCF 21, controlling product and reactant passage through apertures 52 and 80 in CCF 20, mechanically supporting first and second gaskets 30, ultimately mechanically supporting the integrity of transfer passageways 116, 117, 118, and 119.

The gasket support pieces 56 can be used interchangeably with any of the CCF embodiments described in the figures. Gasket support pieces 56 (or 120, 121, or 122) are preferably made from a metallic material, and may be made of carbon steel, nickel plated steel, titanium, nickel, carbon, and alloys or coatings on substrates known to those in the art that are resistant to the corrosive effects of the environment in which the CCF 20 and CCF 21 are to be placed. Gasket support pieces 56 may alternatively be provided from polymeric, ceramic materials, or a combination of metallic, polymeric and ceramic materials that fulfil the equivalent purposes.

Gasket support piece 122 shows an embodiment in which a plurality of holes are drilled through the member for liquid flow from chamber 103 up to the upper passageway. Gasket support member 121 is produced as a wavy structure while gasket support 120 has two slots located therein rather than a plurality of holes.

In one embodiment, gasket support pieces 56 may be provided from the same unitary part as the CCF itself as shown in 56B in FIGS. 3F and 3G; such that an insertable electrically conductive strut with through-channels similar to cross strut 58 described later on is received where gasket support piece 56 is shown in the assembly of FIG. 2. In another embodiment, a non-removable gasket support piece comprising channels embedded therein may be provided as part of the CCF itself at any location where gasket support piece 56 is shown. The selection of a removable or non-removable gasket support piece 56 is dependent on cost of manufacturing, and either gasket support piece embodiment may apply to any single CCF or double CCF embodiment presently described.

Figure 3E:
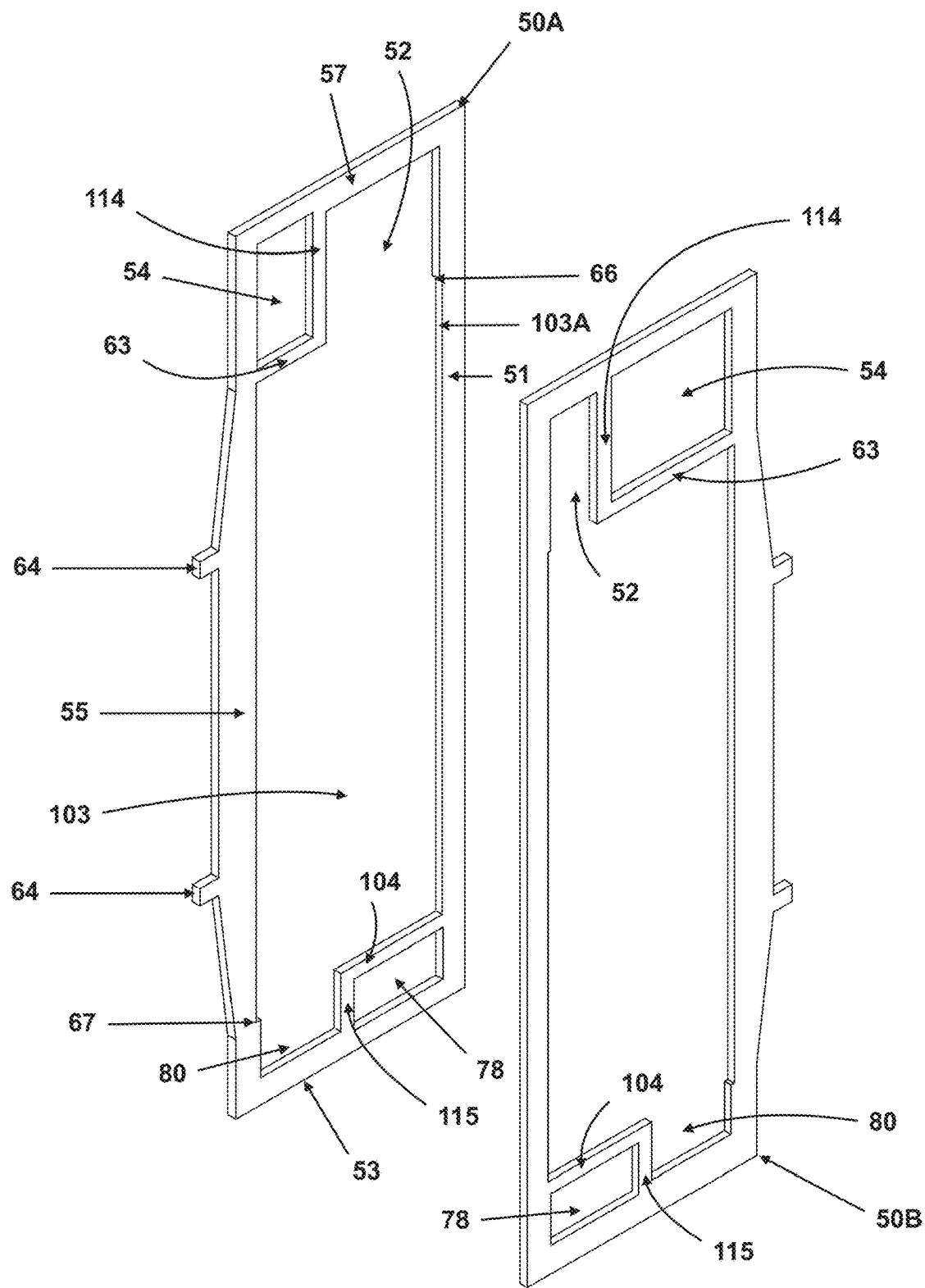
FIG. 3E shows an isometric view of exemplary embodiments of a pair of unitary current carriers, product circulation chambers, and structural frames according to the present disclosure for use in unipolar filter press electrochemical devices wherein one is distinctly an anode and one is distinctly a cathode.
Figure 3F:
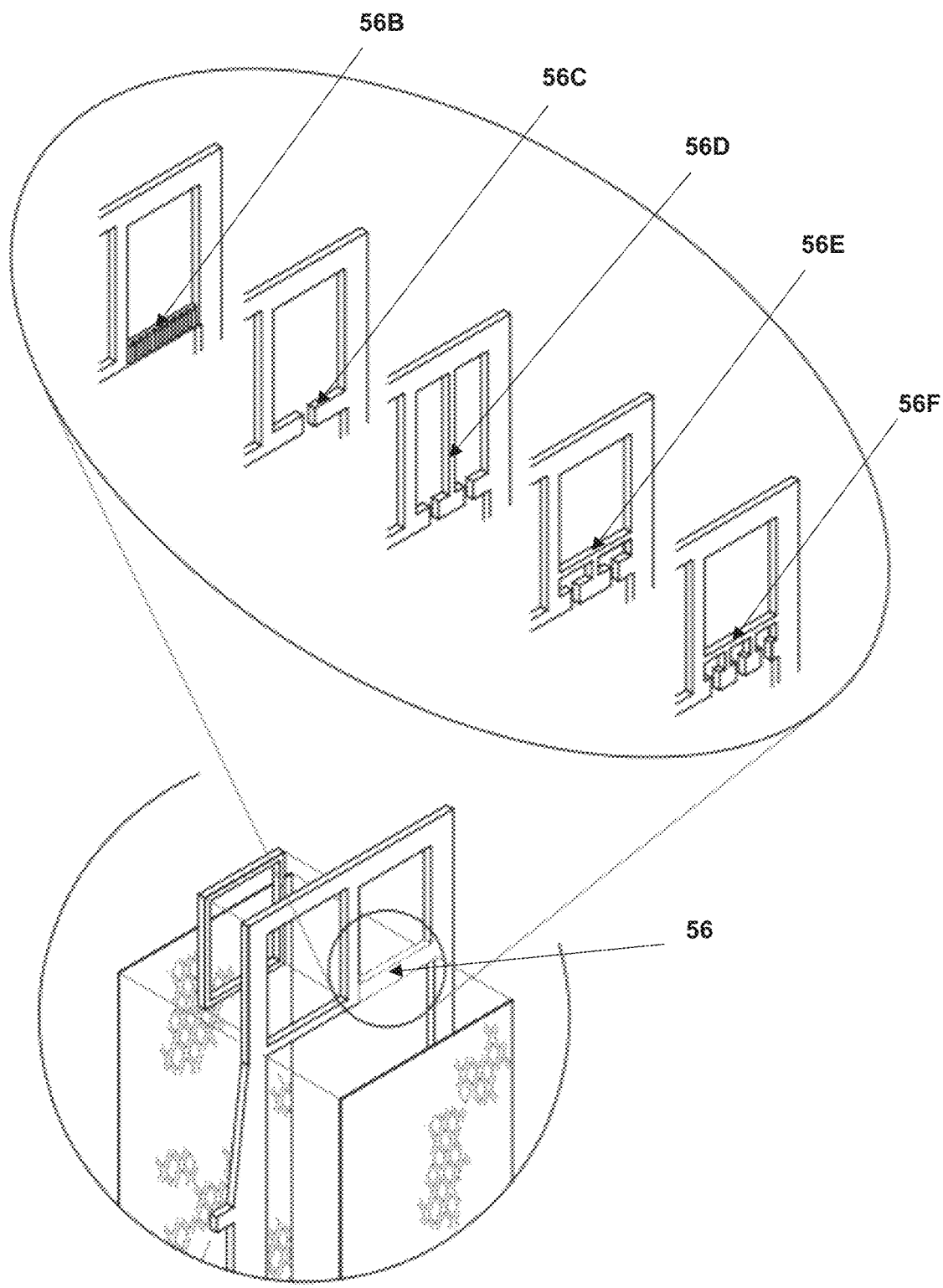
FIG. 3F shows a disassembled isometric view of various alternative embodiments of gasket-support components, said alternative gasket-support components being provided integrally as part of the unitary current carrier, product circulation chamber, and structural frame.
Figure 3G:
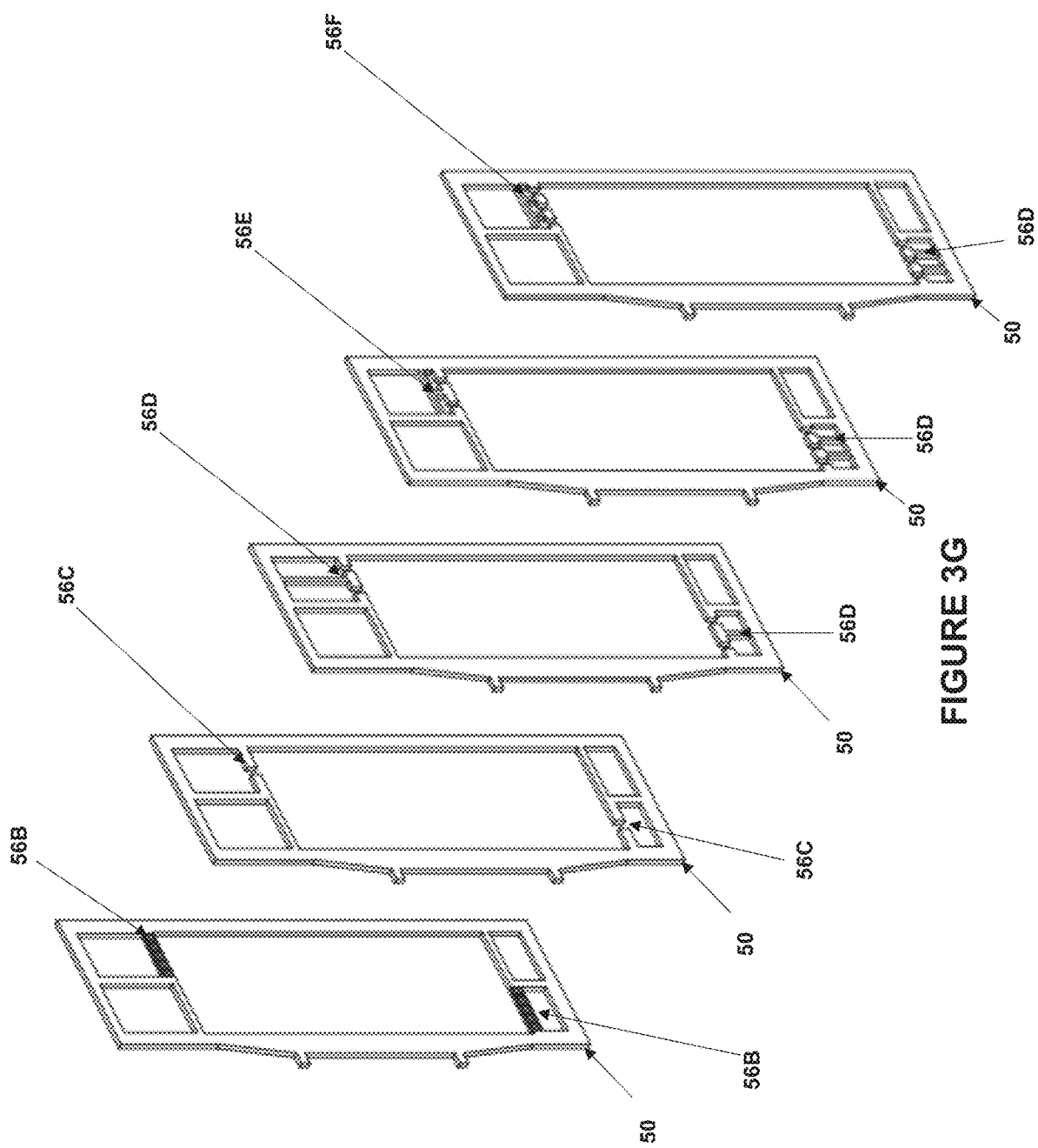
FIG. 3G shows an isometric view of exemplary alternative embodiments of unitary current carriers, product circulation chambers, and structural frames according to the present disclosure for use in unipolar filter press electrochemical devices wherein alternative embodiments of gasket-support components are provided integrally as part of the unitary current carrier, product circulation chamber, and structural frame.

Alternative embodiments of integrally provided non-removable gasket support pieces with one or more through-channels configured to allow products and reactants to pass through it in operation, specifically such that gases and liquids may pass in a controlled manner between circulation chamber 103 and a product transfer passageway (such as 116-120) are shown in FIG. 3F and FIG. 3G. Gasket support 56B is formed by means of subtractive manufacturing such that channels are provided therein, and further, as with the other integral gasket supports, 56B may be integrally provided between any opposing L-shaped member and CCF side arm it is positioned between. The gasket support embodiment of 56C is provided with one through-channel aperture for controlling gas/liquid flow based on the dimensions of the aperture. In embodiment 56D, a gasket support and two adjacent apertures are created by extending an integral part of the CCF's upper lateral cross member 57, thus dividing the one aperture below it into two, and supporting adjacent gaskets by means of the general "T-shape." Finally, in gasket support embodiments 56E and 56F, two or more through-channels are provided in an integral horizontal cross member by means of "negative T-shaped apertures." In this configuration, the horizontal cross member gasket support is provided with an extended vertical dimension, such that a portion of the "negative T-shape" therein allows liquids and gases to flow into the adjacent aperture (52). The integral horizontal cross member would continue to provide support for the adjacent gasket.

Those skilled in the art of electrolysis will further comprehend that gasket support pieces applied at opposite ends of the CCF may be different in size or structure.

In another embodiment, only one gasket support piece 56 is provided, between apertures 52 and 54 as shown in FIG. 3D, where reacted electrolyte and gas output occurs in electrolysis. A gasket support piece on the opposite end between apertures 78 and 80 is optional in this embodiment, as the control of liquid reactant entry into the chamber 103 may not require regulation by a gasket support piece in all cases. Equivalently, in double CCF embodiments described later on, there may be provided gasket support pieces only where gas product output and reacted electrolyte output occurs, such that gasket support pieces where liquid entry into circulation chambers 103 occur are optional.

In another embodiment, shown in FIG. 3E, modifications to the CCF 50 (or equivalently any other CCF described presently) are made to change the size of the anodic and cathodic gas transfer passageways. Depending on the electrolysis process, it may be preferable for the transfer passageway of one gas product to be greater in cross section (laterally and/or vertically) than the other. When arm 114 is laterally equidistant between members 51 and 55, the space provided for adjacent transfer passageways is equal, and such a CCF may be utilized as an anode or cathode equivalently when configured in a filter press such as the exemplary filter press embodiment of FIG. 2. CCF Figures provided in this disclosure are generally made such that a CCF may be utilized as an anode or cathode equivalently for ease of comprehension, however this does not limit other possibilities for CCF embodiments where CCF anodes and cathodes are distinct from one another.

For example, in another embodiment a CCF cathode is made substantially equivalent to frame 21 or 50, however additionally its arm 114 being positioned closer to frame member 55 than frame member 51, such that aperture 52 (and its associated product transfer passageway) is consequently increased in lateral width while aperture 54 (and its associated product transfer passageway) and arm 63 are reduced in lateral width. In FIG. 3E this embodiment is shown as 50A. In this embodiment, in order to assemble an exemplary filter press embodiment substantially equivalent to FIG. 2, a complementary anodic CCF embodiment made, 50B, its arm 114 being oppositely adjusted, such that aperture 52 (and its associated product transfer passageway) is consequently reduced in lateral width while aperture 54 (and its associated product transfer passageway) and arm 63 are increased in lateral width. In another embodiment the opposite configuration is provided, such that 50A is an anode and 50B is a cathode, such that the gas product passageway of the anodic product is increased in size and the gas product passageway of the cathodic product is decreased in size. Alternatively, in another embodiment arm 115 is adjusted in height or lateral position such that the size of the passageways that feed into the circulation chamber 103 are changed.

Such embodiments are particularly useful where the gas/liquid separation of one product (either anodic or cathodic) is achieved more readily than the other. For example, experimental data for alkaline water electrolysis has suggested the gas liquid separation of oxygen from the anolyte is provided more readily than the gas liquid separation of hydrogen from the catholyte. Therefore, it may be beneficial to increase the size of the cathodic product transfer passageway such that the hydrogen gas is allowed greater space in its transfer passageway.

To assemble a full filter press stack around CCF cathodes and anodes wherein the gas off-take transfer passageways are provided of different sizes; all of the same parts (gaskets, masks, separators, gasket supports) as previously described in FIG. 2 are provided as shown, however with corresponding adjustments as necessitated in shape and placement adjacent to their designated CCF such that the stack is appropriately sealed. Any other CCF embodiment, such as double CCF embodiments or embodiments with additional product transfer passageways described later in the present disclosure, may also be provided in alternative embodiments where anodic and cathodic transfer passageways are of differing sizes, thereby necessitating the size of apertures intended for gas off-take be adjusted, along with the corresponding non-limiting stack assembly components.

Slight modifications to the CCF may be optionally provided when required to improve the sealing of the assembly. The perimeter of circulation chamber 103 may be slightly recessed on one or more faces in order to ensure the electroactive structures are substantially flush to the surface of the CCF. Further, one or more continuous negative grooves may additionally be cut from both planar faces of any of the CCF embodiments presently described. The negative grooves when applied are preferred around the periphery of all apertures in the frame, such that gasket and mask components in the assembly are ensured to be flush to the surface of the CCF.

To provide further information on the applications for the CCF embodiments shown in FIG. 3A and FIG. 3B, some additional details are provided. The CCF 50 as shown in FIG. 3A and FIG. 3B may be applied in any unipolar filter press electrochemical assembly (such as those as shown in FIG. 2 and FIG. 7), however it is particularly preferred in a narrow embodiment, for example where the lateral cross members 53 of the CCF is provided in approximately 8 inches or less, as dependent on the allowable resistive voltage loss through the electroactive structures 44, and the current carrying capabilities of the electroactive structures employed on the CCF.

As there are no additional conducting features provided in this embodiment, the majority of the current carrying occurs across the electrode structure alone, beginning on the left side adjacent to tabs 64, then moving to the right (i.e. "parallel" to the electrode structure as is shown in FIG. 16A). A comparatively lower conductive loss would occur with current travelling a shorter distance across the narrow embodiment, as supported by a robust, conductive electroactive structure. This embodiment would also minimize manufacturing costs as no additional conductive features or channels are required, and CCF weight would be minimized.

This low-cost embodiment of FIG. 3A would be preferred for applications of electrolysis at low pressure and for small-scale production. It is not the preferred embodiment for large scale alkaline water electrolysis in a unipolar filter press stack of high electrical efficiency operating at high pressure, with large surface area to maximize product generation per CCF.

Large surface area per CCF (such that the lateral cross members 53, 57 are approximately between 8 inches to 56 inches in length) is a preferred embodiment for an electrolyser applied to large scale alkaline water electrolysis. Preferred CCF embodiments with additional conductive features such as in FIG. 4A, FIG. 5A, FIG. 5C, and FIG. 6A are intended for alkaline water electrolyser systems requiring large surface area per CCF; to achieve the high DC electrical currents required for a large production rate (e.g. approximately 1 kg to over 20 kg of hydrogen produced per hour) within one unipolar filter press electrochemical cell. Such embodiments are preferred for large surface area applications because of the benefits of the additional conductive features as previously described.

FIG. 4A shows an isometric view of a preferred embodiment, a unitary CCF 68 similar to CCF 50 in FIG. 3A, which further includes cross strut members 69 that extend between elongate side frame members 51 and 55 which are configured to be insertable for ease of manufacturing. The ends of struts 69 are enlarged with a bulbous shape giving the strut a "dog bone" structure, and frame sections 51 and 55 have corresponding voids produced therein to receive the ends of the struts. Two cross struts 69 are shown but it will be appreciated that there could only be one, or there could be more than two. The enlarged section of one end of the strut 69 in FIG. 4A shows a plurality of holes 70 formed along the length of the strut which provide flow paths upwards through the strut during electrolysis.

In another embodiment, after manufacturing the cross members 69 such that holes 70 are provided therein and cross members 69 are inserted into CCF 68, cross members 69 are welded or otherwise electrically joined to frame member 55, which contains the tabs 64 for electrical connection, thus improving the robustness of the electrical connection provided to cross members 69. Similarly, in a double CCF embodiment of FIG. 9A described later on, cross members 69 may be electrically joined to central frame member 332 to improve electrical connection to the cross members 69.

FIG. 4B shows the CCF 68 of FIG. 4A but with electroactive structures 44 affixed to the CCF ready for insertion into the filter press stack.

FIG. 5A shows a preferred embodiment of a single CCF 74 which instead of having struts fully extending between members 51 and 55, has integral conductive "spears" 76, extending partially across the width between frame members 51 and 55. The frame member 55 to which the spears 76 are integrally provided is the side that accepts the most amperage in the device, being adjacent to the electrical input tabs 64 in FIG. 5A. In the case of double CCF 374 with spears, described later on in FIG. 10A, current travels laterally; entering one set of spears, travelling across the central axis 332 of the double CCF, and then over to the next set of spears. The benefit to this positioning is that during electrolysis, product generation would therefore be largely segregated to the area where there is the greatest amperage (i.e. where the spears are provided). Gas evolution into the offtake transfer passageway could then be maximized where there is comparatively less amperage (and therefore less "wasted" amperages by bubble travel).

In another embodiment, to improve the circulation of liquid electrolytes in chamber 103, one or more through-channels may be provided in the spears 76 (or 76A described later). Preferably, the one or more channels are provided adjacent to frame member 55, the side the spears are provided from, allowing improved circulation of electrolyte in these regions. Similarly, in a double CCF embodiment of FIG. 10A described later on, spears 76 (or 76A) may have through-channels provided adjacent to central frame member 332.

In an alternate embodiment, one or more spears 76 or 76A may extend across circulation chamber 103 to meet outer frame members 51, thereby forming an embodiment with both spears and one or more "conductive struts." Said one or more conductive struts may be provided in an the upward-pointing diagonal configuration of the spears, or in another shape. In one embodiment the conductive strut may be substantially arcuate in shape, a beneficial shape to improve hydrodynamics in chamber 103 discussed later. Said one or more conductive struts are beneficial for improving the mechanical rigidity of this embodiment. Said one or more conductive struts further comprise one or more through channels therein, or they may be thinner than depth 103A, or have other means provided to support the circulation of gas and liquids within chamber 103 towards off-take apertures while additionally supporting the mechanical rigidity of the frame. Additionally, in any embodiment of a CCF with spears 76 (or 76A) the spears' dimensions may be different from one another within the same CCF, such that a hydrodynamically beneficial gradient is created. Similarly, the double CCF embodiments described later on may employ any of the presently described features to create equivalent double CCF embodiments.

The embodiment of the CCF in FIG. 5A is advantageous economically as compared to FIG. 6A as less milling would be required to create channels, reducing the cost of manufacturing a CCF. During the plasma cutting (or equivalent cutting technique) of the CCF itself, the path would simply provide the spear structures 76 in an "upward-pointing diagonal" arrangement integrally as part of the same CCF component. The side of the CCF wherein the spears are not attached would provide a clear pathway for gas bubbles to ascend. In a preferred embodiment the spears 76 are angled upwardly as shown (but it is not essential) as being angled upwards encourages the flow of gas products to the corresponding product transfer passageway (or "off-take passageway") out of the filter press.

The preferred embodiment of FIG. 5A may be provided in an electrolyser operating at pressures above atmospheric pressure, however as previously discussed it may be preferred to employ an embodiment such as FIG. 4A or FIG. 6A with full struts 69 or 58 for pressurized operations, or an embodiment of FIG. 5A wherein at least one additional conductive strut is provided alongside spears 76.

FIG. 5B shows the CCF 74 of FIG. 5A but with electroactive structures 44 affixed to the CCF ready for insertion into the filter press stack.

Figure 5C:
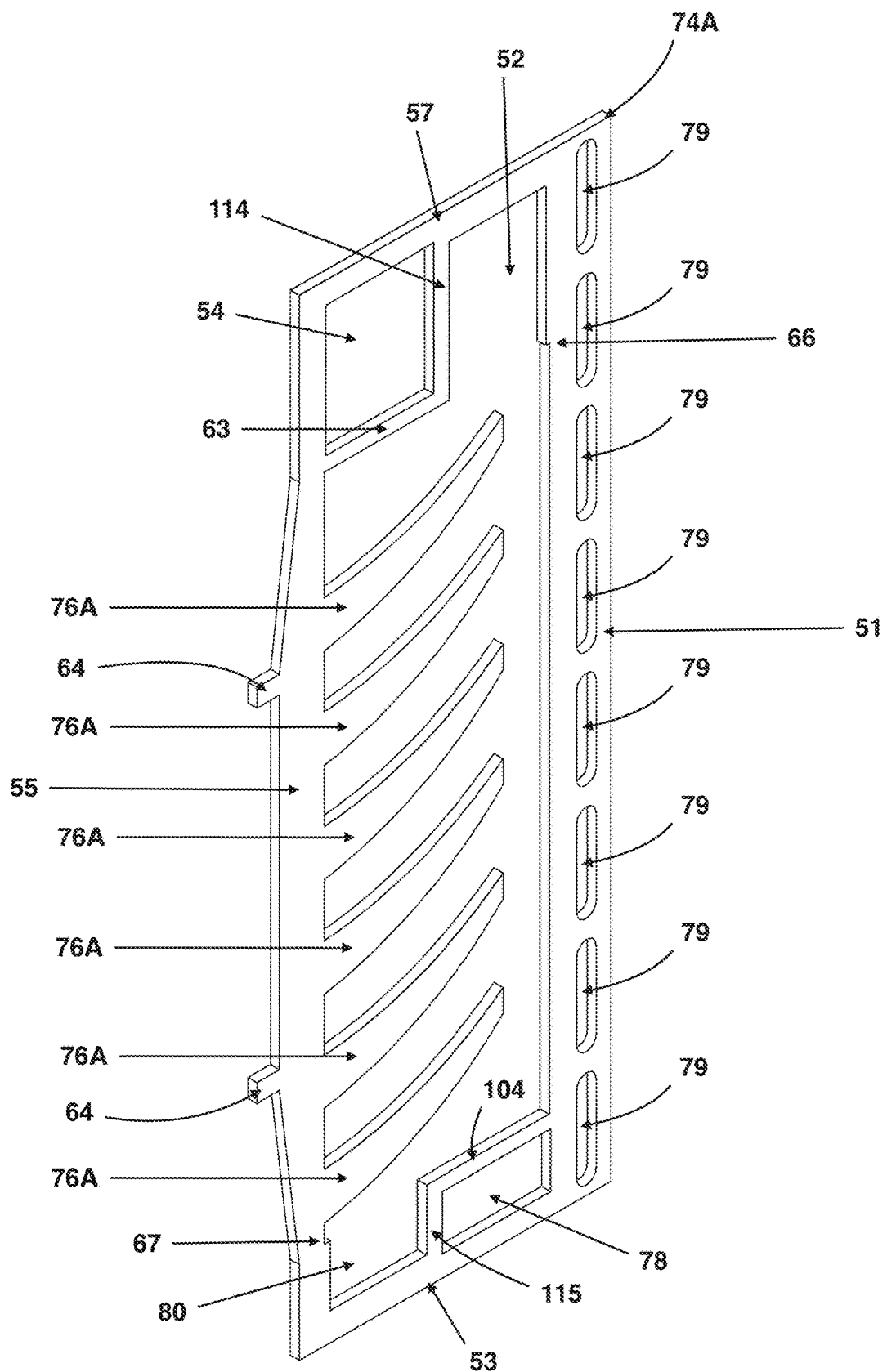
FIG. 5C shows an isometric view of a unitary current carrier, product circulation chamber, and structural frame provided in one part according to the present disclosure for use in unipolar filter press type electrochemical devices, further comprising an alternative embodiment of diagonally oriented spears provided from the same unitary part, extended frame members to enable improved heat transfer, and additional material cut-outs provided within the part to reduce weight among other benefits.

FIG. 5C shows another embodiment of CCF 74, shown as CCF 74A, with spears 76A. Studies have shown that providing spears such that they are substantially arcuate with an arcuately beveled tip provides hydrodynamic advantages in directing fluids and gases readily towards product off-take passageways, at the greatest outlet velocity. However, differing tip shapes may be otherwise optimal as the CCF is applied to different electrolytic processes at different operating pressures. Spears 76A may have their tip shape and angle optimized to be substantially arcuate and direct gas and fluids "upwards" towards product offtake transfer passageways. Spears 76A may be provided with different tip shape embodiments including but not limited to: continuously arcuate, planar, planar bevel, arcuately bevelled, polygonal, generally rounded, or any other appropriate shape. Preferably, the tips are made in an arcuately beveled embodiment.

In another embodiment, additional holes or "cut-outs" 79 of metal may be provided from frame members 55, or 51 (or 332 of single or double CCFs described later) where metal is not strictly required for current conduction and mechanical support. Providing such cut-outs 79 enable a reduction in part mass, increase scrap metal value, and support an increase in lateral width of frame members 55 and 51 while minimizing part mass. Extending the lateral width of frame members 55 and 51 allows the CCF to beneficially protrude externally to a filter press when configured in a filter press electrolyser assembly embodiment such that the frame is air-cooled where it protrudes externally. Parts of the CCF protruding from a filter press sealing profile with sites 79 in particular protruding to additionally support air-cooling improves filter press heat removal capabilities. For the sole purposes of air-cooling, however, cut-outs 79 are optional, and an embodiment of the CCF may be provided wherein parts of the CCF protrude from the filter press sealing profile for air-cooling without any cut-outs 79. CCFs may be adapted to increase heat removal from conduction, convection, or radiation. In another embodiment, lateral frame members 53 and 57 may additionally be increased in height with optional cut-outs provided for purposes of air cooling the electrolyser, among other benefits. Cut-outs 79 and/or protrusions for air-cooling may be further provided in any other CCF embodiment presently described. In an alternative embodiment, cut-outs 79 may additionally be provided in other geometric shapes.

In another embodiment, outer frame members of the CCF may be adjusted in shape to further improve heat removal capabilities, for example being castellated, or otherwise bent or waved to create additional surface area and protrusions for air-cooling from the filter press. Additionally, coatings to further improve heat removal capabilities may be applied to any CCF, discussed in detail later.

In another embodiment, central frame member 332 may be expanded in lateral width, such that additional material cut-outs 79 may be provided, said cut-outs reducing part weight and increasing scrap metal value, and further creating further beneficial sites for air-cooling.

FIG. 6A shows another preferred embodiment, of a single CCF 85 which has the same basic structure as CCF 68 in FIG. 4A but instead of struts 69, it includes conducting struts or cross members 58 which are formed as a unitary single integrated piece with the frame members 51 and 55, so that electricity is conducted through struts 58 to the electroactive structures when the latter are electrically contacted to the struts 58 and the CCF frame.

In operation, gas rises through struts 58 via channels 60 formed by the gaps between rectangular prisms (or equivalently "shapes") 62 provided from the material of struts 58. The channels 60 provide space for the circulation of electrochemical reactants and products within circulation chamber 103. While shapes 62 are shown for example as substantially rectangular prisms in FIG. 6A, they may be formed of any other suitable shape.

The shapes 62 on conductive struts 58 serve as attachment or contacting points to electroactive structures (such as 26 and 102 from FIG. 2) that allow electrical conduction to and through the electroactive surfaces during operation. These shapes 62 as illustrated in FIG. 6A are shown on only one side of the struts, however they can be located on both sides of struts 58 where the attachment of electroactive structures is required on both sides of the CCF.

The method to obtain the effect of a shapes 62 and the channels 60 from strut 58 could be via subtracting material from strut 58 through machining, stamping or another technique known to those skilled in the art of fabrication. While the channels 60 are shown as generally rectangular in FIG. 6A, they may be alternately machined to resemble any one or combination of a: "V" shape, "U" shape, trapezoid, semi-circle, or square. Shapes 62 may additionally be placed at any point along the strut 58, and their positioning on different struts within the same CCF may beneficially alternate to allow continuous upward circulation in chamber 103.

Alternately, in place of subtracting material to create the effect of shapes 62, another embodiment possesses struts 58 which are entirely thinner in depth relative to the CCF sides 51, 55, 57 and 53 ("a thin conductive strut"), similar to how the strut 58 as shown in the Figures would appear if the entire strut was reduced to the dimensions of 60 shown in FIG. 6A, with no shapes 62. Circulation in chamber 103 would then be provided around the thin conducting struts.

Said thin conductive struts (or "thin lateral cross members") may be formed integrally of CCF 85, having their thickness subtracted by means of manufacturing. Alternatively, thin conductive struts may be originally provided from a section of another plate having a thickness less than a thickness of said CCF sides (51, 55, 57, and 53), but of the same material as CCF frame 85, and consequently be joined between said first and second side arms 51, 55 by means of a welding method such that an electrical connection between the strut and the side frame members 55, 51 is formed. The resulting embodiment of CCF 85 comprising thin conductive struts is substantially equivalent when produced by either method described.

An alternate embodiment to this may have material added to the thin conductive struts to create the effect of raised shapes 62 and channels 60.

FIG. 6B shows the CCF 85 with electroactive structures attached corresponding to embodiment 44 of FIG. 3C.

In an alternate embodiment, when one or more electroactive structures 44 are provided on a single or double CCF embodiment comprising thin conductive struts, said electroactive structures may be further provided with "indented inward-facing dimples" positioned directly facing and over top of the thin conductive struts, to allow for an electrical connection to be made to the thin conductive struts, and to define channels substantially parallel to frame members 55 and 51 (or 51 and 332 in a double CCF with thin conductive struts) in the remaining lateral space between the thin conductive struts and the non-dimpled regions of the electroactive structure. These embodiments provide advantages in reducing the complexity and cost of manufacturing CCF 85. In another embodiment, where recesses surrounding chamber 103 are additionally provided as previously described, appropriate engineering adjustments are made to allow the dimpled electroactive surface to be ultimately substantially flush to the surfaces of the CCF it is applied to.

FIG. 7 shows an isometric disassembled view of an electrolyser device 310 built using a combination of four CCFs 50 (a "single CCF") surrounding one CCF 350 (a "double CCF"). While single CCFs in the form of 50 are shown in FIG. 7, any one or combination of single CCFs 68, 74, or 85 may be substituted for any CCF 50 shown in FIG. 7. As described, single CCF embodiments 68, 74, or 85 each hold unique advantages for a given unipolar electrochemical device application, and would be applied to best suit the intended application for the electrolyser device 310. Similarly, any of double CCF embodiments 368, 374, or 385 may be equivalently substituted for double CCF 350 in FIG. 7. The double CCFs described herein afford all of the same advantages of the single CCFs previously discussed, and further present a new advantage of significantly reduced current path length and elimination of the frequency of bus bar required between adjacent unipolar filter press stacks, as will be discussed further. This yields a part count reduction and an installation and assembly labour reduction in manufacturing the device. Any unlabeled parts in FIG. 7 have been previously described for example separator 28, gaskets 30, gasket support pieces 56, circulation chambers 103, and electroactive structures of opposing polarity 26 and 106.

The electrolyser device 310 comprises two unipolar filter press cells; the first unipolar filter press cell is provided with four product transfer passageways 316, 317, 318, and 319. The second unipolar filter press cell is provided also with four product transfer passageways, 320, 321, 322, and 323. The products and reactants of the first and second unipolar filter press cells are physically separated and do not mix within any of the end plates 312 and 334. The current generated by the power input provided at tabs 64 of the single CCFs travels across the chambers of double CCF 350, as will be described later in FIG. 16. This design allows electricity to be "bussed" centrally through the central axis of double CCF 350, represented by 322 in FIG. 8A, and distributed to the electroactive structures mounted over the circulation chambers 103 provided on either side of the central axis 322 of double CCF 350. The only connection (electrical and physical) between the first and second unipolar filter press cells is the double CCF 350.

Moving from left to right, transfer passageway 316 is created by the channel-forming combination of port 355 in first end clamping plate 312, and apertures 110, 54, 106, (as previously described) and aperture 352 in double CCF 350. The side of CCF 350 which is joined to transfer passageway 316 is anodically polarized as indicated by the positive sign in FIG. 7. The polarizations shown in FIG. 7 are exemplary, and may be reversed in another embodiment. Transfer passageway 316 is fed with anodic product (a gaseous product in the example of the electrolysis of water) arising from the circulation chamber 103 of the right-hand side of CCF 350, through a gasket support piece 56 into aperture 352 which feeds into passageway 316. Depending on the provisions applied for gas/liquid separation, which are non-limiting in this disclosure, anolyte liquid may also enter transfer passageway 316 with the anodic gas product. This anodic product gas and anolyte liquid is removed from 316 for further processing through port 355 in first end plate 312.

Reading again from left to right, transfer passageway 317 is created by the channel-forming combination of port 356 in first end plate 312 (obscured by first right-hand gasket 14), and apertures 111, 78, 107, and aperture 380 in the anodically polarized side of CCF 350. The anodic product circulation chamber 103 of double CCF 350 is fed with anolyte liquid through aperture 380 and its corresponding gasket support piece. Anolyte reactant liquid is initially fed into passageway 317 through obscured port 356 in first end plate 312. The anolyte liquid input into transfer passageway 317 may be virgin electrolyte, or it may be recycled anolyte that has been removed from passageway 316 or 322 and externally processed.

Reading from right to left, transfer passageway 318 is created by the channel-forming combination of port 351 in first end plate 334, and apertures 94, 52, 90, 354 of double CCF 350, 90 and 52. The cathodically polarized CCFs 50 feed gaseous cathodic product through a gasket support piece 56 and into aperture 52 which then feeds into transfer passageway 318. As noted equivalently for the anodic gaseous product, depending on the provisions employed for gas/liquid separation in the filter press stack some catholyte liquid may enter passageway 318 with the gaseous cathodic product. The product and any residual catholyte is removed at port 351.

Reading from right to left, transfer passageway 319 is created by the channel-forming combination of port 353 in first end clamping plate 334, and apertures 109, 80, 108, 378, 108, 80. The cathodic product circulation chambers 103 of CCFs 50 are fed with catholyte liquid through apertures 80 and their corresponding gasket support pieces. Catholyte reactant liquid is initially fed into passageway 319 through port 353 in first end plate 334. The catholyte liquid input into transfer passageway 319 may be water, or it may be recycled catholyte that has been removed from passageway 318 or 320 and externally processed.

Reading from right to left, transfer passageway 320 is created by the channel-forming combination of port 348 connecting to second end plate 334, and apertures 94 (not shown due to cutaway), 54, 90, 356 of double CCF 350. The cathodically polarized portion of double CCF 350 feeds gaseous cathodic product from its cathodic chamber 103 up through a gasket support piece 56 into aperture 356 which then feeds into transfer passageway 320. Depending on the provisions employed for gas/liquid separation in the filter press stack some catholyte liquid may enter passageway 320 with the gaseous cathodic product. The gaseous cathode product and any residual catholyte is removed at port 348.

Reading from right to left, transfer passageway 321 is created by the channel-forming combination of port 357 in second end plate 334, and apertures 109, 78, 108, and 381. The cathodic product circulation chamber 103 of CCF 350 is fed with catholyte liquid through apertures 381 and its corresponding gasket support piece. Catholyte reactant liquid is initially fed into passageway 321 through port 357 in second end plate 334. The catholyte liquid input into transfer passageway 321 may be water, or it may be recycled catholyte that has been removed from passageway 320 or 318 and externally processed.

Reading from left to right, transfer passageway 322 is created by the channel-forming combination of port 349 in second end plate 312, and aperture 110, 52, 106, 355 in double CCF 350, 106, and terminates at second aperture 52. The CCFs 50 joined to transfer passageway 322 are anodically polarized. Transfer passageway 322 is fed with anodic gaseous product that arises from the circulation chamber 103 of anodic CCFs 50 through gasket support pieces 56 and into apertures 52, which then feed into passageway 322. Depending on the provisions applied for gas/liquid separation anolyte liquid may also enter transfer passageway 322 with the anodic gas product. This anodic product gas and anolyte liquid is removed from 322 for further processing through port 349 in second end plate 312.

Reading from left to right, transfer passageway 323 is created by the channel-forming combination of port 359 in second end plate 312, and apertures 111, 80, 107, 379, 107, and 80. The anodic product circulation chamber 103 of single CCFs 50 is fed with anolyte liquid through aperture 80 and its corresponding gasket support piece. Anolyte reactant liquid is initially fed into passageway 323 through port 359 in second end plate 312. The anolyte liquid input into transfer passageway 323 may be virgin electrolyte, or it may be recycled anolyte that has been removed from passageway 316 or 322 and externally processed.

FIG. 8A shows an embodiment of a double CCF at 350 which includes a central frame member 332 which extends between the lateral sections 353 of the CCF. CCF 350 acts as a current bus between two adjacent unipolar filter press cells. No tabs (such as tabs 64 in FIG. 3A) for electrical connection are required on double CCFs for this reason. Double plate CCF 350 can also be used to create multi-stack CCFs of greater than two (2) electrochemical unipolar filter press cell stacks, see FIG. 16C and associated discussion.

This double plate CCF 350, where one half is the anode of one unipolar filter press cell stack, and one half is a cathode in the adjacent unipolar filter press cell stack. By eliminating the need for a bus bar between adjacent unipolar filter press cell stacks, the metallic resistive losses between the stacks are reduced, and the unipolar stacks can approach the low resistive losses achieved by state-of-the-art bipolar filter press stacks. The reduced current path length is a result of the ability for the double CCF to act as an improved inter-cell electrical connection (improving over an inter-cell bus bar) between two unipolar filter press stacks. The improvement comes from the feature of the double CCF that current travels only laterally between the adjacent cells, rather than both laterally and vertically as required on single CCFs with tabs 64. It can also be more efficient in manufacturing to cut one large component rather than two small components to accomplish the same task.

FIG. 8B shows CCF 350 of FIG. 8A but now with electroactive structures 44 on opposing sides of the CCF.

FIG. 9A shows a double CCF embodiment 368 with the dog-bone shaped struts 69 essentially the same as in the single CCF 68 of FIG. 4A but now separate struts 69 are provided in both chambers 103 and provide same benefits as the single CCF 68.

FIG. 9B shows CCF 368 of FIG. 9A but now with electroactive structures 44 on opposing sides of the CCF.

FIG. 10A shows a double CCF embodiment 374 with the spears 76 similar to the single CCF of FIG. 5A but it is noted that the spears are integrally formed with the central frame member 332 and project into the chambers 103. FIG. 10B shows CCF 374 of FIG. 10A but now with electroactive structures 44 on opposing sides of the CCF. The current from the double CCFs transfers laterally through the central frame member 332 from the spears of one unipolar filter press cell stack to the spears of the adjacent cell stack. Hence, "spears" extend from this frame member 332, such that current can travel laterally through the double CCF. These spears 76 provide same benefits as in the single CCF 74.

FIG. 10C shows a double CCF embodiment 374A with spears 76A, similar to the single CCF of FIG. 5C, and the double CCF of FIG. 10A. CCF 374A further possesses cut-outs 79 as previously discussed. Consequently, the double CCF embodiment shown in FIG. 10C benefits from the previously described advantages of both the CCF of FIG. 5C and the double CCF of FIG. 10A. The central axis 332 of any Double CCF embodiment presently described may be increased in lateral width to allow additional cut-outs 79 to be made, further improving the heat transfer capabilities of the CCF.

Further, in another embodiment, a coating to improve heat removal capabilities may be additionally applied to frame members of the double CCF, preferably to central frame member 332. The coating to improve heat removal capabilities may be comprised of but is not limited to: high emissivity paint, ceramic-based or silicone-ceramic-based coatings, black pigmented coating, for example Aremco's 840-MS. In alternative embodiments, coatings to improve heat removal capabilities of a CCF may be applied to any CCF embodiment presently described.

Further, in another embodiment additional material shapes may be provided to CCF frame members to increase the frame surface area protruding from the filter press such that heat transfer is improved. Such additional protruding material shapes may preferably be provided as fins, or another heat transferable shape.

FIG. 11A shows the double CCF at 385 which is the double CCF version of CCF 85 in FIG. 6A. FIG. 11B shows the CCF 385 with the electroactive structures 44 affixed thereto. The struts 58 have the same structure as in the single CCF 85 and provide the same benefits.

FIG. 12 shows an isometric disassembled view of a unipolar electrolyser device 410 built using single CCFs 450 wherein additional apertures for product transfer are provided. Any unlabeled parts in FIG. 12 are described later, or have been previously described for example separators 28, gasket support pieces 56, circulation chambers 103, and electroactive structures of opposing polarity 26 and 102.

Gaskets 414 and 430 and masks 422 and 424 serve the same purposes as previously described gaskets 14 and 30 and masks 22 and 24 and end plates 412 and 434, however they are provided in FIG. 12 and FIG. 14 with accommodations for the additional product transfer passageways.

While single CCFs 450 are shown to have a bare product circulation chamber 103 analogous to single CCFs 50, their product circulation chamber 103 may be configured in preferred embodiments that include the conductive features of previously described single CCFs 68, 74, or 85, such that the CCFs of FIG. 12 with additional apertures for product transfer may additionally have conducting struts (68, 85) or spears 76 provided across their product circulation chamber. Similarly, the conducting struts or spears of previously described double CCFs 368, 374, or 385 may be applied to the double CCFs 550 with additional passageways as shown in FIG. 14. However, the CCF embodiments containing additional apertures for product transfer in FIG. 12 and FIG. 14 cannot be equivalently substituted into the devices of FIG. 2 and FIG. 7 without additionally accommodating changes to the entire configuration such that FIG. 12 and FIG. 14 are effectively recreated.

The unipolar electrochemical device in 410 is comprised of one unipolar filter press cell, with six product transfer passageways 416, 417, 418, 419, 420, 421.

Moving from left to right, transfer passageway 416 is created by the channel-forming combination of port 449 in end clamping plate 412, and apertures 494 in gasket 414, 493 in CCF 450, 460 in gasket 430, 488 in CCF 450, 460, and 493. The CCFs 450 which physically join to transfer passageway 416 are anodically polarized as indicated by the positive sign in FIG. 12. The polarizations shown in FIG. 12 are exemplary, and may be reversed in another embodiment. Transfer passageway 416 is fed with anodic product (a gaseous product in the case of the electrolysis of water or chlorine electrolysis) arising from the circulation chamber 103 of CCFs 450 joined to passageway 416, through a gasket support piece 56 into aperture 493 which feeds into passageway 416.

Moving from left to right, transfer passageway 417 is created by the channel-forming combination of port 459 in end plate 412, and apertures 495, 480, 461, 478, 461, 480. The anodic product circulation chamber 103 of CCFs 450 which physically join to transfer passageway 417 is fed with anolyte liquid through aperture 480 and its corresponding gasket support piece. Anolyte reactant liquid is initially fed into passageway 417 through port 459 in end plate 412. The anolyte liquid input into transfer passageway 417 may be virgin electrolyte, or it may be recycled anolyte that has been removed from passageway 418 and externally processed.

Reading from left to right, transfer passageway 418 is created by the channel-forming combination of port 452 in end plate 412, and apertures 496, 492, 462, 489, 462, and 492. The anodic product circulation chamber 103 of CCFs 450 which physically join to transfer passageway 418 is originally fed with anolyte liquid from transfer passageway 417 up through aperture 480 and its corresponding gasket support piece. Anodic gaseous product is generated in product circulation chamber 103 and flows into aperture 493 to enter transfer passageway 416. Surplus reacted liquid anolyte additionally flows into aperture 493, however then passes through channel 483 into adjacent aperture 492 (as shown in FIG. 13A) ultimately entering product transfer passageway 418, where it will be removed at port 452 in end plate 412. The reacted anolyte removed from port 452 may be enriched as is done in chlorine electrolysis to enrich depleted brine before it is recirculated back into the system.

Reading from right to left, transfer passageway 419 is created by the channel-forming combination of port 457 in end plate 434, and apertures 495, 478, 463, 480, 463, 480. The cathodic product circulation chamber 103 of CCF 450, indicated by the negative sign, which physically joins to transfer passageway 419 is fed with catholyte liquid through aperture 480 and its corresponding gasket support piece. Catholyte reactant liquid is initially fed into passageway 419 through port 457 in end plate 434. The catholyte liquid input into transfer passageway 419 may be virgin electrolyte, water, or recycled catholyte that has been removed from passageway 420 and externally processed.

Reading from right to left, transfer passageway 420 is created by the channel-forming combination of port 451 in end plate 434, 496, 489, 464, and 492. The cathodic product circulation chamber 103 of CCF 450 that physically joins to transfer passageway 420 is originally fed with catholyte liquid from transfer passageway 419 up through aperture 480 and its corresponding gasket support piece. Cathodic gaseous product is generated in product circulation chamber 103 and flows into aperture 493 to enter transfer passageway 421. Surplus reacted liquid catholyte additionally flows into aperture 493, however then passes through channel 483 into adjacent aperture 492 (as shown in FIG. 13A) ultimately entering product transfer passageway 420, where it will be removed at port 451 in end plate 434. The reacted catholyte removed from port 451 may be processed externally as a final product, or recirculated back into the system through passageway 419.

Reading from right to left, transfer passageway 421 is created by the channel-forming combination of port 448 in end clamping plate 434, and apertures 494, 488, 465, 493. The CCF 450 which physically joins to transfer passageway 421 is cathodically polarized as indicated by the negative sign in FIG. 12. Transfer passageway 421 is fed with cathodic product (a gaseous product in the case of the electrolysis of water or chorine electrolysis) arising from the circulation chamber 103 of cathodic CCF 450 joined to passageway 421, through a gasket support piece 56 into aperture 493 which feeds into passageway 421.

FIG. 13A shows a single CCF 450 with two apertures 478 and 480 at the lower or bottom part of the CCF and multiple apertures 488, 489, 492 and 493 defined in the upper or top portion of the CCF 450. A gap or opening 483 in strut 487 allows liquid electrolyte from aperture 493 to flow into 492 during operation. This channel allows the reacted electrolyte to be separated from the gaseous product that will enter aperture 493, such that two separate adjacent product transfer passageways for reacted electrolyte and gaseous product may be provided.

Figure 13B:
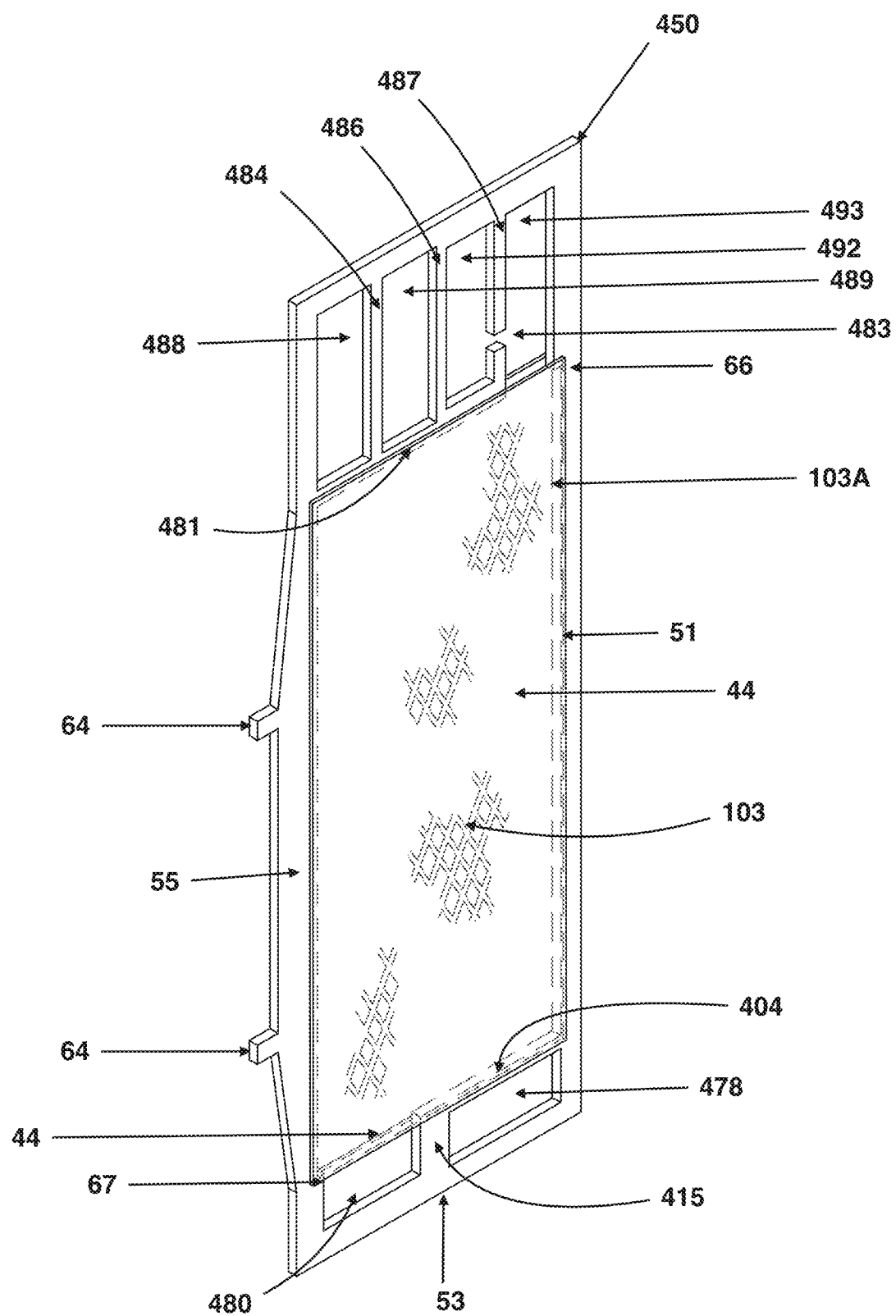
FIG. 13B shows an isometric view of the unitary current carrier, product circulation chamber, and structural frame of FIG. 13A additionally comprising exemplary electroactive structures on opposing sides of the part.

FIG. 13B shows CCF 450 now with electroactive structure 44 affixed thereto.

FIG. 14 shows an isometric disassembled view of an electrolyser device 510 built using a combination of four single CCFs 450 surrounding one double CCF 550. Any unlabeled parts in FIG. 14 have been previously described for example separator 28, gaskets 414, 430, gasket support pieces 56, circulation chambers 103, and electroactive structures of opposing polarity 26 and 106.

The electrolyser device 510 comprises two unipolar filter press cells; the first unipolar filter press cell is provided with six product transfer passageways 516, 517, 518, 519, 520, 521. The second unipolar filter press cell is provided also with six product transfer passageways, 522, 523, 524, 525, 526, and 527. The products and reactants of the first and second unipolar filter press cells are physically separated and do not mix within any of end plates 512 and 534. The current generated by the power input provided at tabs 64 of the single CCFs travels across the chambers of double CCF 550, as will be described later in FIG. 16. This design allows electricity to be "bussed" centrally through the central axis of double CCF 550, represented by 322 in FIG. 15A, and distributed to the electroactive structures mounted over the circulation chambers 103 provided on either side of the central axis 322 of double CCF 550. The only connection between the first and second unipolar filter press cells is the double CCF 550.

Moving from left to right, transfer passageway 516 is created by the channel-forming combination of port 549 in first end clamping plate 512, and apertures 494, 488, 460, 593 in double CCF 550. The side of CCF 550 in which is joined to transfer passageway 516 is anodically polarized as indicated by the positive sign in FIG. 14. The polarizations shown in FIG. 14 are exemplary, and may be reversed in another embodiment. Transfer passageway 516 is fed with anodic product (a gaseous product in the case of the electrolysis of water or chlorine electrolysis) arising from the circulation chamber 103 of the right-hand side of CCF 550, through a gasket support piece 56 into aperture 593 which feeds into passageway 516. This anodic product gas and any residual anolyte liquid (if any) is removed from 516 for further processing through tubular port 549 in first end plate 512.

Reading from left to right, transfer passageway 517 is created by the channel-forming combination of port 559 in first end plate 512 (obscured by first right-hand gasket 414), 495, 478, 461 (obscured by electroactive structure), and 580 in the anodically polarized side of CCF 550. The anodic product circulation chamber 103 of double CCF 550 is fed with anolyte liquid through aperture 580 and its corresponding gasket support piece. Anolyte reactant liquid is initially fed into passageway 517 through obscured port 559 in first end plate 512. The anolyte liquid input into transfer passageway 517 may be virgin electrolyte, or it may be recycled anolyte that has been removed from passageway 518 or 526 and externally processed.

Reading from left to right, transfer passageway 518 is created by the channel-forming combination of port 555 in first end plate 512, and apertures 496, 489, 462, 592. The anodic product circulation chamber 103 of CCFs 550 which physically joins to transfer passageway 518 is originally fed with anolyte liquid from transfer passageway 517 up through aperture 580 and its corresponding gasket support piece. Anodic gaseous product is generated in product circulation chamber 103 and flows into aperture 593 to enter transfer passageway 516. Surplus reacted liquid anolyte additionally flows into aperture 593, however then passes through channel 583 into adjacent aperture 592 (as shown in FIG. 15A) ultimately entering product transfer passageway 518, where it will be removed at port 555 in first end plate 512. The reacted anolyte removed from port 555 may be enriched as is done in chlorine electrolysis to enrich depleted brine before it is recirculated back into the system.

Reading from right to left, transfer passageway 519 is created by the channel-forming combination of port 553 in first end plate 534, obscured aperture 495 in gasket 414, 480, 463, 578, 463, and 480. The cathodic product circulation chambers 103 of cathodic single CCFs 450 are fed with catholyte liquid through apertures 480 and their corresponding gasket support pieces. Catholyte reactant liquid is initially fed into passageway 519 through port 553 in first end plate 534. The catholyte liquid input into transfer passageway 519 may be water, or it may be recycled catholyte that has been removed from passageway 520 or 524 and externally processed.

Reading from right to left, transfer passageway 520 is created by the channel-forming combination of port 554 in first end plate 534, 496, 492, 464, 589, 464, 492. The cathodic product circulation chamber 103 of single CCFs 450 that physically join to transfer passageway 520 is originally fed with catholyte liquid from transfer passageway 519 up through aperture 480 and its corresponding gasket support piece. Cathodic gaseous product is generated in product circulation chamber 103 and flows into aperture 493 to enter transfer passageway 521. Surplus reacted liquid catholyte additionally flows into aperture 493, however then passes through channel 483 into adjacent aperture 492 (as shown in FIG. 13A) ultimately entering product transfer passageway 520, where it will be removed at port 554 in first end plate 534. The reacted catholyte removed from port 554 may be processed externally as a final product, or recirculated back into the system through passageway 519 or 523.

Reading from right to left transfer passageway 521 is created by the channel-forming combination of port 552 in first end plate 534, and apertures 494, 493, 465, 588, 465, and 493. The cathodically polarized CCFs 450 feed gaseous cathodic product through a gasket support piece 56 and into aperture 493 which then feeds into transfer passageway 521. The product and residual catholyte (if any) is removed at port 552.

Reading from right to left, transfer passageway 522 is created by the channel-forming combination of port 548 in second end plate 534, and apertures 494, 488, 465, and 573. The cathodically polarized portion of double CCF 550 feeds gaseous cathodic product from its cathodic chamber 103 up through a gasket support piece 56 into aperture 573 which then feeds into transfer passageway 522. The gaseous cathode product and any residual catholyte (if any) is removed at port 548.

Reading from right to left, transfer passageway 523 is created by the channel-forming combination of port 557 in second end plate 534, and apertures 495, 478, 463, and 560. The cathodic product circulation chamber 103 of the cathodic portion of double CCF 550 is fed with catholyte liquid through aperture 560 and the corresponding gasket support piece. Catholyte reactant liquid is initially fed into passageway 523 through port 557 in second end plate 534. The catholyte liquid input into transfer passageway 523 may be water, or it may be recycled catholyte that has been removed from passageway 520 or 524 and externally processed.

Reading from right to left, transfer passageway 524 is created by the channel-forming combination of port 551 in second end plate 534, and apertures 496, 489, 464, and 572. The cathodic product circulation chamber 103 of double CCF 550 that physically joins to transfer passageway 524 is originally fed with catholyte liquid from transfer passageway 523 up through aperture 560 and its corresponding gasket support piece. Cathodic gaseous product is generated in product circulation chamber 103 and flows into aperture 573 to enter transfer passageway 522. Surplus reacted liquid catholyte additionally flows into aperture 573, however then passes through channel 563 into adjacent aperture 572 (as shown in FIG. 15A) ultimately entering product transfer passageway 524, where it will be removed at port 551 in second end plate 534. The reacted catholyte removed from port 551 may be processed externally as a final product, or recirculated back into the system through passageway 519 or 523.

Reading from left to right, transfer passageway 525 is created by the channel-forming combination of port 556 in second end plate 512, and apertures 495, 480, 461, 558, 461, 480. The anodic product circulation chambers 103 of anodic single CCFs 450 are fed with anolyte liquid through apertures 480 and their corresponding gasket support pieces. Anolyte reactant liquid is initially fed into passageway 525 through port 556 in second end plate 512. The catholyte liquid input into transfer passageway 525 may be virgin electrolyte or it may be recycled anolyte that has been removed from passageway 526 or 518 and externally processed.

Reading from left to right, transfer passageway 526 is created by the channel-forming combination of port 546 in second end plate 512, 496, 492, 462, 569, 462, and 492. The anodic product circulation chamber 103 of single CCFs 450 which physically join to transfer passageway 526 is originally fed with anolyte liquid from transfer passageway 525 up through aperture 480 and its corresponding gasket support piece. Anodic gaseous product is generated in product circulation chamber 103 and flows into aperture 493 to enter transfer passageway 527. Surplus reacted liquid anolyte additionally flows into aperture 493, however then passes through channel 483 into adjacent aperture 492 (as shown in FIG. 13A) ultimately entering product transfer passageway 526, where it will be removed at port 546 in second end plate 512. The reacted anolyte removed from port 546 may be enriched as is done in chlorine electrolysis to enrich depleted brine before it is recirculated back into the system through ports 556 or 559.

Reading left to right, transfer passageway 527 is created by the channel forming combination of port 547 in second end clamping plate 512, and apertures 494, 493, 460, 568, 460, 493. The single CCFs 450 which are joined to transfer passageway 527 are anodically polarized. Transfer passageway 527 is fed with anodic product (a gaseous product in the case of the electrolysis of water or chlorine electrolysis) arising from the circulation chamber 103 of single CCFs 450, through a gasket support piece 56 into aperture 493 which feeds into passageway 526. This anodic product gas and residual anolyte liquid (if any) is removed from 527 for further processing through tubular port 547 in second end plate 512.

The embodiments of FIG. 12 and FIG. 14 are particularly preferred for chlorine electrolysis in view of the additional product transfer passageways efficiently separating gaseous product from liquid reacted anolyte and catholyte. The additional separation of reacted anolyte and catholyte from the gaseous product outputs is particularly preferred in chlorine electrolysis, as the reacted catholyte (sodium hydroxide) is desired as an independent product, which can be externally diluted and pumped back into the catholyte input where more sodium hydroxide is produced.

The embodiments of FIG. 12 and FIG. 14 are also preferred for alkaline water electrolysis. As in all potential applications for this unipolar filter press electrolyser embodiment, the additional transfer passageways provided allow the designer of the electrolyser additional flexibility in how to operate and control it, and in how to process and manage reacted electrolyte. As previously discussed, two downward circulation frames (one anodic, one cathodic) may be provided in the embodiments of FIG. 12 and FIG. 14 to facilitate internal recirculation of reacted electrolyte from the appropriate exit pathway into the appropriate entrance pathway.

FIG. 15A shows the double CCF 550 embodiment of the single CCF 450 of FIG. 13A in which the upper and lower passageways on either side of central frame member 332 are mirror images of each other. FIG. 15B shows CCF 550 with electroactive structures 44 affixed thereto.

In other embodiments of CCFs with additional transfer passageways (i.e. greater than the 4 transfer passageways per unipolar electrochemical cell press shown in FIG. 2 and FIG. 7), different quantities of additional transfer passageways than shown in FIGURE's 13 through 15 may be provided as necessitated by the application.

For example, one embodiment comprises a single CCF similar to FIG. 13A wherein arm 486 is removed, thus merging apertures 492 and 489 to create one aperture. When applied to form a single filter press electrochemical cell, as in FIG. 12, the catholyte and anolyte would mix when exiting the frames of this embodiment, when placed where CCF 450 is shown. As previously discussed, mixing anolyte and catholyte can be beneficial in alkaline water electrolysis to restore the desired electrolyte concentration.

Similarly, another exemplary embodiment comprises a double CCF similar to FIG. 15A wherein arms 586 and 566 are removed to achieve the equivalent effect of anolyte and catholyte mixing when exiting the circulation chamber 103. A CCF may be designed with other quantities of transfer passageways should it suit the underlying electrochemical process.

It is noted that any embodiments of any of the conductive features presently described (conductive struts, spears, thin conductive struts, arcuate conductive struts, etc.) may be combined within the circulation chamber of one CCF. For example, one CCF (either single or double) may be provided with both spears and a conductive strut, or multiple conductive struts and one spear. Any other combination of the conductive features presently described may be further employed. Further, any such embodiments may include: any form of one or more through-channels within said conductive features to allow the passage of fluids, said conductive features may be reduced in thickness as compared to depth 103A at any position on the feature to allow the passage of fluids, said conductive feature may be angled upwards or downwards or adjusted otherwise at any beneficial orientation or shape for hydrodynamic flow, or provided in an embodiment with any combination of the above. The ability to achieve low-incremental cost customization of features to suit the conditions of the environment of the CCF is a key aspect of the present disclosure.

Additionally, CCFs employed within a given filter press need not be identical. For example, a given filter press stack of CCFs may include CCF embodiments provided with no features in their circulation chamber, spears, or conductive struts, or combinations thereof, all present within the same stack. Further, the shape of the CCF frame may be adjusted such that corners of the external frame and/or apertures therein are rounded, or otherwise adjusted in shape.

Beyond the preferred applications of alkaline water electrolysis and chlorine electrolysis, there are many other possible electrochemical processes for which a unipolar filter press electrochemical device based on the various CCF embodiments disclosed herein could be employed.

While the present CCFs can be used to create an electrochemical device based on entirely CCF-type current carriers and frames, as discussed throughout the present disclosure, a CCF may also be adapted to suit other electrochemical devices which require replacement parts.

Combined Single-Double CCF System Expanded to Scale

FIG. 16A shows a simplified top-down view of the innermost components of the unipolar filter press electrochemical device of FIG. 2 (the innermost components of FIG. 12 would also behave equivalently from this view) and the consequent path of electrical current upon the innermost components and their electroactive structures, illustrating in particular the current travelling parallel to, and within the electrically conductive product-generating electroactive structures. In FIG. 16A current enters the device from the left-hand side (indicated by the + symbol), travels through the middle metallic current carrier frame 20 to the attached conductive electroactive structures 102 on either face of the central unipolar CCF 20. The arrows provided on electroactive structures 102 represent the path of current through the device, which runs parallel across the electroactive structure from "left" where the power input is presented to the "right." Current travels through separator 28 in the form of charged ions. The separator 28 is depicted as being compressed into the central aperture of gasket 30 in FIG. 16 rather than being shown in the disassembled form of the previous assembly figures. The outer two (2) cathodic CCFs 21 correspond to CCFs 21 as shown and described in FIG. 2 with conductive electroactive structures 26 attached. The filter press stack assembly depicted in FIG. 16A is shown with three (3) CCFs but it will be understood that this filter press configuration using single CCFs can be scaled up in the longitudinal direction simply by inserting as many unipolar CCFs similar to CCF 20 of alternating polarity between the two CCFs 21 located at the ends of the stack with these additional CCFs having electroactive structures 102 or 26 (+ or − depending on the polarity) affixed to opposing sides of the CCF, as shown in the middle CCF in FIG. 16A.

Figure 16B:
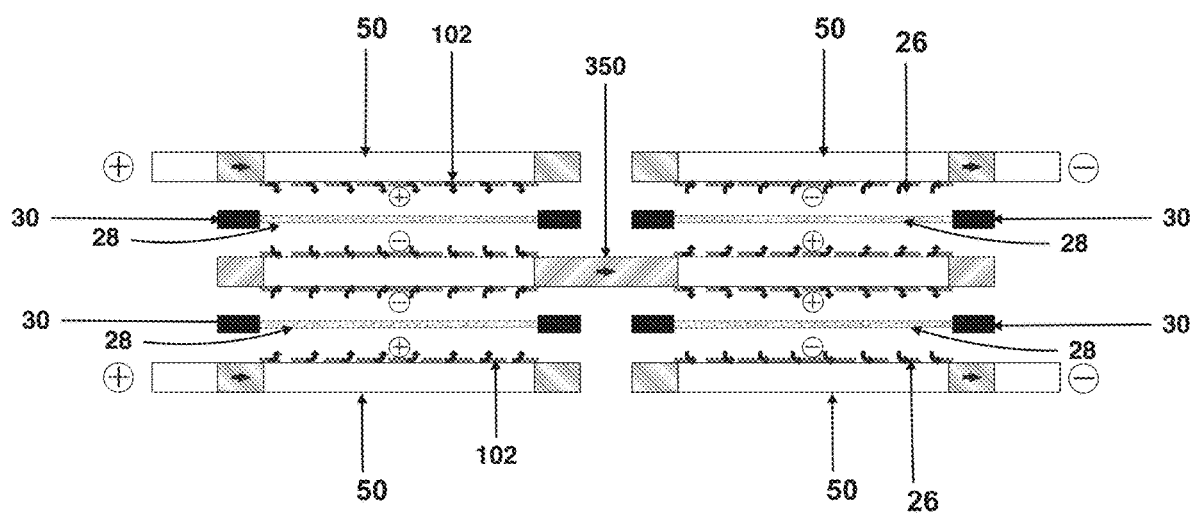
FIG. 16B shows a simplified top-down view of the innermost components of the unipolar filter press electrochemical device shown in FIG. 7 (the innermost components of FIG. 14 would also behave equivalently from this view) and the consequent path of current upon said innermost components and their electroactive structures, illustrating in particular the current travelling parallel to the product-generating electroactive structures.

FIG. 16B shows a simplified top-down view of the innermost components of the unipolar filter press electrochemical device shown in FIG. 7 (the innermost components of FIG. 14 would also behave equivalently from this view) and the consequent path of current upon the innermost components and their electroactive structures, illustrating in particular the current travelling parallel to the product-generating electroactive structures. Similarly to FIG. 16A, current is provided in the side of the system, then into the single CCFs 50 on the left hand side (this CCF being substantially equivalent to monopolar CCF 21 as previously described only of a positive polarity), travelling parallel to positive electroactive structures 102 from left to right, and across separators 28 to the cathodic portion of the central double CCF 350 shown in FIG. 8A. Current in the cathodic portion continues to travel across the electrode structures from "left to right" as depicted in FIG. 16B, but current is also provided across the top and bottom of the CCF itself and through the central frame member 332 of CCF 350 as previously shown. The current as provided through the central frame member 332 then extends to the anodic portion of double CCF 350, across separators 28 on the right-hand side, and finally arrives at the right-most cathodic single CCFs 50.

FIG. 16B effectively summarizes the path of current through a unipolar filter press electrolyser electrochemical device electrically configured in parallel. The filter press stack assembly depicted in FIG. 16B is shown with one double CCF 350 but it will be understood that this filter press configuration using double CCFs can be scaled up in the longitudinal direction simply by inserting as many double CCFs 350 of alternating polarities between the four single CCFs 50 located at the ends of the stack with these additional double CCFs having electroactive structures 102 or 26 (+ or − depending on the polarity) affixed to opposing sides of the additional double CCFs, as shown in the middle double CCF in FIG. 16B. The filter press stack assembly may further be scaled up in the latitudinal direction as shown and described in FIG. 16C. Non-limiting parts of the assembly (separators, gaskets, masks) must also be applied during scaling, both latitudinally and longitudinally, for the purposes as previously described.

Figure 16C:
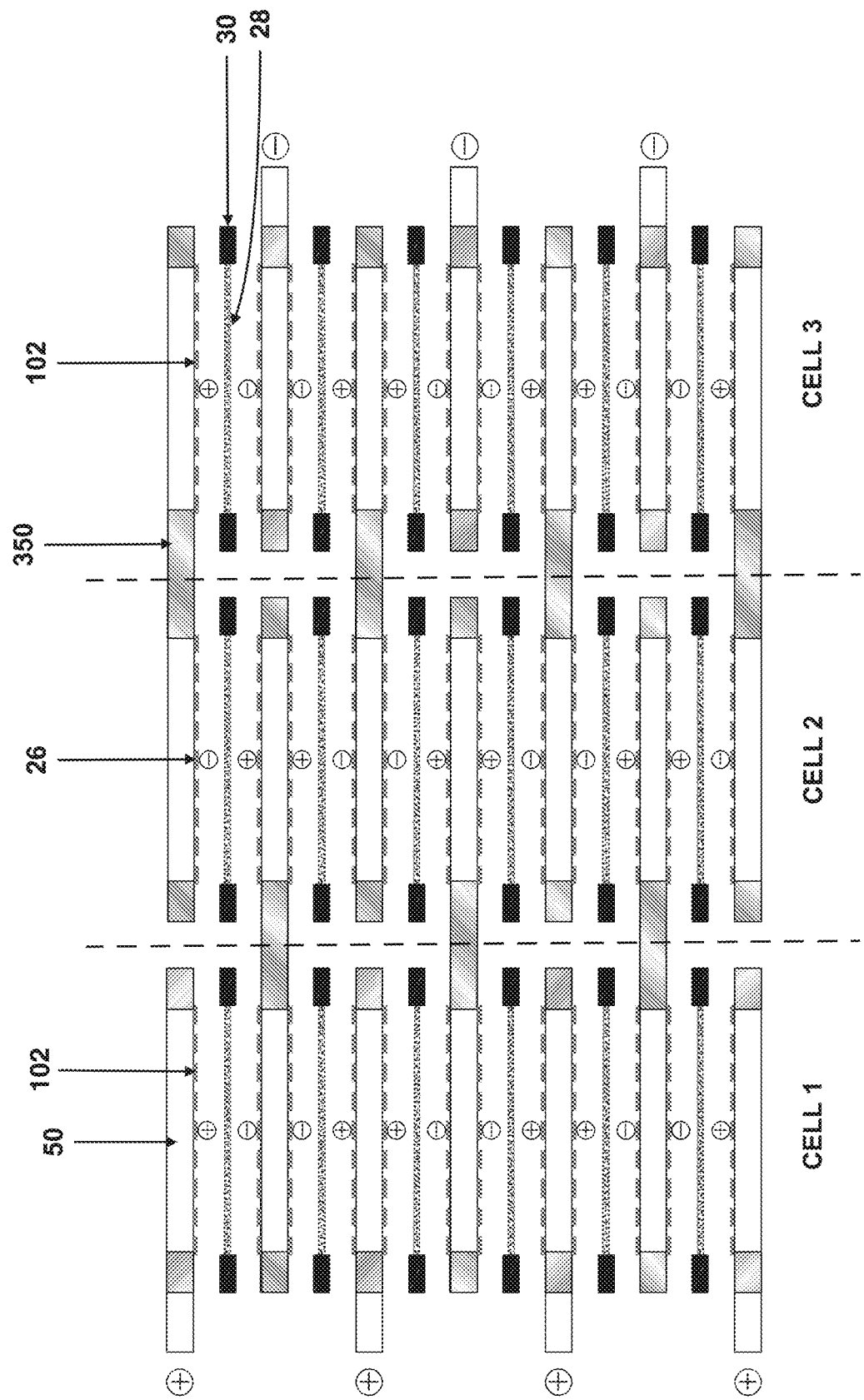
FIG. 16C shows a simplified top-down view of the innermost components of an embodiment of a multi-unipolar-cell filter press electrolyser block according to the present disclosure, based on a combination of parts FIG. 8A and FIG. 3A (or equivalently FIG. 13A and FIG. 15A) showing in particular that additional replicates of said components may be added to the device to provide more than two filter press stacks in a single block assembly; thus scaling the device and increasing the product at a low incremental cost.

FIG. 16C shows a simplified top-down view of the innermost components of an embodiment of a multi-unipolar-cell electrolyser filter press block according to the present disclosure, based on a combination of parts FIG. 8A and FIG. 3A (or equivalently FIG. 13A and FIG. 15A) showing in particular that additional replicates of said components may be added to the device to provide more than two cell stacks in a single assembly; scaling the device longitudinally and laterally, and increasing the product output at a low incremental cost. The previously-shown stacks in FIG. 7 and FIG. 14 which show the combination of double CCFs and single CCFs applied together are described as comprising two unipolar cells, with three CCFs provided longitudinally in the filter press stacks. Hence it follows that the simplified CCF assembly of FIG. 16C comprises three electrochemical cells, each cell comprising seven CCFs therein as indicated by the dashed lines delineating CELL 1, CELL 2 and CELL 3 in FIG. 16C.

The assembly of FIG. 16C can be easily expanded laterally further to include more than 3 electrochemical cells by replacing the cathodic (indicated by a negative sign) "single CCFs" 50 positioned on the right-hand side of the Figure with additional "double CCFs" 350, and continuing this alternating pattern until the desired quantity of electrochemical cells are provided in the assembly, at which point the terminal cathodic single CCFs 50 would be applied as is presently shown in the right hand column of FIG. 16C. The assembly of FIG. 16C can be further expanded longitudinally as in the stack in FIG. 16A as well giving scalability in two (2) dimensions. Given there are no constraints on the vertical height of the CCFs—other than the available height of the space in which the cell block is provided—the cell block is in fact scalable in all three (3) dimensions while maintaining its electrical configuration in parallel longitudinally, and scaling in series laterally. As discussed, a proportional number of gaskets, masks, and separators would additionally be required for longitudinal and latitudinal scaling. This ability to scale allows both high current and high DC total voltage arrangements to be made. Thus, single power conditioning equipment limited only by its ability to provide high output DC current and high output DC voltage determines the maximum total power rating of the single electrical circuit which comprises the electrochemical plant.

Additionally, as discussed previously, the CCFs that are positioned adjacent to end assemblies are provided in a monopolar configuration with one inner electroactive structure (as shown in FIG. 16C). There is no need for a second electroactive structure on the opposing side of a terminal CCF that is directly facing the end assembly.

Thus it can be seen that the single and double CCF embodiments presently disclosed are very useful and advantageous for being able to scale the resulting unipolar filter press cell blocks.

This description is exemplary and should not be interpreted as limiting the invention or its applications. Specific parts or part numbers mentioned in the description may be substituted by functional equivalents.

Therefore what is claimed is:

1. A combined electrically conductive current carrier, circulation chamber, and rigid support frame for use in a unipolar electrochemical apparatus, comprising:

a one-piece, integrally formed, rigid support frame configured to support a pair of opposed, spaced apart, electroactive structures disposed in a unipolar arrangement, the rigid support frame being electrically conductive and capable of carrying current to the pair of electroactive structures, the rigid support frame having:
  first and second opposed faces defining a thickness of the rigid support frame sufficient to accommodate a circulation chamber extending therebetween,
  spaced apart opposed first and second side arms and first and second lateral cross members extending between the first and second side arms, one of the first and second side arms is configured to receive power from a power source;
  a first inner frame member attached to at least one of the second and first side arms and the second lateral cross member, the first inner frame member cooperating with the at least one of the second and first side arms and the second lateral cross member to define a first channel defining aperture;
  a second channel defining aperture disposed near the second lateral cross member and between the first and second side arms;
  a second inner frame member attached to at least one of the first and second side arms and the first lateral cross member, the second inner frame member cooperating with the at least one of the first and second side arms and the first lateral cross member to define a third channel defining aperture;
  a fourth channel defining aperture disposed near the first lateral cross member and between the first and second side arms;
  a circulation chamber integrally formed within the rigid support frame for the circulation of electrolyte, products, and reactants, the circulation chamber extending between the first and second faces of the rigid support frame, the first and second inner frame members and inner edges of the first and second side arms,
one or more intermediate lateral cross members extending between the first and second side arms, the one or more intermediate lateral cross members being in physical and electrical contact with the first and second side arms and being releasably detachable from the first and second side arms;
the pair of electroactive structures comprising a first electroactive structure and a second electroactive structure, the first electroactive structure affixed to the rigid support frame adjacent to the first face thereof, the first electroactive structure extending between the first and second inner frame members and the first and second side arms,
the second electroactive structure affixed to the rigid support frame adjacent to the second face thereof, the second electroactive structure extending between the first and second inner frame members and the first and second side arms,
each electroactive structure having apertures formed therein to allow liquid and gases to pass through the electroactive structure from one side to the other;
when the combined current carrier, circulation chamber, and rigid support frame is operatively connected to the unipolar electrochemical apparatus and power is applied, the first and second electroactive structures are of the same polarity.

2. The combined current carrier, circulation chamber, and rigid support frame according to claim 1, wherein:
  the first inner frame member is a first generally L-shaped member having first and second arm portions joined to each other; the first arm portion of the first generally L-shaped member being attached to one of the second and first side arms and the second arm portion of the first generally L-shaped member being attached to the second lateral cross member;
  the second inner frame is a second generally L-shaped member having first and second arms portions joined to each other; the first arm portion of the second generally L-shaped member being attached to one of the first and second side arms and the second arm portion of the second generally L-shaped member being attached to the first lateral cross member;
  the circulation chamber extends between the first and second faces of the rigid support frame, the first arm portions of the first and second generally L-shaped members and inner edges of the first and second side arms.

3. The combined current carrier, circulation chamber, and rigid support frame according to claim 2, wherein:
  the first arm portion of the first generally L-shaped member is attached to the second side arm; and
  the first arm portion of the second generally L-shaped member is attached to the first side arm.

4. The combined current carrier, circulation chamber, and rigid support frame according to claim 2, wherein:
  the first arm portion of the first generally L-shaped member is attached to the first side arm; and
  the first arm portion of the second generally L-shaped member is attached to the first side arm.

5. The combined current carrier, circulation chamber, and rigid support frame according to claim 2, further comprising:
  the first electroactive structure extending between the first arm portions of the first and second generally L-shaped members and the first and second side arms; and
  the second electroactive structure extending between the first arm portions of the first and second generally L-shaped members and the first and second side arms.

6. The combined current carrier, circulation chamber, and rigid support frame according to claim 1, wherein the one or more intermediate lateral cross members each have opposed ends shaped and configured to be insertable into complementary shaped and configured receptacles in the first and second side arms.

7. The combined current carrier, circulation chamber, and rigid support frame according to claim 1, wherein the one or more intermediate lateral cross members each having a thickness that is substantially the same as the thickness of the rigid support frame.

8. The combined current carrier, circulation chamber, and rigid support frame according to claim 1, wherein the one or more intermediate lateral cross members are configured to allow electrolytes, products and reactants to pass between the one or more intermediate lateral cross members and one of the electroactive structures, when the combined current carrier, circulation chamber, and rigid support frame is operational within the unipolar electrochemical apparatus.

9. The combined current carrier, circulation chamber, and rigid support frame according to claim 1, wherein each electroactive structure is a structure selected from the group consisting of: (a) a plate provided with any of slots and holes; (b) an expanded metal screen structure; and (c) a woven mesh structure.

10. The combined current carrier, circulation chamber, and rigid support frame according to claim 1, further comprising one or more recesses in each of the first and second side arms around the circulation chamber to allow the electroactive structures to be positioned at least partially within the depth of the circulation chamber.

11. The combined current carrier, circulation chamber, and rigid support frame according to claim 1, wherein portions of the first and second faces are recessed along margins of the first and second side arms adjacent the circulation chamber to allow the pair of electroactive structures to be positioned at least partially within the circulation chamber.

12. The combined current carrier, circulation chamber, and rigid support frame according to claim 1, the one of the first and second side arms having electrically conductive tabs extending outwardly from said side arm to which electrical power conductors are attachable.

13. The combined current carrier, circulation chamber, and rigid support frame according to claim 1, the one of the first and second side arms having holes defined in one of the first and second side arms for hosting an external electrical connection mechanism.

14. The combined current carrier, circulation chamber, and rigid support frame according to claim 1, wherein the rigid support frame has a generally rectangular shape, a height and a width; the height of the rigid support frame being greater than the width thereof.

15. The combined current carrier, circulation chamber, and rigid support frame according to claim 1, further comprising a plurality of tie rod holes defined in at least one of the first and second side arms, the tie rod holes of the plurality configured to receive therethrough tie rods therethrough to facilitate alignment of the rigid support frame with other rigid support frames in the unipolar electrochemical apparatus.

16. An electrochemical cell for a unipolar filter press electrolyser apparatus, the electrochemical cell comprising:
- a plurality of combined current carrier, circulation chamber, and rigid support frames arranged to form a stack of rigid support frames of alternating polarity and being aligned such that the channel defining apertures in each rigid support frame of the plurality align with each other; the plurality of rigid support frames including:
  - a pair of end rigid support frames, one end rigid support frame being disposed at one end of the stack and the other end rigid support frame being disposed at the other end of the stack; each end rigid support frame having at least one electroactive structure affixed thereto adjacent one of its first and second faces, the at least one electroactive structure being disposed to face the opposite end of the stack;
  - at least one intermediate rigid support frame according to claim 1 being disposed between the pair of end rigid support frames;
- a plurality of separators, each separator being mounted between a pair of adjacent rigid support frames to separate the circulation chamber of one of the adjacent rigid support frames from the circulation chamber of the other of the adjacent rigid support frames;
- a plurality of sealing and electrically insulating gaskets having substantially the same configuration as that of the plurality of rigid support frames, each sealing and electrically insulating gasket having defined therein channel defining apertures; and
- a plurality of masking frames, each masking frame being placed in the channel defining aperture defined in one of the sealing and electrically insulating gaskets or in one of the rigid support frames;

the channel defining apertures in each of the rigid support frames and first and second apertures in the gaskets being aligned with each other to form flow passageways through the stack.

17. The electrochemical cell according to claim 16 wherein each end rigid support frame has two electroactive structures with one electroactive structure being affixed to the end rigid support frame adjacent to its first face and the other electroactive structure being affixed to the end rigid support frame adjacent to its second face.

18. The electrochemical cell according to claim 16, wherein:
the first inner frame member of the at least one intermediate rigid support frame is a first generally L-shaped member having first and second arm portions joined to each other; the first arm portion of the first generally L-shaped member being attached to the second side arm and the second arm portion of the first generally L-shaped member being attached to the second lateral cross member;
the second inner frame of the at least one intermediate rigid support frame is a second generally L-shaped member having first and second arms portions joined to each other; the first arm portion of the second generally L-shaped member being attached to the first side arm and the second arm portion of the second generally L-shaped member being attached to the first lateral cross member;
the circulation chamber of the at least one intermediate rigid support frame extends between the first and second faces of the at least one intermediate rigid support frame, the first arm portions of the first and second generally L-shaped members associated with the at least one intermediate rigid support frame and inner edges of the first and second side arms of the at least one intermediate rigid support frame.

19. The electrochemical cell according to claim 16, wherein the one or more intermediate lateral cross members each have opposed ends shaped and configured to be insertable into complementary shaped and configured receptacles in the first and second side arms of the at least one intermediate support frames.

20. The electrochemical cell according to claim 16, wherein the one or more intermediate lateral cross members each having a thickness that is substantially the same as the thickness of the at least one intermediate rigid support frame associated therewith.

21. The electrochemical cell according to claim 16, wherein the one or more intermediate lateral cross members are configured to allow electrolytes, products and reactants to pass between the one or more intermediate lateral cross members and one of the electroactive structures, when the electrochemical cell is operational.

22. The electrochemical cell according to claim 16, wherein each electroactive structure is a structure selected from the group consisting of: (a) a plate provided with any of slots and holes; (b) an expanded metal screen structure; and (c) a woven mesh structure.

23. The electrochemical cell according to claim 16, wherein the at least one intermediate rigid support frame has one or more recesses in each of the first and second side arms around the circulation chamber to allow the electroactive structures associated with the at least one intermediate rigid support frame to be positioned at least partially within the depth of the circulation chamber.

24. The electrochemical cell according to claim 16, wherein the at least one intermediate rigid support frame has portions of the first and second faces that are recessed along margins of the first and second side arms adjacent the circulation chamber to allow the pair of electroactive structures to be positioned at least partially within the circulation chamber.

25. The electrochemical cell according to claim 16, wherein one of the first and second side arms of the at least one intermediate support frame has electrically conductive tabs extending outwardly from said side arm to which electrical power conductors are attachable.

26. The electrochemical cell according to claim 16, wherein one of the first and second side arms of the at least one intermediate support frame has holes defined in one of the first and second side arms for hosting an external electrical connection mechanism.

27. The electrochemical cell according to claim 16, wherein each rigid support frame of the plurality has a generally rectangular shape, a height and a width; the height of each rigid support frame being greater than the width thereof.

28. The electrochemical cell according to claim 16, wherein the at least one intermediate rigid support frame includes a plurality of tie rod holes defined in at least one of the first and second side arms of each of the at least one intermediate rigid support frames, the plurality of tie rod holes configured to receive therethrough tie rods therethrough to facilitate alignment of the at least one intermediate rigid support frame with other rigid support frames in the electrochemical cell.

29. A unipolar filter press electrolyser apparatus, comprising:
a plurality of combined current carrier, circulation chamber, and rigid support frames arranged to form a stack of rigid support frames of alternating polarity and being aligned such that the channel defining apertures in each rigid support frame of the plurality align with each other; the plurality of rigid support frames including:
a pair of end rigid support frames, one end rigid support frame being disposed at one end of the stack and the other end rigid support frame being disposed at the other end of the stack; each end rigid support frame having at least one electroactive structure affixed thereto adjacent one of its first and second faces, the at least one electroactive structure being disposed to face the opposite end of the stack;
at least one intermediate rigid support frame according to claim 1 being disposed between the pair of end rigid support frame;
a plurality of separators, each separator being mounted between a pair of adjacent rigid support frames to separate the circulation chamber of one of the adjacent rigid support frames from the circulation chamber of the other of the adjacent rigid support frames;
a plurality of sealing and electrically insulating gaskets having substantially the same configuration as that of the plurality of rigid support frames, each sealing and electrically insulating gasket having defined therein channel defining apertures;
a plurality of masking frames, each masking frame being placed in one of the channel defining aperture defined in one of the sealing and electrically insulating gaskets, the intermediate rigid support frame and the end rigid support frames;
a pair of end clamping plates for clamping the plurality of end rigid support frames and the intermediate rigid support frame together, each end clamping plate being associated with and disposed adjacent to one of the end rigid support frames, each end clamping plate including a first port for feeding liquids and/or gases into the stack and a second port for extracting liquids and/or gases from the stack;
a pair of gaskets, each gasket located between each end clamping plate and its associated end rigid frame for insulating each end clamping plate from its associated end rigid support frame, each gasket including first and second apertures defined therein to align with the first and second ports in each end clamping plate; and
the channel defining apertures in each of the rigid support frame and first and second apertures in the gaskets being aligned with each other to form flow passageways through the stack, the flow passageways being aligned with the first and second ports in each end clamping plate.

30. The unipolar filter press electrolyser apparatus according to claim 29, wherein the unipolar filter press electrolyser apparatus is configured for one of alkaline water electrolysis and chlor-alkali electrolysis.

31. The unipolar filter press electrolyser apparatus according to claim 29, wherein each end rigid support frame has two electroactive structures with one electroactive structure being affixed to the end rigid support frame adjacent to its first face and the other electroactive structure being affixed to the end rigid support frame adjacent to its second face.

32. The unipolar filter press electrolyser apparatus according to claim 29, wherein:
the first inner frame member of the at least one intermediate rigid support frame is a first generally L-shaped member having first and second arm portions joined to each other; the first arm portion of the first generally L-shaped member being attached to the second side arm and the second arm portion of the first generally L-shaped member being attached to the second lateral cross member;
the second inner frame of the at least one intermediate rigid support frame is a second generally L-shaped member having first and second arms portions joined to each other; the first arm portion of the second generally L-shaped member being attached to the first side arm and the second arm portion of the second generally L-shaped member being attached to the first lateral cross member;
the circulation chamber of the at least one intermediate rigid support frame extends between the first and second faces of the at least one intermediate rigid support frame, the first arm portions of the first and second generally L-shaped members associated with the at least one intermediate rigid support frame and inner edges of the first and second side arms of the at least one intermediate rigid support frames.

33. The unipolar filter press electrolyser apparatus according to claim 29, wherein the one or more intermediate lateral cross members each have opposed ends shaped and configured to be insertable into complementary shaped and configured receptacles in the first and second side arms of the at least one intermediate rigid support frames.

34. The unipolar filter press electrolyser apparatus according to claim 29, wherein the one or more intermediate lateral cross members each having a thickness that is substantially the same as the thickness of the at least one intermediate rigid support frame associated therewith.

35. The unipolar filter press electrolyser apparatus according to claim 29, wherein the one or more intermediate lateral cross members are configured to allow electrolytes, products and reactants to pass between the one or more intermediate lateral cross members and one of the electroactive structures, when the unipolar filter press electrolyser apparatus is operational.

36. The unipolar filter press electrolyser apparatus according to claim 29, wherein each electroactive structure is a structure selected from the group consisting of: (a) a plate provided with any of slots and holes; (b) an expanded metal screen structure; and (c) a woven mesh structure.

37. The unipolar filter press electrolyser apparatus according to claim 29, wherein the at least one intermediate rigid support frame has one or more recesses in each of the first and second side arms around the circulation chamber to allow the electroactive structures associated with the at least one intermediate rigid support frame to be positioned at least partially within the depth of the circulation chamber.

38. The unipolar filter press electrolyser apparatus according to claim 29, wherein the at least one intermediate rigid support frame has portions of the first and second faces that are recessed along margins of the first and second side arms adjacent the circulation chamber to allow the pair of electroactive structures to be positioned at least partially within the circulation chamber.

39. The unipolar filter press electrolyser apparatus according to claim 29, wherein one of the first and second side arms of the at least one intermediate support frame has electrically conductive tabs extending outwardly from said side arm to which electrical power conductors are attachable.

40. The unipolar filter press electrolyser apparatus according to claim 29, wherein one of the first and second side arms of the at least one intermediate support frame has holes defined in one of the first and second side arms for hosting an external electrical connection mechanism.

41. The unipolar filter press electrolyser apparatus according to claim 29, wherein each rigid support frame of the plurality has a generally rectangular shape, a height and a width; the height of each rigid support frame being greater than the width thereof.

42. The unipolar filter press electrolyser apparatus according to claim 29, wherein the at least one intermediate rigid support frame includes a plurality of tie rod holes defined in at least one of the first and second side arms of each of the at least one intermediate rigid support frames, the plurality of tie rod holes configured to receive therethrough tie rods therethrough to facilitate alignment of the at least one intermediate rigid support frame with other rigid support frames in the unipolar filter press electrolyser apparatus.

43. A unipolar filter press electrolyser apparatus, comprising:
a plurality of combined current carrier, circulation chamber, and rigid support frames according to claim 1 arranged to form a stack of rigid support frames of alternating polarity and being aligned such that the channel defining apertures in each rigid support frame of the plurality align with each other, the plurality of rigid support frames including:
a pair of end rigid support frame, one end rigid support frame being disposed at one end of the stack and the other end rigid support frame being disposed at the other end of the stack; each end rigid support frame having at least one electroactive structure affixed thereto adjacent one of its first and second faces, the at least one electroactive structure being disposed to face the opposite end of the stack;
at least one intermediate rigid support frame being disposed between the pair of end rigid support frames;
a plurality of separators, each separator being mounted between a pair of adjacent rigid support frames to separate the circulation chamber of one of the adjacent rigid support frames from the circulation chamber of the other of the adjacent rigid support frames;
a plurality of sealing and electrically insulating gaskets having substantially the same configuration as that of the plurality of rigid support frames, each sealing and electrically insulating gasket having defined therein channel defining apertures;
a plurality of masking frames, each masking frame being placed in one of the channel defining aperture defined in one of the sealing and electrically insulating gaskets, the intermediate rigid support frame and the end rigid support frames;
a pair of end clamping plates for clamping the plurality of end rigid support frames and the intermediate rigid support frame together, each end clamping plate being associated with and disposed adjacent to one of the end rigid support frames, each end clamping plate including a first port for feeding liquids and/or gases into the stack and a second port for extracting liquids and/or gases from the stack;
a pair of gaskets, each gasket located between each end clamping plate and its associated end rigid support frames for insulating each end clamping plate from its associated end rigid support frames, each gasket including first and second apertures defined therein to align with the first and second ports in each end clamping plate; and
the channel defining apertures in each of the rigid support frames and first and second apertures in the gaskets being aligned with each other to form flow passageways through the stack, the flow passageways being aligned with the first and second ports in each end clamping plate and being configured to accommodate the flow of gases and/or liquids to and from the circulation chamber of each rigid support frame via the channel defining gasket support member associated with each rigid support frame.

* * * * *